(12) United States Patent
Garrison et al.

(10) Patent No.: US 12,485,191 B2
(45) Date of Patent: Dec. 2, 2025

(54) RADIOPHARMACEUTICALS AND METHODS OF USE THEREOF

(71) Applicant: BOARD OF REGENTS OF THE UNIVERSITY OF NEBRASKA, Lincoln, NE (US)

(72) Inventors: Jered Garrison, Omaha, NE (US); Wei Fan, Omaha, NE (US); Wenting Zhang, Omaha, NE (US)

(73) Assignee: BOARD OF REGENTS OF THE UNIVERISTY OF NEBRASKA, Lincoln, NE (US)

( * ) Notice: Subject to any disclaimer, the term of this patent is extended or adjusted under 35 U.S.C. 154(b) by 0 days.

(21) Appl. No.: 16/765,507

(22) PCT Filed: Nov. 28, 2018

(86) PCT No.: PCT/US2018/062781
§ 371 (c)(1),
(2) Date: May 20, 2020

(87) PCT Pub. No.: WO2019/147338
PCT Pub. Date: Aug. 1, 2019

(65) Prior Publication Data
US 2020/0316233 A1   Oct. 8, 2020

Related U.S. Application Data

(60) Provisional application No. 62/591,465, filed on Nov. 28, 2017.

(51) Int. Cl.
*A61K 51/04* (2006.01)
*A61K 47/60* (2017.01)
*A61K 47/65* (2017.01)
*A61K 51/08* (2006.01)
*A61P 35/00* (2006.01)
*C07K 7/08* (2006.01)
*A61K 9/00* (2006.01)
*A61K 38/00* (2006.01)
*A61K 45/06* (2006.01)

(52) U.S. Cl.
CPC .......... *A61K 51/0497* (2013.01); *A61K 47/60* (2017.08); *A61K 47/65* (2017.08); *A61K 51/085* (2013.01); *A61P 35/00* (2018.01); *C07K 7/083* (2013.01); *A61K 9/0019* (2013.01); *A61K 38/00* (2013.01); *A61K 45/06* (2013.01)

(58) Field of Classification Search
CPC .... A61K 51/0497; A61K 47/65; A61K 47/60; A61K 51/085; A61P 35/00; C07K 7/083
USPC ...................................................... 424/1.65
See application file for complete search history.

(56) References Cited

U.S. PATENT DOCUMENTS

| | | | |
|---|---|---|---|
| 2010/0256055 A1 | 10/2010 | Castaigne et al. | |
| 2014/0227175 A1 | 8/2014 | Vasiljeva et al. | |
| 2016/0039792 A1* | 2/2016 | Bogyo | A61K 49/0034 424/9.6 |
| 2017/0119913 A1 | 5/2017 | Osterkamp et al. | |
| 2017/0319643 A1 | 11/2017 | Remaley et al. | |

FOREIGN PATENT DOCUMENTS

| | | | | |
|---|---|---|---|---|
| WO | WO-03028527 A2 * | 4/2003 | ....... | A61K 47/48176 |
| WO | 2016/077505 A2 | 5/2016 | | |

OTHER PUBLICATIONS

Ren et al. PLoS One, 2011, 6, 1-9. (Year: 2011).*
Loh et al. Chem. Commun. 2010, 46, 8407-8409 . . . (Year: 2010).*
Jia et al. Nucl. Med. Biol. 42, 2015, 816-823. (Year: 2015).*
Dechert et al. Bioorg. Med. Chem. 18 (2010) 6230-6237. (Year: 2010).*
Liu et al. Eur. J. Nucl. Med. Mol. Imaging 2009, 36, 1483-1494. (Year: 2009).*
Edem et al. J. Med. Chem. 2014, 57, 9564-9577. (Year: 2014).*
Maes et al. Pep. Youth. 2009 409-410. (Year: 2009).*
Dang et al. ACS Chem. Biol. 2010, 5, 279-285. (Year: 2010).*
Glaser et al. Bioconjugate Chem. 2007, 18, 989-993. (Year: 2007).*
Ogbomo, S.M., et al., "177Lu-labeled HPMA copolymers utilizing cathepsin B and S cleavable linkers: synthesis, characterization and preliminary in vivo investigation in a pancreatic cancer model" Nucl. Med. Biol. (2013) 40 (5):606-17.
Fan, W., et al., "Investigation into the Biological Impact of Block Size on Cathepsin S-Degradable HPMA Copolymers" Mol. Pharm. (2017) 14(5):1405-1417.
Fan, W., et al., "Cathepsin S-cleavable, multi-block HPMA copolymers for improved SPECT/CT imaging of pancreatic cancer" Biomaterials (2016) 103:101-115.
Shi, W., et al., "The influence of linker length on the properties of cathepsin S cleavable (177)Lu-labeled HPMA copolymers for pancreatic cancer imaging" Biomaterials (2014) 35(22):5760-70.
Fan, W., et al., "Increasing time on target: utilization of inhibitors of cysteine cathepsins to enhance the tumor retention of receptor-targeted agents" Chem. Commun. (2018) 54(80):11268-11271.
Powers, J.C., et al., "Irreversible Inhibitors of Serine, Cysteine, and Threonine Proteases" Chem. Rev. (2002) 102:4639-4750.
Reubi, J.C., "Peptide Receptors as Molecular Targets for Cancer Diagnosis and Therapy" Endocrine Reviews (2003) 24:389-427.
Lacoeuille, F., et al., "Targeted alpha and beta radiotherapy: An overview of radiopharmaceutical and clinical aspects" Médecine Nucléaire (2018) 42:32-44.
Jia, Y., et al., "Investigation of the Biological Impact of Charge Distribution on a NTR1-Targeted Peptide" Bioconjug. Chem. (2016) 27(11):2658-2668.

(Continued)

*Primary Examiner* — Jake M Vu
*Assistant Examiner* — Sean R Donohue
(74) *Attorney, Agent, or Firm* — Robert C. Netter, Jr.; Dann, Dorfman, Herrell & Skillman

(57) ABSTRACT

Targeted pharmaceuticals, particularly targeted radiopharmaceuticals, are provided which possess extended tumor retention time.

26 Claims, 21 Drawing Sheets

Specification includes a Sequence Listing.

(56) References Cited

OTHER PUBLICATIONS

Jia, Y., et al., "Evaluation of DOTA-chelated neurotensin analogs with spacer-enhanced biological performance for neurotensin-receptor-1-positive tumor targeting" Nucl. Med. Biol. (2015) 42(11):816-23.

Fan, et al., "Enhanced tumor retention of NTSR1-targeted agents by employing a hydrophilic cysteine cathepsin inhibitor" Eur. J. Med. Chem. (2019) 177:386-400.

Fan, et al., "Examination of the Impact Molecular Charge has on NTSR1-targeted Agents Incorporated with Cysteine Protease Inhibitors" Eur. J. Med. Chem., 234:114241.

Schaschke, et al., "Epoxysuccinyl peptide-derived affinity labels for cathepsin B" FEBS Lett. (2000) 482:91-96.

* cited by examiner

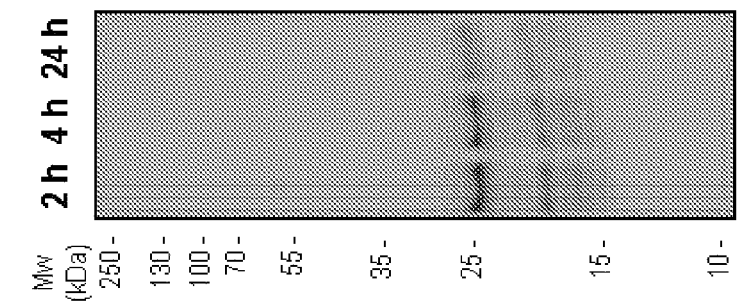
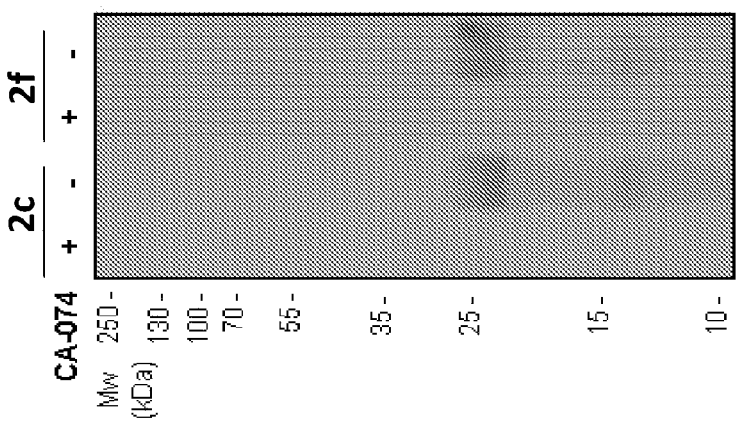
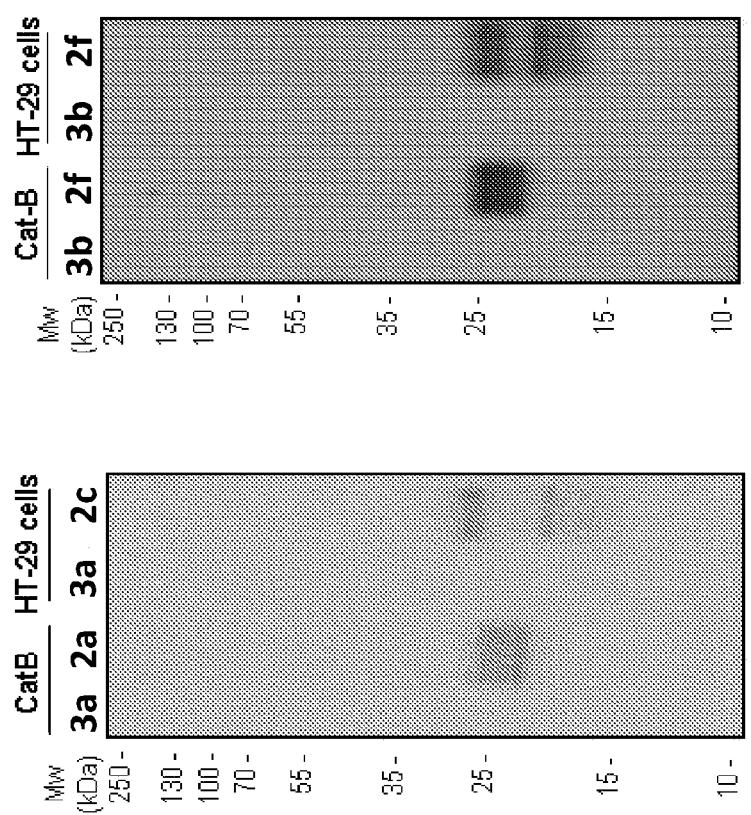
FIG. 3A                FIG. 3B                FIG. 3C                FIG. 3D

| Tissue (ID %/g) | 4 h | | 24 h | | 72 h | |
| --- | --- | --- | --- | --- | --- | --- |
| | 2f | 3b | 2f | 3b | 2f | 3b |
| Blood | 1.22 ± 0.14 | 0.83 ± 0.11 | 0.17 ± 0.05 | 0.14 ± 0.09 | 0.01 ± 0.18 | n.d. |
| Heart | 1.40 ± 0.36 | 1.10 ± 0.22 | 0.89 ± 0.23 | 0.63 ± 0.24 | 0.43 ± 0.57 | 0.27 ± 0.18 |
| Lung | 4.45 ± 1.54 | 4.26 ± 0.61 | 6.14 ± 3.78 | 2.25 ± 1.05 | 4.69 ± 2.77 | 1.22 ± 0.42 |
| Liver | 38.62 ± 4.24 | 9.24 ± 1.16 | 25.55 ± 8.18 | 8.31 ± 1.80 | 11.30 ± 4.71 | 5.28 ± 1.70 |
| Pancreas | 0.89 ± 0.15 | 0.84 ± 0.16 | 0.64 ± 0.18 | 0.77 ± 0.18 | 0.65 ± 0.29 | 0.68 ± 0.13 |
| Stomach | 1.74 ± 1.06 | 1.57 ± 0.59 | 0.92 ± 0.17 | 0.89 ± 0.37 | 0.83 ± 0.24 | 0.51 ± 0.08 |
| Spleen | 16.05 ± 2.82 | 18.58 ± 4.56 | 17.08 ± 10.12 | 18.32 ± 6.72 | 17.11 ± 14.60 | 18.54 ± 12.39 |
| Small int. | 6.06 ± 0.58 | 7.55 ± 0.80 | 5.48 ± 1.70 | 5.61 ± 1.16 | 4.26 ± 1.40 | 3.22 ± 0.77 |
| Large int. | 2.91 ± 0.38 | 4.28 ± 2.06 | 2.05 ± 0.86 | 2.55 ± 0.58 | 1.64 ± 0.50 | 1.62 ± 0.17 |
| Kidney | 58.18 ± 1.10 | 63.59 ± 9.91 | 61.96 ± 4.91 | 55.41 ± 7.79 | 44.77 ± 6.67 | 28.23 ± 6.75 |
| Muscle | 0.53 ± 0.04 | 0.44 ± 0.04 | 0.35 ± 0.06 | 0.38 ± 0.13 | 0.15 ± 0.12 | 0.12 ± 0.07 |
| Bone | 1.58 ± 0.20 | 2.56 ± 0.57 | 1.54 ± 0.39 | 1.79 ± 0.21 | 1.07 ± 0.29 | 1.05 ± 0.23 |
| Brain | 0.09 ± 0.08 | 0.11 ± 0.03 | 0.04 ± 0.03 | 0.04 ± 0.03 | 0.02 ± 0.09 | 0.01 ± 0.02 |
| Tumor | 7.82 ± 1.82 | 8.35 ± 1.92 | 9.83 ± 2.52 | 5.06 ± 1.01 | 6.34 ± 1.94 | 3.42 ± 0.46 |
| Excretion (ID%) | 16.55 ± 1.39 | 36.64 ± 3.92 | 34.94 ± 6.26 | 56.02 ± 3.00 | 57.09 ± 3.67 | 72.74 ± 3.66 |

A-ANT

C-AG

C-ANT

NE1c

OE1a

FE1

RE1

SEQUENCE LISTING

```
<160> NUMBER OF SEQ ID NOS: 12

<210> SEQ ID NO 1
<211> LENGTH: 13
<212> TYPE: PRT
<213> ORGANISM: Artificial Sequence
<220> FEATURE:
<223> OTHER INFORMATION: Targeting peptide

<400> SEQUENCE: 1

Glu Leu Tyr Glu Asn Lys Pro Arg Arg Pro Tyr Ile Leu
1               5                   10

<210> SEQ ID NO 2
<211> LENGTH: 8
<212> TYPE: PRT
<213> ORGANISM: Artificial Sequence
<220> FEATURE:
<223> OTHER INFORMATION: Targeting peptide

<400> SEQUENCE: 2

Lys Pro Arg Arg Pro Tyr Ile Leu
1               5

<210> SEQ ID NO 3
<211> LENGTH: 6
<212> TYPE: PRT
<213> ORGANISM: Artificial Sequence
<220> FEATURE:
<223> OTHER INFORMATION: Targeting peptide

<400> SEQUENCE: 3

Arg Arg Pro Tyr Ile Leu
1               5

<210> SEQ ID NO 4
<211> LENGTH: 14
<212> TYPE: PRT
<213> ORGANISM: Artificial Sequence
<220> FEATURE:
<223> OTHER INFORMATION: SST-14

<400> SEQUENCE: 4

Ala Gly Cys Lys Asn Phe Phe Trp Lys Thr Phe Thr Ser Cys
1               5                   10

<210> SEQ ID NO 5
<211> LENGTH: 28
<212> TYPE: PRT
<213> ORGANISM: Artificial Sequence
<220> FEATURE:
<223> OTHER INFORMATION: SST-28
```

```
<400> SEQUENCE: 5

Ser Ala Asn Ser Asn Pro Ala Met Ala Pro Arg Glu Arg Lys Ala Gly
1               5                   10                  15

Cys Lys Asn Phe Phe Trp Lys Thr Phe Thr Ser Cys
            20                  25

<210> SEQ ID NO 6
<211> LENGTH: 8
<212> TYPE: PRT
<213> ORGANISM: Artificial Sequence
<220> FEATURE:
<223> OTHER INFORMATION: octreotide
<220> FEATURE:
<221> NAME/KEY: VARIANT
<222> LOCATION: 1, 4
<223> OTHER INFORMATION: D-amino acid

<400> SEQUENCE: 6

Phe Cys Phe Trp Lys Thr Cys Thr
1               5

<210> SEQ ID NO 7
<211> LENGTH: 8
<212> TYPE: PRT
<213> ORGANISM: Artificial Sequence
<220> FEATURE:
<223> OTHER INFORMATION: JR11
<220> FEATURE:
<221> NAME/KEY: VARIANT
<222> LOCATION: 2, 8
<223> OTHER INFORMATION: D-amino acid
<220> FEATURE:
<221> NAME/KEY: MOD_RES
<222> LOCATION: 1
<223> OTHER INFORMATION: Xaa = Cpa
<220> FEATURE:
<221> NAME/KEY: MOD_RES
<222> LOCATION: 3
<223> OTHER INFORMATION: Xaa = Aph(Hor)
<220> FEATURE:
<221> NAME/KEY: MOD_RES
<222> LOCATION: 4
<223> OTHER INFORMATION: Xaa = D-Aph(Cbm)

<400> SEQUENCE: 7

Xaa Cys Xaa Xaa Lys Thr Cys Tyr
1               5

<210> SEQ ID NO 8
<211> LENGTH: 14
<212> TYPE: PRT
<213> ORGANISM: Artificial Sequence
<220> FEATURE:
<223> OTHER INFORMATION: bombesin
<220> FEATURE:
<221> NAME/KEY: MOD_RES
<222> LOCATION: 1
<223> OTHER INFORMATION: Xaa = Pyr

<400> SEQUENCE: 8

Xaa Gln Arg Leu Gly Asn Gln Trp Ala Val Gly His Leu Met
1               5                   10

<210> SEQ ID NO 9
<211> LENGTH: 8
<212> TYPE: PRT
<213> ORGANISM: Artificial Sequence
<220> FEATURE:
<223> OTHER INFORMATION: BBN(7-14)
```

```
<400> SEQUENCE: 9

Gln Trp Ala Val Gly His Leu Met
1               5

<210> SEQ ID NO 10
<211> LENGTH: 9
<212> TYPE: PRT
<213> ORGANISM: Artificial Sequence
<220> FEATURE:
<223> OTHER INFORMATION: RM2
<220> FEATURE:
<221> NAME/KEY: VARIANT
<222> LOCATION: 1
<223> OTHER INFORMATION: D-amino acid
<220> FEATURE:
<221> NAME/KEY: MOD_RES
<222> LOCATION: 8
<223> OTHER INFORMATION: Xaa = Sta

<400> SEQUENCE: 10

Phe Gln Trp Ala Val Gly His Xaa Leu
1               5

<210> SEQ ID NO 11
<211> LENGTH: 7
<212> TYPE: PRT
<213> ORGANISM: Artificial Sequence
<220> FEATURE:
<223> OTHER INFORMATION: octreotate
<220> FEATURE:
<221> NAME/KEY: VARIANT
<222> LOCATION: 1, 4
<223> OTHER INFORMATION: D-amino acids

<400> SEQUENCE: 11

Phe Cys Tyr Trp Lys Thr Cys
1               5

<210> SEQ ID NO 12
<211> LENGTH: 4
<212> TYPE: PRT
<213> ORGANISM: Artificial Sequence
<220> FEATURE:
<223> OTHER INFORMATION: Synthetic Sequence

<400> SEQUENCE: 12

Gly Ser Ser Ser
1
```

RADIOPHARMACEUTICALS AND METHODS OF USE THEREOF

This application is a § 371 application of PCT/US2018/062781, filed Nov. 28, 2018, which claims priority under 35 U.S.C. § 119 (e) to U.S. Provisional Patent Application No. 62/591,465, filed Nov. 28, 2017. The foregoing applications are incorporated by reference herein.

FIELD OF THE INVENTION

This application relates to the field of pharmaceuticals, particularly targeted radiopharmaceuticals. More specifically, this invention provides targeted radiopharmaceuticals with extended tumor retention time.

BACKGROUND OF THE INVENTION

Several publications and patent documents are cited throughout the specification in order to describe the state of the art to which this invention pertains. Each of these citations is incorporated herein by reference as though set forth in full.

The development of receptor-targeted radiopharmaceuticals that selectively bind to overexpressed receptor populations in cancerous tissues has been, and continues to be, extensively investigated (Welch and Eckelman, *Targeted Molecular Imaging*, Taylor & Francis, Oxfordshire, 2012). The targeting constructs for these agents can be broadly divided into carriers of low-molecular weight (e.g., small molecules and peptides) and high-molecular weight (e.g., proteins and antibodies). Low-molecular weight carriers offer several advantages relative to macromolecules, such as rapid accumulation in the target and clearance from non-target sites (Fani, et al. (2012) Theranostics, 2:481; Fischman, et al. (1993) J. Nucl. Med., 1993, 34:2253; Okarvi, S. M. (2008) Cancer Treat. Rev., 34:13). Unfortunately, compared to high-molecular weight carriers, smaller molecules generally have inherently higher metabolism and diffusion characteristics, leading to decreased tumor residence times that often diminish translational potential, particularly for therapeutic applications. In view of the foregoing, it is clear that improved receptor-targeted radiopharmaceuticals are needed.

SUMMARY OF THE INVENTION

In accordance with the instant invention, targeted compounds (e.g., anti-cancer compounds) are provided. In certain embodiment, the compounds comprise a) a targeting moiety, b) a cysteine cathepsin trapping agent (CCTA), and c) a cytotoxic or radioactive moiety. The components of the compounds are linked to each other either directly or via a linker (e.g., a linker comprising a peptide or a linker comprising poly(ethylene glycol)). For example, the cysteine cathepsin trapping agent and the cytotoxic or radioactive moiety are linked to the targeting moiety either directly or via a linker. The targeting moiety of the instant compounds binds a receptor expressed on a cancer cell (e.g., the targeting moiety may be a receptor agonist). In certain embodiment, the targeting moiety is a peptide (e.g., a peptide of less than 20 amino acids) or a small molecule. In a particular embodiment, the targeting moiety targets a receptor selected from the group consisting of neurotensin receptors, gastrin-releasing peptide receptors, folate receptors, and somatostatin receptor. In certain embodiments, the CCTA is an acyloxymethyl ketone (e.g., a dipeptidyl acyloxymethyl ketone) or an epoxide (e.g., an epoxysuccinyl peptide). In certain embodiments, the cytotoxic or radioactive moiety of the instant compounds is a radionuclide (e.g., $^{177}$Lu) which may contained within a chelator such as 1,4,7,10-tetraaza-1,4,7,10-tetra(2-carbamoylmethyl)cyclododecane (TCMC) or 1,4,7,10-tetraazacyclododecane-1,4,7,10-tetraacetic acid (DOTA). In certain embodiments, the log $D_{7.4}$ of the compounds of the instant invention is −2.5 to −4.0 or −3.0 to −4.0. In a particular embodiment, the compound is selected from the group consisting of 2a, 2b, 2c, 2d, 2e, 2f, 4a, Ea, NE2a, NE2b, NE2c, NE2d, A-AG, A-ANT, NE1c, OE1a, FE1, and RE1, or a derivative thereof.

In accordance with another aspect of the instant invention, compositions comprising a compound of the instant invention are provided. The composition may further comprise a carrier (e.g., a pharmaceutically acceptable carrier).

In accordance with another aspect of the instant invention, methods of inhibiting or treating a disease or disorder (e.g., cancer) in a subject in need thereof are provided. The methods comprise administering a compound of the instant invention to the subject. The compound may be administered as a composition further comprising a pharmaceutically acceptable carrier. The compounds of the instant invention (or composition comprising the compound) may be administered intravenously or to the tumor and/or tumor site.

BRIEF DESCRIPTION OF THE DRAWINGS

FIG. 3A provides an autoradiography of the SDS-PAGE gel from the CatB and live HT-29 cell samples after incubation with $^{177}$Lu-labeled 2c and 3a. FIG. 3B provides an autoradiography of the SDS-PAGE gel from the CatB and live HT-29 cell samples after incubation with $^{177}$Lu-labeled 2f and 3b. The incubation times for CatB and cells were 2 hours and 4 hours, respectively. FIG. 3C provides an autoradiography of the SDS-PAGE showing the cathepsin B binding of the conjugates can be completely inhibited by cysteine proteases inhibitor CA-074. FIG. 3D provides an autoradiographic image of a SDS-PAGE gel examining the time-dependent retention of cysteine cathepsins adducts in HT-29 cells after pre-incubation with 2f for 4 hours. FIG. 3E provides the GPC profiles of $^{177}$Lu-labeled 2c and HT-29 cells samples after incubation with 2c and 3a. FIG. 3F provides the GPC profiles of $^{177}$Lu-labeled 2f and HT-29 cells samples after incubation with 2f and 3b.

FIG. 4E provides the biodistribution data of the $^{177}$Lu-labeled 2f and 3b in a HT-29 xenograft mouse model. Data are represented as mean±SD. (n=5).

DETAILED DESCRIPTION OF THE INVENTION

Figure 1A:
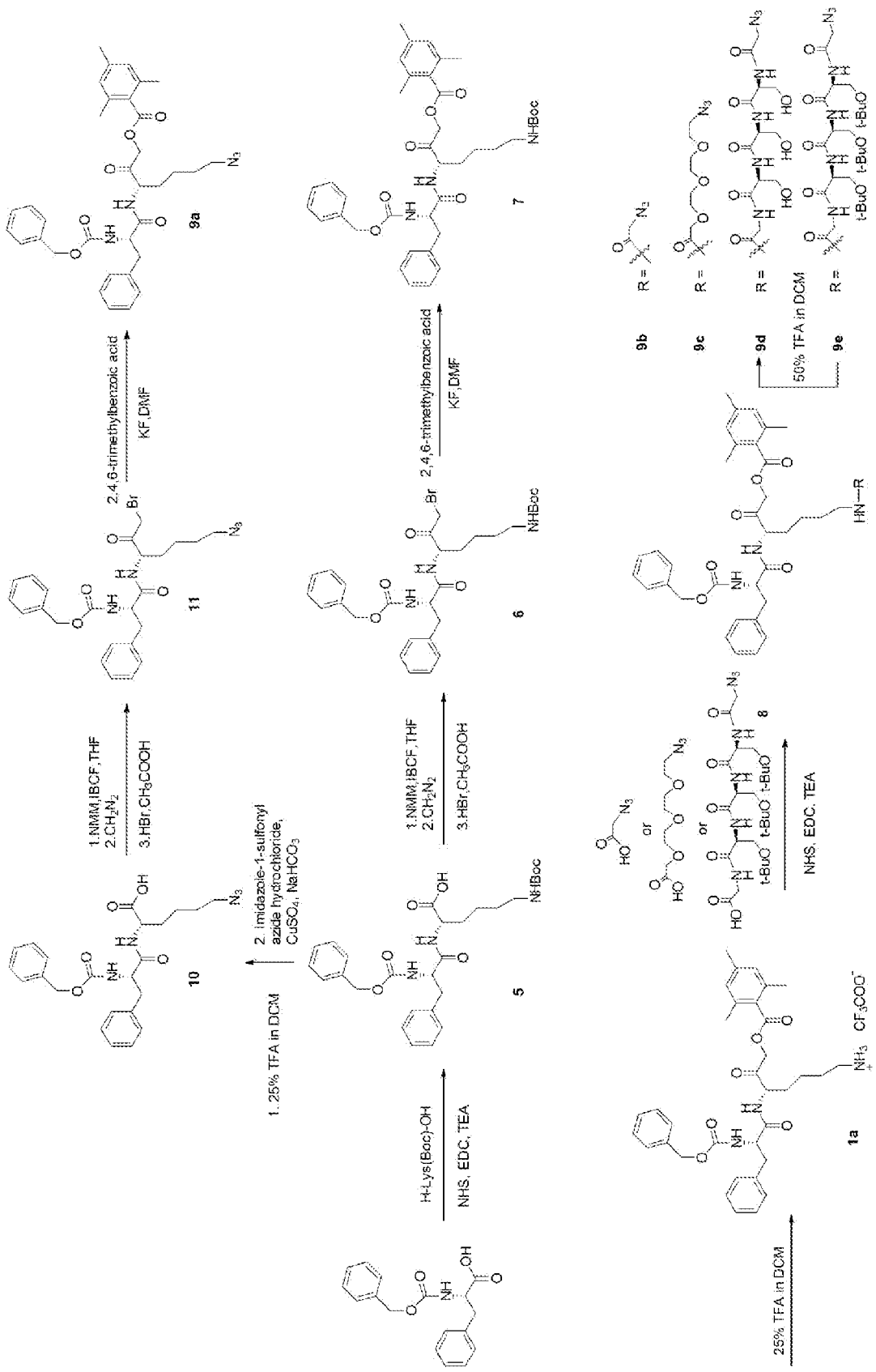
FIG. 1A provides a schematic of the synthesis of compounds 9a-9e.

The synergistic combination of receptor-targeted agents and cysteine cathepsin trapping agents (CCTAs) is shown herein to improve the retention of receptor-avid drugs (e.g., radiopharmaceuticals) in tumor cells, thereby improving cancer therapy. Briefly, radiolabeled peptides or small molecules are linked to CCTAs. The conjugate binds to the respective receptor associated with the peptide or small molecule and is internalized. The internalized complex inhibits degradation by inhibiting cysteine cathepsins. By avoiding degradation, the retention time of the internalized drug is increased, yielding a pronounced increase in anti-tumor effect.

For many receptor-targeted agents (e.g., folic acid, somatostatin, neurotensin, etc.), binding of the radiopharmaceutical to the receptor induces internalization into the endolysosomal compartments of the cell. Proteases, typically cysteine cathepsins, are expressed in high concentrations (~1 mM) in these compartments due to their role in intracellular protein turnover. This co-localization has been exploited herein by incorporating irreversible, cysteine cathepsin trapping agents (CCTAs) into the structure of receptor-targeted drugs. The CCTA-incorporated agents are shown herein to irreversibly bind to cysteine cathepsins, thereby yielding high molecular weight adducts that exhibit significantly higher retention in tumors. This technology addresses one of the fundamental hurdles in targeted drug development—retention at the target site (e.g., tumor). The technology is malleable and can be used with other targeting moieties and other drugs. For example, the invention has been demonstrated by using the neurotensin/neurotensin receptor-1 (NTR1, also abbreviated NTSR1) system (see, e.g., Example 1) and the Gastrin-Releasing Peptide Receptor (GRPR) (see, e.g., Example 3). NTR1 is a G-protein coupled receptor that is overexpressed on the cell surface in a variety of cancers. This receptor is effectively targeted by the neurotensin (NT) peptide, which has high affinity for NTR1. However, the invention is also effective in systems other than the NT/NTR1 system. For example, this technology will work analogously with agents which target somatostatin receptors, folate receptors, and other receptors as described herein.

There are several characteristics of CCTA-incorporated, receptor-targeted agents which help cause them to exhibit improved tumor retention and improved tumor-to-non-target ratios. These characteristics include, but are not limited to, the following. Notably, an effective CCTA-incorporated, receptor-targeted agents need not possess each and every one of the following characteristics, though it is preferred. First, the CCTA-incorporated, receptor-targeted agents are preferably hydrophilic (particularly log $D_{7.4}$=−2.5 to −4.0, −2.5 to −3.5, or −3.0 to −4.0), thereby leading strictly to receptor-mediated driven uptake and not passive diffusion (i.e., non-specific). Second, the receptor-targeted peptides utilized are preferably agonistic or possess some agonistic properties. As such, CCTA-incorporated, receptor-targeted agents upon binding activate the receptor leading to efficient endocytic delivery of the agent into the endolysosomal compartments of the cell (Hermans, et al. (1998) Pharmacol. Ther., 79:89; Myers, et al. (2009) ACS Chem. Biol. 4:503; Jia, et al. (2015) Nucl. Med. Biol., 42:816). These endolysosomal compartments contain very high concentrations (~1 mM) of active cysteine cathepsins (Xing, et al. (1998) Biochem. J., 332:499). Third, the cysteine cathepsin inhibitors preferably possess good in vivo stability and rapid and specific binding to cysteine cathepsins located in endolysosomal compartments, such as dipeptidyl acyloxymethyl ketones (AOMKs), epoxide and other classes (Verdoes, et al. (2013) J. Am. Chem. Soc., 135:14726; Edem, et al. (2014) J. Med. Chem., 57:9564; Hashida, et al. (1982) J. Biochem., 91:1373; Siklos, et al. (2015) Acta Pharm. Sin. B, 5:506).

Cysteine cathepsins (CCs) are a family of 11 endolysosomal proteases with a variety of functions, but are primarily attributed to protein catabolism (Reiser, et al. (2010) J. Clin. Invest., 120:3421; Palermo, et al. (2008) Trends Pharmacol. Sci., 29:22). These proteases are highly expressed (i.e., mM) in endolysosomal compartments, but are also known to exist extracellularly. The extracellular activity of CCs is generally very low and tightly regulated in normal tissue through a number of biological mechanisms (Turk, et al. (2012) Biochim. Biophys. Acta, 1824:68). In cancers, however, upregulation of both the expression and activity of CCs has been observed and has garnered interest in the development of reversible and irreversible inhibitors of these proteases for diagnostic and therapeutic purposes (Joyce, et al. (2004) Cell Cycle, 3:1516; Aggarwal, et al. (2014) Proteomics Clin. Appl., 8:427; Kos, et al. (2014) Future Med. Chem., 6:1355; Sudhan, et al. (2015) Pharmacol. Ther., 155:105; Salpeter, et al. (2015) Oncogene, 34:6066).

Dipeptidyl acyloxymethyl ketones (AOMKs) are one example of a class of irreversible inhibitors for CCs (Krantz, et al. (1991) Biochemistry, 30:4678; Wagner, et al. (1994) J. Med. Chem., 37:1833). These inhibitors have high selectivity for the active site of CCs. They can also form irreversible thioether linkages with the cysteine responsible for the catalytic function of the protease (Powers, et al. (2002) Chem. Rev., 102:4639). To date, a variety of AOMK inhibitors has been reported for diagnostic and therapeutic purposes related to cysteine cathepsins known role in cancer (Krantz, et al. (1991) Biochemistry, 30:4678; Powers, et al. (2002) Chem. Rev., 102:4639; Otto, et al. (1997) Chem. Rev., 97:133; Ofori, et al. (1977) ACS Chem. Biol., 10:1977).

As explained above, a synergistic concept that utilizes CC inhibitors, such as AOMKs, as novel and powerful CC-trapping agents (CCTAs) are provided which improve the retention of low-molecular weight, receptor-targeted radiopharmaceuticals. Upon binding of the agonistic-targeting vector to its corresponding cellular receptor and intracellular trafficking to the endolysosomal compartments, targeting vectors incorporating these CCTAs can irreversibly bind to the highly expressed and active CCs within these compartments. As a result, high-molecular weight, intracellular CC-adducts, which would limit cellular efflux and diffusion of the radiopharmaceutical were expected, thereby enhancing its long-term retention in target tissues. Significant increases in the target/non-target (T/NT) ratios is achieved with these constructs, thereby increasing the ability to transition to the clinic. To examine the utility of this concept, the neurotensin (NT) peptide/NTR1 was utilized as the model platform (Jia, et al. (2016) Bioconjugate Chem., 27:2658; Jia, et al. (2015) Nucl. Med. Biol., 42:816).

In accordance with the instant invention, compounds (e.g., anti-cancer compounds) are provided. The compounds of the instant invention comprise 1) a targeting moiety, 2) a cysteine cathepsin trapping agents (CCTAs), and 3) a cytotoxic or radioactive moiety. The three individual components are linked to form a single compound. The linkages may be direct linkages or by a linker. The components of the compound can be linked via any chemically feasible location so long as the activity or purpose of the component is not inhibited or destroyed by the linkage. In a particular embodiment, when the cysteine cathepsin trapping agents (CCTAs) and the cytotoxic or radioactive moiety are linked to the N-terminus of a peptide targeting moiety, either directly or via a linker.

In certain embodiments of the instant invention, the targeting moiety targets and binds a receptor expressed on cancer cells, particularly receptors which are over-expressed on cancer cells compared to noncancerous cells. The targeting moiety may be an agonist of the receptor to be targeted by the compound of the instant invention. The targeting moiety of the compounds of the instant invention is preferably a peptide or a small molecule. In a particular embodiment, the targeting moiety is a peptide. In certain embodiments, the targeting peptide is less than 30 amino acids in length, particularly less than 25 amino acids in length, less than 20 amino acids, less than 15 amino acids, or less than 10 amino acids in length. In a particular embodiment, the targeting peptide comprises one or more D-amino acids. In a particular embodiment, the targeting peptide comprises one or more non-natural amino acids.

Examples of receptors to be targeted include, without limitation, neurotensin receptors, gastrin-releasing peptide receptors, folate receptors, somatostatin receptors, prostate specific membrane antigen, vasoactive intestinal peptide receptors, cholecystokinin receptors, calcitonin receptors, vitronectin receptors, integrin receptors, asialoglycoprotein receptors, vascular endothelia growth factor receptors, transferrin receptors, luteinizing hormone-releasing hormone receptor, melanocortin receptors, glucagon-like peptide receptors, neurokinin receptors, sigma receptors, tropomyosin receptor kinase, aminopeptidase n (CD13) receptor, and epidermal growth factor receptor. In a particular embodiment, the receptor to be targeted is selected from the group consisting of neurotensin receptors, gastrin-releasing peptide receptors, folate receptors, and somatostatin receptor.

In a particular embodiment, the targeting moiety binds a neurotensin receptor, particularly NTR1. Neurotensin receptors are composed of three subtypes: NTR1 (NTSR1), NTR2 and NRT3. NTR1 has been reported to be overexpressed in many cancers including, without limitation: pancreatic cancer, breast cancer (e.g., invasive ductal breast cancer), colon cancer, prostate cancer, non-small cell lung cancer, and malignant mesothelioma. In a particular embodiment, the targeting moiety is a peptide agonist of NTR1. Examples of NTR1 targeting peptides include, without limitation: neurotensin (NT; Glu-Leu-Tyr-Glu-Asn-Lys-Pro-Arg-Arg-Pro-Tyr-Ile-Leu; SEQ ID NO: 1), NT(6-13) (Lys-Pro-Arg-Arg-Pro-Tyr-Ile-Leu; SEQ ID NO: 2), and NT(8-13) (Arg-Arg-Pro-Tyr-Ile-Leu; SEQ ID NO: 3).

In a particular embodiment, the targeting moiety binds a somatostatin receptors (SSTRs), particularly SSTR2. SSTRs, particularly SSTR2, have been found to be highly expressed in a number of cancers including neuroendocrine tumors. The endogenous, agonistic ligand somatostatin (SST) exists in two biologically active forms of SST-14 (AGCKNFFWKTFTSC; SEQ ID NO: 4) and SST-28 (SANSNPAMAPRERKAGCKNFFWKTFTSC; SEQ ID NO: 5), both of which have nanomolar SSTR affinity. Examples of SSTR2 targeting peptides include, without limitation: SST-14, SST-28, octreotide (OCT; fCFwKTCT-ol (lower case indicates D-amino acid; ol-amino alcohol); SEQ ID NO: 6), octreotate (TATE; fCYwKTC (lower case indicates D-amino acid); SEQ ID NO: 6), and JR11 (Cpa-D-Cys-Aph(Hor)-D-Aph(Cbm)-Lys-Thr-Cys-D-Tyr; SEQ ID NO: 7).

In a particular embodiment, the targeting moiety binds a gastrin-releasing peptide receptor (GRPR; also known as bombesin receptor). The GRPR has been shown to be highly expressed in a variety of cancers including prostate, pancreatic and breast cancers. Examples of GRPR targeting peptides include, without limitation: bombesin (BBN: Pyr-Gln-Arg-Leu-Gly-Asn-Gln-Trp-Ala-Val-Gly-His-Leu-Met; SEQ ID NO: 8), BBN(7-14) (Gln-Trp-Ala-Val-Gly-His-Leu-Met; SEQ ID NO: 9), and RM2 ((D)Phe-Gln-Trp-Ala-Val-Gly-His-Sta-Leu; SEQ ID NO: 10).

In a particular embodiment, the targeting moiety binds folate receptor (FR). FR is known to be upregulated in a number of cancers, including ovarian, breast, and lung cancers. Folic acid is, among other endogenous folate derivatives, a small molecule that has high-affinity (nM) for the FR. Numerous FR-targeted drugs have been developed as chemotherapeutics or targeted therapies. Examples of FR targeting moieties include, without limitation: folic acid and etarfolatide.

Other targeting moieties are well known in the art. For example, targeting moieties, including targeting peptides, are provided in *Targeted Molecular Imaging* (Ed. Welch and Eckelman (2012) CRC Press, Boca Raton, 388 pages), Reubi, J. C. (Endocrine Reviews (2003) 24(4):389-427), and Lacoeuille, et al. (Medecine Nucleaire (2018) 42:32-44) (each of these references is incorporated by reference herein).

As stated hereinabove, the targeting moiety may comprise one or more D-amino acids and/or one or more non-natural amino acids. Such modifications can yield compounds which are more metabolically stable. The instant invention encompasses derivatives of the above listed amino acid sequences (e.g., SEQ ID NOs 1-10). The derivatives may have one or more amino acids inserted, deleted, and/or substituted. In a particular embodiment, the derivative comprises one or more substitutions in the targeting peptide. For example, tyrosine may be replaced with dimethyltyrosine, leucine may be replaced with tert-leucine, and/or arginine may be replaced with methylarginine.

Cysteine cathepsin trapping agents (CCTAs) are well known in the art (see, e.g., Powers, et al. (2002) Chem. Rev., 102:4639; Krantz, et al. (1991) Biochemistry, 30:4678; Wagner, et al. (1994) J. Med. Chem., 37:1833; Bromme, et al. (2002) J. Curr. Pharm. Des., 8:1639; Rukamp, et al. (2002) In Proteinase and Peptidase Inhibition: Recent Potential Targets for Drug Development; Smith, H. J., Ed.; Taylor and Francis: London, U.K., p 84). In a particular embodiment, the CCTA is an acyloxymethyl ketone

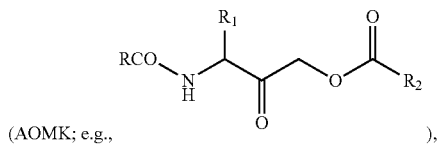

(AOMK; e.g., ), particularly a peptidyl acyloxymethyl ketone (e.g., peptidyl-NH—(CRH)—CO—CH$_2$OCOR; wherein the CRH group may be part of an amino acid), particularly a dipeptidyl acyloxymethyl ketone. Acyloxymethyl ketones (AOMKs) are well known in the art (see, e.g., pages 4657-4664 of Powers, et al. (2002) Chem. Rev., 102:4639; incorporated herein by reference). In a particular embodiment, the AOMK is Cbz-Phe-X—CH$_2$OCOR, wherein X is an amino acid such as Ala or Lys. In a particular embodiment, the R group of the CH$_2$OCOR group of the AOMK is selected from the group consisting of 2,6-(CF$_3$)$_2$-Ph, 2,6-Cl$_2$-Ph, C$_6$F$_5$, 2,6-F$_2$-Ph, 2-CF$_3$-Ph, 2,4,6-(Me)$_3$Ph, 4-NO$_2$-Ph, 4-F-Ph, and 4-Me-Ph.

In a particular embodiment, the AOMK is

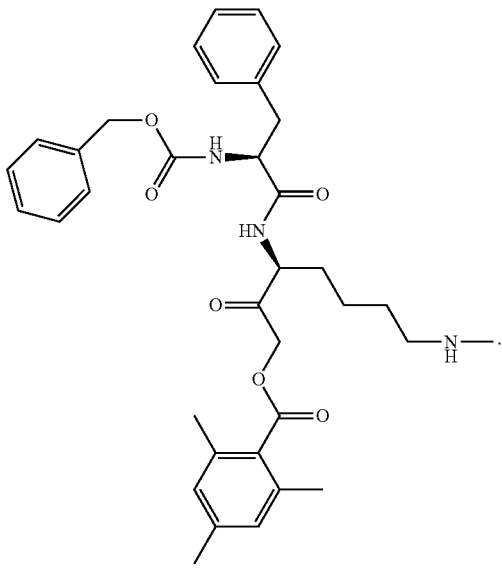 [SMILES: CNCCCC[C@H](NC(=O)[C@H](Cc1ccccc1)NC(=O)OCc1ccccc1)C(=O)COC(=O)c1c(C)cc(C)cc1C]

In a particular embodiment, the CCTA is an epoxide, particularly an epoxysuccinyl peptide (e.g., 1-3 amino acids). Epoxide CCTAs and epoxysuccinyl peptides are well known in the art (see, e.g., pages 4664-4681 of Powers, et al. (2002) Chem. Rev., 102:4639; incorporated herein by reference). In a particular embodiment, the epoxide CCTA is E-64 or a derivative thereof. In a particular embodiment, the epoxide CCTA is selected from the group consisting of

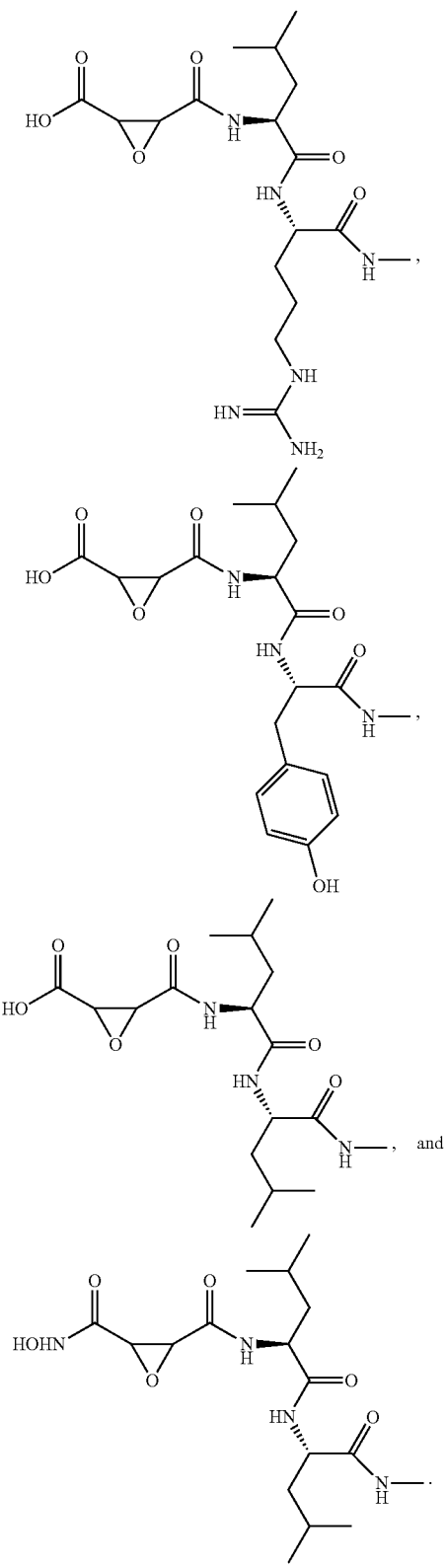

The cytotoxic or radioactive moiety of the compounds of the instant invention can be any compound that kills the cell into which it is internalized. Such compounds are well known in the art. In a particular embodiment, the cytotoxic or radioactive moiety is a small molecule. In a particular embodiment, the cytotoxic or radioactive moiety is a chemotherapeutic agent. In a particular embodiment, the compounds of the instant invention comprise a radioactive moiety such as a radioisotope or radionuclide. Typically, the radioisotope or radionuclide will be contained in a chelator such as 1,4,7,10-tetraaza-1,4,7,10-tetra(2-carbamoylmethyl) cyclododecane (TCMC) or 1,4,7,10-tetraazacyclododecane-1,4,7,10-tetraacetic acid (DOTA). Radionuclides (radioisotopes) of the instant invention include, without limitation, positron-emitting isotopes and alpha-, beta-, gamma-, Auger- and low energy electron-emitters. In a particular embodiment, the radionuclides are alpha-emitters or beta-emitters. Radionuclides (radioisotopes) include, without limitation: $^{13}$N, $^{18}$F, $^{32}$P, $^{64}$Cu, $^{66}$Ga, $^{67}$Ga, $^{67}$Cu, $^{77}$Br, $^{80m}$Br, $^{82}$Rb, $^{86}$Y, $^{90}$Y, $^{95}$Ru, $^{97}$Ru, $^{99m}$Tc, $^{103}$Ru, $^{105}$Ru, $^{111}$In, $^{113m}$In, $^{113}$Sn, $^{121m}$Te, $^{122m}$Te, $^{125m}$Te, $^{123}$I, $^{124}$I, $^{125}$I, $^{126}$I, $^{131}$I, $^{133}$I, $^{165}$Tm, $^{167}$Tm, $^{168}$Tm, $^{177}$Lu, $^{186}$Re, $^{188}$Re, $^{195m}$Hg, $^{211}$At, $^{212}$Bi, $^{212}$Pb, $^{213}$Bi, and $^{225}$Ac. In a particular embodiment, the radioisotope or radionuclide is selected from the group consisting of $^{64}$Cu, $^{66}$Ga, $^{67}$Ga, $^{68}$Ga, $^{67}$Cu, $^{90}$Y, $^{111}$In $^{113m}$In, $^{131}$I, $^{177}$Lu, $^{186}$Re, $^{212}$Pb, and $^{225}$Ac. In a particular embodiment, the radioisotope or radionuclide is selected from the group consisting of $^{177}$Lu, $^{90}$Y, $^{67}$Ga, $^{68}$Ga, $^{212}$Pb, $^{111}$In and $^{225}$Ac. In a particular embodiment, the radioisotope or radionuclide is $^{177}$Lu or $^{212}$Pb. In a particular embodiment, the radioisotope or radionuclide is $^{177}$Lu.

As stated hereinabove, the components of the instant compounds are linked to each other either directly or via a linker. In a particular embodiment, the compound comprises a peptide targeting moiety and a linker attached to the N-terminus of the peptide targeting moiety. The CCTA and/or the cytotoxic or radioactive moiety may be attached directly to this linker or attached via another linker. For example, the CCTA may be attached to the cytotoxic or radioactive moiety via a linker, which is then attached to the targeting moiety via another linker. When a compound comprises more than one linker, the linkers may be the same or different. In a particular embodiment, the linkers are not degradable or cleavable under physiological conditions. In a particular embodiment, the linkers comprise residual atoms from the chemistry to join the components and/or linkers of the compounds (e.g., crosslinkers, the residual of click chemistry, etc.). In a particular embodiment, the linkers of the instant invention comprise peptides comprising 1-15 amino acids, particularly 1-10 amino acids, 1-8 amino acids, 1-5 amino acids, 1-4 amino acids, or 1-3 amino acids. In a particular embodiment, the peptide linker comprises one or more (or all) D-amino acids. Peptide linkers of the instant invention may comprise multiple serine residues (e.g., Ser$_3$). In a particular embodiment, the peptide linker comprises one or more non-natural amino acids. In a particular embodiment, the linker of the instant invention comprises poly (ethylene glycol) (PEG). In a particular embodiment, the PEG linker comprises 2-25 PEG monomers, particularly 2-20 monomers, 2-15 monomers, 2-10 monomers, or 2-5 monomers.

In a particular embodiment, the compound of the instant invention is a compound depicted in FIG. 5. In a particular embodiment, the compound of the instant invention is selected from the group consisting of 2a, 2b, 2c, 2d, 2e, 2f, 4a, Ea, NE2a, NE2b, NE2c, NE2d, A-AG, A-ANT, NE1c, 0E1a, FE1, and RE1. In a particular embodiment, the compound of the instant invention is a derivative of these compounds. For example, the derivative may have the targeting moiety replaced with a different targeting moiety; the derivative may have the CCTA replaced with a different CCTA; and/or the derivative may have the cytotoxic or radioactive moiety replaced with a different cytotoxic or radioactive moiety.

Compositions comprising a compound of the instant invention and a carrier (e.g., a pharmaceutically acceptable carrier) are also encompassed by the instant invention.

While the compounds of the instant invention are described hereinabove as comprising a cytotoxic or radioactive moiety, this moiety can be replaced with a detectable moiety. Thus, in accordance with the instant invention, compositions and methods are provided for detecting, imaging, and/or diagnosing a disease or disorder (e.g., cancer). The methods comprise administering at least one compound of the instant invention to a subject in need thereof (e.g., a subject with cancer) and, optionally, visualizing (e.g., using one of the methods recited below) the location of the administered compound, thereby indicating the presence of the disease or disorder (e.g., the presence of a tumor). The detectable moiety can be any compound useful for optical imaging, magnetic resonance imaging (MRI), positron emission tomography (PET), Single-photon emission computed tomography (SPECT), computerized tomography (CT), gamma-scintigraphy imaging, and the like. For example, the detectable moiety can be any detectable agent (e.g., compound or peptide) such as isotopes (e.g., radioisotopes (e.g., $^3$H (tritium) and $^{14}$C) or stable isotopes (e.g., $^2$H (deuterium), $^{11}$C, $^{13}$C, $^{17}$O and $^{18}$O)), paramagnetic or superparamagnetic ions, imaging agents, gold (e.g., nanoparticles), optical agents (e.g., near IR dyes (e.g., IRDye® 800CW) phorphyrins, anthraquinones, anthrapyrazoles, perylenequinones, xanthenes, cyanines, acridines, phenoxazines, phenothiazines and derivatives thereof), fluorescent agents (e.g., fluorophores), and/or contrast agents.

In accordance with another aspect of the instant invention, methods for the inhibition (e.g., reduction, slowing, etc.), prevention, and/or treatment of a disease or a disorder are provided. In a particular embodiment, the disease or disorder is characterized by cell type with a specific receptor (e.g., an over-expressed receptor), particularly wherein it is desirable to kill the disease or disorder associated cell type. In a particular embodiment, the disease or disorder is cancer. The methods comprise administering at least one compound of the instant invention to a subject in need thereof (e.g., a subject with cancer). The compounds of the instant invention may be administered to the subject in a composition comprising at least one carrier (e.g., pharmaceutically acceptable carrier).

The cancer that may be treated using the compositions and methods of the instant invention include, but are not limited to, prostate cancer, colorectal cancer, pancreatic cancer, cervical cancer, stomach cancer (gastric cancer), endometrial cancer, brain cancer, glioblastoma, liver cancer, bladder cancer, ovarian cancer, testicular cancer, head and neck cancer, throat cancer, skin cancer, melanoma, basal carcinoma, mesothelioma, lymphoma, leukemia, esophageal cancer, breast cancer, rhabdomyosarcoma, sarcoma, lung cancer, small-cell lung carcinoma, non-small-cell lung carcinoma, adrenal cancer, thyroid cancer, renal cancer, bone cancer, neuroendocrine cancer, and choriocarcinoma. In a particular embodiment, the cancer forms a tumor. In a particular embodiment, the cancer is pancreatic cancer. In a particular embodiment, the cancer involves metastases.

The compounds of the instant invention will generally be administered to a patient as a pharmaceutical preparation. The term "patient" as used herein refers to human or animal subjects. These compounds may be employed therapeutically, under the guidance of a physician for the treatment of cancer.

The pharmaceutical preparation comprising the compounds of the invention may be conveniently formulated for administration with an acceptable medium such as water, buffered saline, ethanol, polyol (for example, glycerol, propylene glycol, liquid polyethylene glycol and the like), dimethyl sulfoxide (DMSO), oils, detergents, suspending agents or suitable mixtures thereof. The concentration of the compounds in the chosen medium may be varied and the medium may be chosen based on the desired route of administration of the pharmaceutical preparation. Except insofar as any conventional media or agent is incompatible with the compounds to be administered, its use in the pharmaceutical preparation is contemplated.

The dose and dosage regimen of the compounds according to the invention that is suitable for administration to a particular patient may be determined by a physician considering the patient's age, sex, weight, general medical condition, and the specific condition and severity thereof for which the compound is being administered. The physician may also consider the route of administration of the compound, the pharmaceutical carrier with which the compounds may be combined, and the compounds' biological activity.

Selection of a suitable pharmaceutical preparation depends upon the method of administration chosen. For example, the compounds of the invention may be administered by direct injection into any cancerous tissue or into the surrounding area. In this instance, a pharmaceutical preparation comprises the compounds dispersed in a medium that is compatible with the cancerous tissue.

Compounds may also be administered parenterally by intravenous injection into the blood stream, or by subcutaneous, intramuscular or intraperitoneal injection. Pharmaceutical preparations for parenteral injection are known in the art. If parenteral injection is selected as a method for administering the compounds, steps must be taken to ensure that sufficient amounts of the molecules reach their target cells to exert a biological effect.

Pharmaceutical compositions containing compounds of the present invention as the active ingredient in intimate admixture with a pharmaceutical carrier can be prepared according to conventional pharmaceutical compounding techniques. The carrier may take a wide variety of forms depending on the form of preparation desired for administration. In preparing the compound in oral dosage form, any of the usual pharmaceutical media may be employed, such as, for example, water, glycols, oils, alcohols, flavoring agents, preservatives, coloring agents and the like in the case of oral liquid preparations (such as, for example, suspensions, elixirs and solutions); or carriers such as starches, sugars, diluents, granulating agents, lubricants, binders, disintegrating agents and the like in the case of oral solid preparations (such as, for example, powders, capsules and tablets). Because of their ease in administration, tablets and capsules represent the most advantageous oral dosage unit form in which case solid pharmaceutical carriers are obviously employed. If desired, tablets may be sugar-coated or enteric-coated by standard techniques. For parenterals, the carrier will usually comprise sterile water, though other ingredients, for example, to aid solubility or for preservative purposes, may be included. Injectable suspensions may also be prepared, in which case appropriate liquid carriers, suspending agents and the like may be employed.

A pharmaceutical preparation of the invention may be formulated in dosage unit form for ease of administration and uniformity of dosage. Dosage unit form, as used herein, refers to a physically discrete unit of the pharmaceutical preparation appropriate for the patient undergoing treatment. Each dosage should contain a quantity of active ingredient calculated to produce the desired effect in association with the selected pharmaceutical carrier. Procedures for determining the appropriate dosage unit are well known to those skilled in the art. Dosage units may be proportionately increased or decreased based on the weight of the patient. Appropriate concentrations for alleviation of a particular pathological condition may be determined by dosage concentration curve calculations, as known in the art.

In accordance with the present invention, the appropriate dosage unit for the administration of the compounds of the invention may be determined by evaluating the toxicity of the compounds in animal models. Various concentrations of the compounds of the instant invention may be administered to mice with transplanted human tumors, and the minimal and maximal dosages may be determined based on the results of significant reduction of tumor size and side effects as a result of the treatment. Appropriate dosage unit may also be determined by assessing the efficacy of the compounds in combination with other standard anti-cancer drugs. The dosage units of the compounds may be determined individually or in combination with each anti-cancer treatment according to greater shrinkage and/or reduced growth rate of tumors.

The compositions comprising the compounds of the instant invention may be administered at appropriate intervals, for example, at least twice a day or more until the pathological symptoms are reduced or alleviated, after which the dosage may be reduced to a maintenance level. The appropriate interval in a particular case would normally depend on the condition of the patient.

Definitions

The singular forms "a," "an," and "the" include plural referents unless the context clearly dictates otherwise.

"Pharmaceutically acceptable" indicates approval by a regulatory agency of the Federal or a state government or listed in the U.S. Pharmacopeia or other generally recognized pharmacopeia for use in animals, and more particularly in humans.

A "carrier" refers to, for example, a diluent, adjuvant, preservative (e.g., Thimersol, benzyl alcohol), anti-oxidant (e.g., ascorbic acid, sodium metabisulfite), solubilizer (e.g., polysorbate 80), emulsifier, buffer (e.g., TrisHCl, acetate, phosphate), water, aqueous solutions, oils, bulking substance (e.g., lactose, mannitol), excipient, auxiliary agent or vehicle with which an active agent of the present invention is administered. Water or aqueous saline solutions and aqueous dextrose and glycerol solutions are preferably employed as carriers, particularly for injectable solutions. Suitable pharmaceutical carriers are described in "Remington's Pharmaceutical Sciences" by E. W. Martin (Mack Publishing Co., Easton, PA); Gennaro, A. R., Remington: The Science and Practice of Pharmacy, (Lippincott, Williams and Wilkins); Liberman, et al., Eds., Pharmaceutical Dosage Forms, Marcel Decker, New York, N.Y.; and Kibbe, et al., Eds., Handbook of Pharmaceutical Excipients (3rd Ed.), American Pharmaceutical Association, Washington.

As used herein, the term "subject" refers to an animal, particularly a mammal, particularly a human.

As used herein, the term "prevent" refers to the prophylactic treatment of a subject who is at risk of developing a condition resulting in a decrease in the probability that the subject will develop the condition.

The term "treat" as used herein refers to any type of treatment that imparts a benefit to a patient afflicted with a disease, including improvement in the condition of the patient (e.g., in one or more symptoms), delay in the progression of the condition, etc.

A "therapeutically effective amount" of a compound or a pharmaceutical composition refers to an amount effective to prevent, inhibit, or treat a particular disorder or disease and/or the symptoms thereof.

As used herein, "diagnose" refers to detecting and identifying a disease or disorder in a subject. The term may also encompass assessing or evaluating the disease or disorder status (severity, progression, regression, stabilization, response to treatment, etc.) in a patient known to have the disease or disorder.

As used herein, the term "prognosis" refers to providing information regarding the impact of the presence of a disease or disorder (e.g., as determined by the diagnostic methods of the present invention) on a subject's future health (e.g., expected morbidity or mortality). In other words, the term "prognosis" refers to providing a prediction of the probable course and outcome of a disease/disorder or the likelihood of recovery from the disease/disorder.

As used herein, the term "small molecule" refers to a substance or compound that has a relatively low molecular weight (e.g., less than 4,000, particularly less than 2,000). Typically, small molecules are organic, but are not proteins, polypeptides, or nucleic acids, though they may be amino acids or dipeptides.

As used herein, a "linker" is a chemical moiety comprising a covalent bond or a chain of atoms that covalently attach at least two compounds. The linker can be linked to any synthetically feasible position of the compounds, but preferably in such a manner as to avoid blocking the compounds desired activity. Linkers are generally known in the art. Exemplary linkers may comprise at least one optionally substituted; saturated or unsaturated; linear, branched or cyclic alkyl group or an optionally substituted aryl group. In a particular embodiment, the linker may contain from 0 (i.e., a bond) to about 500 atoms, about 1 to about 100 atoms, or about 1 to about 50 atoms. The linker may also be a polypeptide. The linker may be non-biodegradable under physiological environments or conditions or cannot be cleaved under physiological environments or conditions.

Chemotherapeutic agents are compounds that exhibit anticancer activity and/or are detrimental to a cell (e.g., a toxin). Suitable chemotherapeutic agents include, but are not limited to: toxins (e.g., saporin, ricin, abrin, ethidium bromide, diptheria toxin, and *Pseudomonas* exotoxin); taxanes; alkylating agents (e.g., temozolomide, nitrogen mustards such as chlorambucil, cyclophosphamide, isofamide, mechlorethamine, melphalan, and uracil mustard; aziridines such as thiotepa; methanesulphonate esters such as busulfan; nitroso ureas such as carmustine, lomustine, and streptozocin; platinum complexes (e.g., cisplatin, carboplatin, tetraplatin, ormaplatin, thioplatin, satraplatin, nedaplatin, oxaliplatin, heptaplatin, iproplatin, transplatin, and lobaplatin); bioreductive alkylators such as mitomycin, procarbazine, dacarbazine and altretamine); DNA strand-breakage agents (e.g., bleomycin); topoisomerase II inhibitors (e.g., amsacrine, menogaril, amonafide, dactinomycin, daunorubicin, N,N-dibenzyl daunomycin, ellipticine, daunomycin, pyrazoloacridine, idarubicin, mitoxantrone, m-AMSA, bisantrene, doxorubicin (adriamycin), deoxydoxorubicin, etoposide (VP-16), etoposide phosphate, oxanthrazole, rubidazone, epirubicin, bleomycin, and teniposide); DNA minor groove binding agents (e.g., plicamydin); antimetabolites (e.g., folate antagonists such as methotrexate and trimetrexate); pyrimidine antagonists such as fluorouracil, fluorodeoxyuridine, CB3717, azacitidine, cytarabine, and floxuridine; purine antagonists such as mercaptopurine, 6-thioguanine, fludarabine, pentostatin; asparginase; and ribonucleotide reductase inhibitors such as hydroxyurea); anthracyclines; and tubulin interactive agents (e.g., vincristine, vinblastine, and paclitaxel (Taxol®)).

The following examples are provided to illustrate certain embodiments of the invention. They are not intended to limit the invention in any way.

Example 1

In 2018, it was estimated that pancreatic cancer will be the fourth leading cause of cancer-related death. Currently, pancreatic ductal adenocarcinoma (PDAC) accounts for the bulk (>90%) of clinical occurrences of pancreatic cancer. To date, several radioimmunotherapeutic agents for PDAC have made their way to the clinic and have demonstrated some efficacy in combination with conventional chemotherapeutics (i.e. gemcitabine). However, these long circulating antibodies have also been shown to lead to clinically significant toxicities (i.e., neutropenia and thrombocytopenia) which are dose limiting. Due to this limitation, none of these agents have to date continued on in clinical trials. The utilization of low molecular weight carriers with faster targeting and clearance properties would be one way to substantially reduce non-target toxicities. Indeed, small peptide agents have been developed and FDA approved (i.e., $^{177}$Lu-DOTATATE) for pancreatic neuroendocrine tumors. Unfortunately, few, if any, low molecular weight, receptor-targeted carriers under development can achieve clinically effective therapeutic doses for PDAC largely due to the lack of long-term retention in tumors.

The high incidence of neurotensin receptor(s) in PDAC has been established. There is a clear stratification pattern with substantial upregulation of the neurotensin (NT) receptors in 75% of all PDAC cases and negligible receptor density in all other tissues investigated. The NT family of receptors is composed of three subtypes: NTR1 (NTSR1), NTR2 and NRT3. However, NTR1 is the only receptor present in PDAC samples and is responsible for NT uptake. Notably, NTR1 has also been reported to be overexpressed in breast cancer (e.g., invasive ductal breast cancer), colon cancer, prostate cancer, non-small cell lung cancer, and malignant mesothelioma. Upregulation of NTSR1 receptor expression begins in the pre-invasive pancreatic intraepithelial neoplasms (PanIN) stage, which are precursor lesions, and continues throughout the evolution of the lesion to invasive PDAC and, typically, metastatic dissemination. The majority of NTSR1-targeted agents reported and under development are based on neurotensin (NT), a 13-amino-acid peptide agonist which exhibits nanomolar binding affinity to the NTSR1. The C-terminal portion of NT is responsible for binding to NTSR1 (e.g., NT(8-13) (Glu-Leu-Tyr-Glu-Asn-Lys-Pro-Arg-Arg-Pro-Tyr-Ile-Leu) and NT(6-13) (Lys-Pro-Arg-Arg-Pro-Tyr-Ile-Leu)).

Cysteine cathepsins (CCs) are a family of 11 endolysosomal proteases with a variety of functions, but are primarily attributed to protein catabolism. While some CCs are known to exist extracellularly, the predominant location of these proteases resides in the endolysosomal compartments of the cell. As one, if not the largest, endolysosomal protease families, CC concentrations in these compartments have been estimated to be quite high, approximately 1 mM. In the case of cathepsin B and L, these proteases were found to represent as much as 40% of the total protein content in the endolysosomal compartments. In addition, up-regulation of these proteases have been linked to several diseases, including cancers. Over the last few decades, a variety of irreversible "suicide substrate" inhibitors have been developed including those based on dipeptidyl acyloxymethyl ketones (AOMKs) and epoxide-based inhibitors, which have shown impressive in vitro and in vivo stability and performance. Irreversible inhibitors of CCs generally react with the thiol group of the cysteine in the active site, resulting in an irreversible thioether linkage. Many developed CC inhibitors, such as E-64, are potent (nM inhibition), irreversible and highly-selective for CCs. In vivo studies have shown that these inhibitors are selective and stable in serum.

Materials and Methods

Materials

N,N-dimethylformamide (DMF), dichloromethane (DCM), petroleum ether (PE), methanol, ethyl acetate, acetonitrile, formic acid, acetone, diethyl ether, trifluoroacetic acid (TFA), pyridine, piperidine and N-methylpyrrolidone (NMP) were purchased from Fisher Scientific (Fair Lawn, NJ). Fluorenylmethyloxycarbonnyl (Fmoc)-protected natural amino acids, N-(Carbobenzyloxy)-Lphenylalanine, H-Lys(Boc)-OH, Fmoc-Tle-OH, Fmoc-L-Gly(Propargyl)-OH and N,N-diisopropylethylamine (DIEA) were purchased from Chem-Impex International (Wood Dale, IL). Isobutyl chloroformate (IBCF), 4-methylmorpholine (NMM), hydrobromic acid (48 wt. % in $H_2O$), 2-azidoacetic acid, 1-butanol, ascorbic acid, triethylamine (TEA), Ethylenediaminetetraacetic acid (EDTA) Brij®35 and Diazald® were obtained from Sigma-Aldrich (St Louis, MO). The diazomethane was prepared from Diazald® according to the reported method (Ngan and Toofan (1991) Chromatogr. Sci., 29:8). Potassium fluoride (KF), 2,4,6-Trimethylbenzoic acid, phenethylamine were purchased from Alfa Aesar (Haverhill, MA). Fmoc-DSer-(t-Bu)-OH was purchased from NovaBiochem (Hoherbrunn, Germany). (1-Cyano-2-ethoxy-2-oxoethylidenaminooxy) dimethylamino-morpholino-carbenium hexafluorophosphate (COMU) was purchased from AK Scientific (Union City, CA). Fmoc-Leu-SASRIN™ resin (200-400 mesh), Fmoc-Gly-SASRIN™ resin (200-400 mesh), Z-Phe-Arg-AMC and N-(3-Dimethylaminopropyl)-N'-ethylcarbodiimide hydrochloride (EDC) were obtained from Bachem (Bubendorf, Switzerland). Fmoc-N-Me-Arg(Pbf)-OH was produced by ChemPep. (Wellington, FL). Fmoc-2,6-dimethyl-L-tyrosine (Dmt) was purchased from Key Organics (Camelford, UK). Cyanine5 carboxylic acid (Cy 5) was obtained from Lumiprobe (Hunt Valley, MD). $N_3$-PEG-COOH was purchased from PurePEG (San Diego, CA). DOTA-NHS ester was produced by Macrocyclics (Plano, TX). Lutetium-177 chloride ($^{177}LuCl_3$) was obtained from Oak Ridge National Laboratory (Oak Ridge, TN). CA-074 was purchased from ApexBio (Houston, TX). McCoy's 5A medium (1×; Iwakata & Grace Modification) with L-glutamine was obtained from Mediatech, Inc. (Manassas, VA). Human serum was obtained from MP Biomedicals (Santa Ana, CA). TrypLE Express was obtained from Invitrogen (Grand Island, NY). Penicillin-streptomycin solution and 4-(2-hydroxyethyl)-1-piperazineethanesulfonic acid (HEPES) were procured from HyClone Laboratories, Inc. (Logan, UT). Fetal Bovine Serum (FBS) was purchased from Gibco by Life Technologies Corporation (Grand Island, NY). BD Cytofix Fixation buffer was obtained from BD Biosciences (San Jose, CA). Novex™ Tris-Glycine SDS sample buffer, Pierce™ RIPA buffer, PageRuler™ Prestained protein ladder, Halt™ Protease inhibitor cocktail, LysoTracker™ Green DND-26, NucBlue® Live ReadyProbe®, Goat anti-Rabbit IgG (H+L) Highly Cross-Adsorbed Secondary Antibody (Alexa Fluor 488), Immobilon™-P PVDF transfer membranes, Pierce™ western blotting filter papers, NuPAGE® sample reducing reagent (10×), Tween™ 20, and transfer or electro blotting buffer (10×) were purchased from Thermo Fisher Scientific (Waltham, MA). Cathepsin B (D1C7Y) XP® Rabbit mAb and animal-free blocking solution (5×) were purchased from Cell Signaling Technology (Danvers, MA). Amicon Ultra-4 centrifugal filter (10 kDa) was purchased from Merck Millipore (Burlington, MA). Five weeks old female SCID mice were purchased from Charles River Laboratories. The human colon cancer cell line HT-29 was obtained from American Type Culture Collection and cultured under vendor recommended conditions.

Instrumentation

Peptides were synthesized by solid phase peptide synthesis (SPPS) on a Liberty microwave peptide synthesizer from CEM. A Waters e2695 system equipped with a Waters 2489 absorption detector and a Waters Qtof Micro electrospray ionization mass spectrometer was used to perform high performance liquid chromatography/mass spectrometry analyses. $^1$H-NMR and $^{13}$C-NMR spectrums were recorded on a Bruker Avance-III HD 600 MHz instrument using deuterium oxide as the solvent. A Phenomenex Jupiter C12 Proteo 250×10 mm semi-prep column was used for the purification of bulk amounts of peptides. Evaluation and purification of radiolabeled conjugates were performed on a Waters 1515 binary pump equipped with a Waters 2489 absorption detector and a Bioscan Flow Count radiometric detector system. The Gel Permeation Chromatography (GPC) analysis was carried out in an Agilent PL aquagel-OH MIXED-H Gel column equipped with Radiomatic™ 150TR flow scintillation analyzer. The radioactivity of the cell samples and tissue homogenates was quantified by Multi-Wiper™ multi-well wipe test counter. Gamma decay detection of 177Lu-labeled conjugates for biodistribution studies was accomplished using a NaI (TI) well detector constructed by AlphaSpectra Inc. Fluorescence intensities were measured by a SpectraMax® M5 multimode plate reader. Lab-Tek chambered #1.0 borosilicate coverglass disks (4 well) were used for confocal cell imaging. Confocal microscopy images were taken on a Leica LSM510 META Microscope equipped with an argon laser. The fluorescent images were acquired and quantified on the IVIS® Spectrum in vivo imaging system. Autoradiography was recorded via BAS storage phosphor screens and scanned by GE Lifesciences Typhoon FLA 9500 variable mode imager.

Synthesis of AOMK Electrophiles with Different Linkers

Compound 5 was synthesized as described (Chowdhury, et al. (2014) J. Med. Chem., 57:6092).

Compound 6 was prepared by a published procedure (Edem, et al. (2014) J. Med. Chem., 57:9564) with slight modification. Compound 5 (1.1 g, 2 mmol) and NMM (330 μL, 3 mmol) were dissolved in anhydrous THF (50 mL) and stirred under nitrogen at 0° C. Isobutylchloroformate (IBCF) (400 μL, 3 mmol) in THF (5 ml) was added and the solution was stirred for another 30 minutes. To this mixture at −15° C., a freshly prepared solution of diazomethane (150 mmol) in 200 ml ether was carefully dropped in during 30 minutes and stirred for 2 hours at room temperature. A solution of 47 wt. % HBr and acetic acid (6 ml, v/v=1:2) was added to the yellowish mixture in 5 minutes and stirred for additional 20 minutes at 0° C. Brine (200 ml) was poured into the flask and the organic phase was separated and washed twice with saturated $NaHCO_3$ (100 mL), water (100 mL) and dried over $Na_2SO_4$. The organic layer was evaporated to dryness and was purified by flash column chromatography (silica gel, PE/acetone=10:3) to afford as a yellow powder (1.05 g, 83%). $^1$H-NMR (400 MHz, $CDCl_3$): δ 7.34-7.18 (m, 10H), 6.47 (m, 1H), 5.37 (s, 1H), 5.09 (s, 2H), 4.73 (br s, 1H), 4.65 (br s, 1H), 4.44 (br s, 1H), 3.87 (s, 2H), 3.08 (m, 4H), 1.85 (s, 1H), 1.63 (br s, 1H), 1.55-1.42 (m, 11H), 1.25-1.20 (m, 2H). $^{13}$C-NMR (125 MHz; $CDCl_3$): δ 199.9, 171.1, 156.1, 136.0, 129.3, 128.8, 128.6, 128.3, 128.1, 127.3, 79.3, 67.2, 56.2, 56.1, 39.8, 38.1, 31.8, 30.8, 29.4, 28.4, 22.1. LRMS-ESI (m/z): [M+H]+ calcd. for $C_{29}H_{38}BrN_3O_6H^+$ 604.2, found 604.2.

Compound 7: Compound 6 (750 mg, 1.24 mmol), 2,4,6-trimethylbenzoic acid (225 mg, 1.36 mmol) and KF (215 mg, 3.72 mmol) were suspended in anhydrous DMF (7 ml) under nitrogen at room temperature. The mixture was kept stirring for overnight before adding in water (50 ml). The product was extracted with ethyl acetate (70 ml). The organic layer was washed twice with brine (50 ml) and dried over $Na_2SO_4$. The solvent was removed by rotary evaporation and the product was purified by flash column chromatography (silica gel, PE/acetone=4:1) to give the product as a white powder (744 mg, 87%). $^1$H-NMR (400 MHz, $CDCl_3$): δ 7.32-7.18 (m, 10H), 6.87 (s, 2H), 6.55 (br s, 1H), 5.40 (br s, 1H), 5.06 (s, 2H), 4.90-4.72 (dd, J=47.2, 12.8 Hz, 2H), 4.72 (br s, 1H), 4.63 (m, 1H), 4.46 (m, 1H), 3.09 (d, J=5.2 Hz, 2H), 3.06 (br s, 2H), 2.36 (s, 6H), 2.29 (s, 3H), 1.89 (m, 1H), 1.65-1.60 (m, 2H), 1.42 (s, 10H), 1.25 (m, 2H). $^{13}$C-NM (125 MHz; $CDCl_3$): δ 171.3, 171.0, 170.6, 170.0, 167.2, 74.8, 74.7, 74.2, 61.2, 61.1, 54.6, 53.7, 53.1, 52.5, 41.5, 27.5, 27.4, 27.3. LRMS-ESI (m/z): [M+H]$^+$ calcd. for $C_{39}H_{49}N_3O_8H^+$ 688.4, found 688.3.

Compound 1a: To a solution of compound 7 (500 mg, 0.73 mmol) in DCM (15 mL), TFA (5 mL) was added dropwise at 0° C. The solution was stirred at room temperature for 2 hours. The mixture was concentrated by rotary evaporation to a volume of about 5 ml and precipitated in ice cold ether (45 ml). The solid was collected by filtration, washed three times with cold ether (30 mL) and dried under vacuum for overnight to yield a white powder (407 mg, 95%). $^1$H-NMR (400 MHz, $(CD_3)_2SO$): δ 8.55 (d, J=6.0 Hz, 1H), 7.67 (s, J=6.4 Hz, 1H), 7.35-7.18 (m, 10H), 4.97 (s, 2H), 4.91-4.77 (dd, J=45.2, 13.6 Hz, 2H), 4.37-4.31 (m, 2H), 3.05-3.01 (m, 1H), 2.86-2.81 (m, 1H), 2.74 (d, J=5.6 Hz, 1H), 2.27 (s, 6H), 2.25 (s, 3H), 1.82 (m, 1H), 1.57-1.52 (m, 3H), 1.35-1.31 (m, 2H). $^{13}$C-NMR (125 MHz; $(CD_3)_2SO$): δ 202.6, 172.0, 168.3, 163.0, 155.9, 139.1, 137.7, 136.9, 134.9, 130.0, 129.3, 128.3, 128.2, 128.1, 127.7, 127.6, 127.5, 126.4, 66.6, 65.3, 56.1, 55.6, 38.6, 37.2, 28.8, 26.5, 21.8, 20.7, 19.4, 19.3. LRMS-ESI (m/z): [M+H]+ calcd. for $C_{34}H_{41}N_3O_6H^+$ 588.3, found 588.3.

Compound 8: This compound was obtained by SPPS. Fmoc-Gly-SASRIN™ resin (250 mg, 0.2 mmol) was deprotected by 20% piperidine in DMF (7 mL) to expose the primary amine. Fmoc-D-Ser(t-Bu)-OH (384 mg, 1 mmol) was coupled to the resin in the presence of COMU (428 mg, 1 mmol) and DIEA (180 µl, 2.0 mmol) in DMF (5 mL). This process of deprotection and conjugation was repeated for the further conjugation of Fmoc-D-Ser(t-Bu)-OH (384 mg, 1 mmol) and 2-azidoacetic acid (76 µl, 1 mmol) until the desired peptide was synthesized. Cleavage of the peptide from resin was achieved by shaking the resin with 1% TFA in dry DCM (5×3 mL) for 2 minutes. The filtrates were immediately neutralized with 5% pyridine in methanol (1 mL) and evaporated to dryness which was redissolved in methanol (1 mL) and precipitated in cold water (50 mL) to yield the crude peptides. The peptide was purified by a semipreparative Proteo C12 HPLC column with a 15 minute gradient and a flow rate of 5.0 mL/minute (40%-90% ACN in water containing 0.1% formic acid) to give compound 5 as a white powder (85 mg, 71%). $^1$HNMR (400 MHz, $CDCl_3$): δ 7.69 (d, J=5.2 Hz, 1H), 7.39 (t, J=4.4 Hz, 1H), 7.28 (m, 1H), 7.15 (d, J=6.4 Hz, 1H), 4.56 (dt, J=4.4, 2.0 Hz, 1H), 4.50 (q, J=3.2 Hz, 1H), 4.42 (dt, J=5.2, 3.2 Hz, 1H), 4.13 (m, 1H), 4.05-3.97 (m, 3H), 3.91-3.79 (m, 3H), 3.50-3.43 (m, 3H), 1.25 (s, 9H), 1.22 (s, 9H), 1.18 (s, 9H). $^{13}$C-NMR (125 MHz; $CDCl_3$): δ 171.3, 171.0, 170.6, 170.0, 167.2, 74.8, 74.7, 74.2, 61.2, 61.1, 54.6, 53.7, 53.1, 52.5, 41.5, 27.5, 27.4, 27.3. LRMS-ESI (m/z): [M+H]+ calcd. for $C_{25}H_{45}N_7O_9H^+$ 588.3, found 588.2.

General procedure for synthesis of compounds 9b-9e (FIG. 1A): To a solution of the azido-linker (0.1 mmol) and NHS (17 mg, 0.15 mmol) in DMF (1 mL) was added EDCl (38 mg, 0.2 mmol) at 0° C. The mixture was kept stirring for 2 hours at room temperature after which a solution of compound 1a (50 mg, 85 µmol) and DIEA (54 µL, 0.3 mmol) in DMF (500 µL) and was added at 0° C. The mixture was allowed to warm up to room temperature and was stirred overnight. The crude product was partitioned in ethyl acetate (50 mL) and water (50 mL) and the organic layer was separated and dried over $Na_2SO_4$. The product was concentrated in vacuum and purified by silica gel chromatography.

Compounds 9b: Chromatography solvent system (silica gel, PE/acetone=4:1), white powder (37 mg, 65%). $^1$H-NMR (400 MHz, $CDCl_3$): δ 7.35-7.20 (m, 10H), 6.87 (s, 2H), 6.81 (d, J=5.2 Hz, 1H), 6.49 (br s, 1H), 5.53 (d, J=5.2 Hz, 1H), 5.07 (s, 2H), 4.99-4.73 (dd, J=30.4, 13.6 Hz, 2H), 4.53 (m, 2H), 3.99-3.88 (dd, J=28.8, 13.2 Hz, 1H), 3.36 (m, 1H), 3.24-3.15 (m, 1H), 3.08 (d, J=5.2 Hz, 2H), 2.36 (s, 6H), 2.29 (s, 3H), 1.90-1.88 (m, 1H), 1.72-1.69 (m, 1H), 1.63-1.45 (m, 2H), 1.28 (br s, 2H). $^{13}$C-NMR (125 MHz; $CDCl_3$): δ 201.5, 201.4, 171.5, 169.2, 167.5, 156.0, 139.8, 136.2, 136.0, 129.4, 129.3, 129.2, 128.8, 128.7, 128.6, 128.3, 128.1, 128.0, 127.2, 67.1, 66.4, 56.1, 55.7, 55.4, 52.6, 38.4, 38.0, 29.7, 28.9, 21.5, 21.4, 21.2, 20.0. LRMS-ESI (m/z): [M+H]+ calcd. for $C_{36}H_{42}N_6O_7H^+$ 671.3, found 671.2.

Compounds 9c: Chromatography solvent system (silica gel, PE/acetone=3:1), white powder (34 mg, 53%). $^1$H-NMR (400 MHz, $CDCl_3$): δ 7.34-7.22 (m, 10H), 7.12 (br s, 1H), 7.05 (d, J=5.2 Hz, 1H), 6.86 (s, 2H), 5.67 (d, J=6.0 Hz, 1H), 5.07 (q, J=4.0 Hz, 2H), 4.82 (s, 2H), 4.57 (d, J=5.6 Hz, 1H), 4.48 (br s, 1H), 3.96 (q, J=12.4 Hz, 1H), 3.66-3.61 (m, 12H), 3.87 (s, 2H), 3.37 (t, J=3.6 Hz, 2H), 3.18-3.09 (m, 2H), 2.36 (s, 6H), 2.28 (s, 3H), 1.89 (m, 1H), 1.76 (m, 1H), 1.66-1.51 (m, 2H), 1.31 (br s, 2H). $^{13}$C-NMR (125 MHz; $CDCl_3$): δ 201.7, 171.7, 170.9, 169.1, 155.9, 139.7, 136.4, 136.3, 136.0, 129.6, 129.4, 128.7, 128.5, 128.2, 128.0, 127.1, 71.0, 70.7, 71.5, 70.3, 70.0, 67.0, 66.5, 56.0, 55.9, 50.7, 38.6, 37.2, 29.4, 29.3, 21.5, 21.2, 20.0. LRMS-ESI (m/z): [M+H]+ calcd. for $C_{42}H_{54}N_6O_{10}H+$ 803.4, found 803.1.

Compounds 9e: Chromatography solvent system (silica gel, DCM/methanol=10:1), white powder (55 mg, 56%). $^1$H-NMR (400 MHz, $CDCl_3$): δ 7.69 (d, J=4.4 Hz, 1H), 7.46 (br s, 1H), 7.33-6.98 (m, 12H), 6.98 (d, J=5.2 Hz, 1H), 6.86 (s, 2H), 5.98 (d, J=6.4 Hz, 1H), 5.05 (s, 2H), 4.80 (s, 2H), 4.62-4.57 (m, 2H), 4.56 (br s, 1H), 4.42 (br s, 1H), 4.36 (m, 1H), 3.96 (s, 2H), 3.94-3.77 (m, 6H), 3.51-3.41 (m, 2H), 3.27 (m, 1H), 3.19-3.16 (m, 2H), 3.05 (m, 1H), 1.87 (m, 1H), 1.65 (m, 1H), 1.55-1.49 (m, 2H), 1.31 (m, 2H), 1.24 (s, 9H), 1.21 (s, 9H), 1.13 (s, 9H). $^{13}$C-NMR (125 MHz; CDCl$_3$): δ 201.7, 171.9, 171.0, 170.9, 169.1, 167.3, 156.2, 139.7, 136.3, 135.9, 129.6, 129.4, 128.6, 128.5, 128.1, 128.0, 126.9, 74.8, 74.0, 67.0, 66.6, 61.1, 60.9, 56.1, 56.0, 55.0, 54.7, 53.2, 52.4, 43.3, 38.4, 38.3, 29.8, 27.5, 27.4, 21.4, 21.1, 20.0. LRMS-ESI (m/z): [M+H]+ calcd. for C$_{59}$H$_{84}$N$_{10}$O$_{14}$H+ 1157.6, found 1157.3.

Compound 9d: To a solution of compound 6e (25 mg, 22 μmol) was deprotected with 50% TFA in DCM (200 μL) for 3 hours. The solvent was removed under nitrogen flow. The residue was purified by a semipreparative Proteo C12 HPLC column with a 15 minute gradient and a flow rate of 5.0 mL/minute (50%-80% ACN in water containing 0.1% formic acid) to give compound 6d as a white powder (15 mg, 69%). $^1$HNMR (400 MHz, CDCl$_3$): δ 8.50-8.49 (m, 1H), 8.22 (d, J=6.4 Hz, 1H), 8.18 (d, J=6.0 Hz, 1H), 8.08 (m, 1H), 7.98 (d, J=6.0 Hz, 1H), 7.67-7.63 (m, 2H), 7.33-7.26 (m, 10H), 7.19 (m, 1H), 6.92 (s, 2H), 5.10-5.05 (m, 3H), 4.97 (s, 2H), 4.88-4.81 (dd, J=42.4, 13.2 Hz, 2H), 4.44 (q, J=6.4 Hz, 1H), 4.38-4.33 (m, 3H), 4.25 (q, J=6.4 Hz, 1H), 3.89 (s, 2H), 3.67-3.64 (m, 4H), 3.61-3.58 (m, 4H), 3.04-2.95 (m, 3H), 2.87-2.75 (m, 1H), 2.27 (s, 6H), 2.25 (s, 3H), 1.79 (m, 1H), 1.55 (m, 1H), 1.39 (m, 2H), 1.23 (m, 2H). $^{13}$C-NMR (125 MHz; CDCl$_3$): δ 202.8, 172.2, 170.3, 170.1, 168.5, 168.4, 167.6, 156.0, 139.3, 137.9, 137.1, 135.1, 130.1, 129.4, 128.5, 128.4, 127.9, 127.7, 126.5, 66.8, 65.5, 62.0, 61.6, 56.2, 56.0, 55.6, 55.3, 54.9, 50.7, 42.3, 38.5, 29.2, 28.7, 22.5, 20.8, 19.5. LRMS-ESI (m/z): [M+H]+ calcd. for C$_{47}$H$_{60}$N$_{10}$O$_{14}$H+ 989.4, found 989.3.

Compound 10: To a solution of compound 5 (1.1 g, 2 mmol) in DCM (30 mL), TFA (10 mL) was added dropwise at 0° C. The solution was stirred at room temperature for 2 hours. The mixture was concentrated by rotary evaporation to a volume of about 5 ml and precipitated in ice cold ether (100 ml). The solid was collected by filtration, washed 3 times with cold ether (30 mL), and dried under vacuum. To the deprotected product in methanol (50 mL) was dropped in the solution of CuSO4 (7 mg, 44 μmol) at 0° C. NaHCO$_3$ (672 mg, 8 mmol) and imidazole-1-sulfonyl azide hydrochloride (627 mg, 3 mmol) were added to the mixture, and the pH was adjusted to 9 with 0.1N NaOH. The mixture was stirred for overnight at room temperature before the pH was acidified to 1 using 1N HCl. The product was extracted with ethyl acetate (200 mL), washed twice with brine (100 ml), dried over anhydrous Na$_2$SO$_4$, and concentrated in vacuum. Purification of the crude product by flash column chromatography (silica gel, DCM/methanol=10:1) gave compound 7 as a white powder (707 mg, 78%). $^1$H-NMR (400 MHz, CDCl$_3$): δ 7.30-7.16 (m, 10H), 6.62 (br s, 1H), 5.59 (d, J=5.2 Hz, 1H), 5.06 (dd, J=11.2, 10.0 Hz, 2H), 4.54-4.50 (m, 2H), 3.20 (t, J=5.6 Hz, 2H), 3.06 (s, 2H), 1.85 (m, 1H), 1.66 (m, 1H), 1.53 (m, 2H), 1.26 (br s, 2H). $^{13}$C-NMR (125 MHz; CDCl3): δ 174.9, 171.4, 156.3, 136.0, 129.3, 128.7, 128.6, 128.3, 128.0, 127.2, 67.3, 56.2, 52.1, 51.0, 38.2, 31.4, 28.3, 22.3. LRMS-ESI (m/z): [M+H]+ calcd. for C$_{23}$H$_{27}$N$_5$O$_5$H$^+$ 454.2, found 454.1.

Compound 11: This compound was synthesized by the method for compound 6. The product was purified by flash column chromatography (silica gel, PE/acetone=6:1) to afford as a yellow powder (519 mg, 89%). $^1$H-NMR (400 MHz, CDCl$_3$): δ 7.38-7.17 (m, 10H), 6.32 (d, J=5.6 Hz, 1H), 5.25 (br s, 1H), 5.10 (d, J=2.0 Hz, 2H), 4.76-4.72 (dt, J=10.4, 6.4 Hz, 1H), 4.41 (dt, J=10.8, 5.2 Hz, 1H), 3.85 (d, J=2.0, 2H), 3.22 (t, J=5.2 Hz, 2H), 3.15-3.02 (m, 2H), 1.86 (m, 1H), 1.60-1.48 (m, 3H), 1.26 (m, 2H). $^{13}$C-NMR (125 MHz; CDCl$_3$): δ 199.7, 171.0, 135.9, 129.3, 128.9, 128.6, 128.4, 128.2, 127.4, 67.3, 56.4, 56.0, 51.0, 38.0, 31.7, 30.9, 28.3, 22.4. LRMS-ESI (m/z): [M+H]+ calcd. for C$_{24}$H$_{28}$BrN$_5$O$_4$H$^+$ 530.1, found 530.0.

Compound 9a: This compound was synthesized by the method for compound 7. The product was purified by flash column chromatography (silica gel, PE/acetone=3:1) to afford as a yellow powder (375 mg, 81%). $^1$H-NMR (400 MHz, CDCl$_3$): δ 7.35-7.18 (m, 10H), 6.87 (s, 2H), 6.38 (d, J=4.4 Hz, 1H), 5.25 (br s, 1H), 5.10 (s, 2H), 4.89-4.74 (dd, J=47.2, 13.2 Hz, 2H), 4.54 (m, 1H), 4.43 (d, J=4.8 Hz, 1H), 3.21 (t, J=5.6 Hz, 2H), 3.15-3.04 (m, 2H), 2.36 (s, 6H), 2.29 (s, 3H), 1.92 (m, 1H), 1.58-1.32 (m, 3H), 1.30 (m, 2H). $^{13}$C-NMR (125 MHz; CDCl$_3$): δ 201.2, 171.0, 169.0, 139.9, 136.0, 129.3, 128.9, 128.6, 128.3, 128.1, 127.3, 67.3, 66.3, 56.3, 55.3, 51.0, 38.1, 30.6, 28.4, 22.1, 21.2, 20.0. LRMS-ESI (m/z): [M+H]+ calcd. for C$_{34}$H$_{39}$N$_5$O$_6$H$^+$ 614.3, found 614.2.

Synthesis of Inactive Controls with Different Linkers

Compound 12: To a solution of compound 1 (0.6 g, 1.1 mmol) and NHS (138 mg, 1.2 mmol) in DMF (5 mL) was added EDCl (276 mg, 1.4 mmol) at 0° C. The mixture was kept stirring for 2 hours at room temperature. The solution of phenethylamine (151 μL, 1.2 mmol) and DIEA (522 μL, 3 mmol) in DMF (2 mL) and was added at 0° C. The mixture was allowed to warm up to room temperature and was stirred overnight. Water (50 mL) was poured into the mixture and the crude product was extracted twice with in ethyl acetate (50 mL). The combined organic layer was separated, washed twice with brine (50 mL), and dried over Na$_2$SO$_4$. The product was concentrated and purified by flash column chromatography (silica gel, PE/acetone=5:1) to give the product as a white powder (596 mg, 86%). $^1$H-NMR (400 MHz, CDCl$_3$): δ 7.36-6.14 (m, 15H), 6.34 (d, J=6.0 Hz, 1H), 6.05 (br s, 1H), 5.31 (br s, 1H), 5.07 (s, 2H), 4.62 (br s, 1H), 4.39 (d, J=5.2 Hz, 1H), 4.26 (d, J=4.8 Hz, 1H), 3.50-3.39 (m, 2H), 3.06-3.03 (m, 4H), 2.78 (d, J=5.6 Hz, 2H), 1.78 (m, 1H), 1.49 (m, 1H), 1.52-1.34 (m, 11H), 1.01 (br s, 2H). $^{13}$C-NMR (125 MHz; CDCl$_3$): δ 170.9, 170.7, 156.1, 138.7, 136.0, 129.2, 128.8, 128.7, 128.6, 128.5, 128.3, 128.1, 128.0, 127.2, 126.6, 67.3, 56.4, 53.1, 40.7, 35.5, 31.5, 29.4, 28.5, 22.5. LRMS-ESI (m/z): [M+H]+ calcd. for C$_{36}$H$_{46}$N$_4$O$_6$H$^+$ 631.3, found 631.3.

Compound 1b: The deprotection of compound 12 was carried out according to the same method for compound 1a. The product was recovered in cold ether and obtained as a white solid (314 mg, 93%). $^1$H-NMR (400 MHz, (CD$_3$)$_2$SO): δ 8.11-7.94 (dd, J=64.4, 6.4 Hz, 1H), 7.95 (s, 1H), 7.67-7.52 (dd, J=54.4, 6.0 Hz, 1H), 7.33-7.20 (m, 15H), 5.95 (d, J=10.4 Hz, 2H), 4.29 (br s, 1H), 4.20-4.11 (dd, J=32.8, 4.4 Hz, 1H), 3.31-3.27 (m, 2H), 3.01-2.91 (m, 1H), 2.81-2.66 (m, 5H), 1.57-1.41 (m, 3H), 1.23 (s, 1H), 1.02 (br s, 2H). $^{13}$C-NMR (125 MHz; (CD$_3$)$_2$SO): δ 171.3, 171.1, 171.0, 156.0, 155.8, 139.3, 139.2, 138.0, 137.7, 137.0, 136.9, 129.3, 129.2, 128.7, 128.6, 128.3, 128.0, 127.7, 127.4, 127.3, 126.3, 126.1, 65.3, 65.2, 56.3, 56.1, 52.4, 52.2, 48.6, 38.8, 38.7, 37.5, 35.0, 31.7, 31.2, 27.0, 26.9, 22.1, 22.0. LRMS-ESI (m/z): [M+H]+ calcd. for C$_{31}$H$_{38}$N$_4$O$_4$H$^+$ 531.3, found 531.2.

Figure 1B:
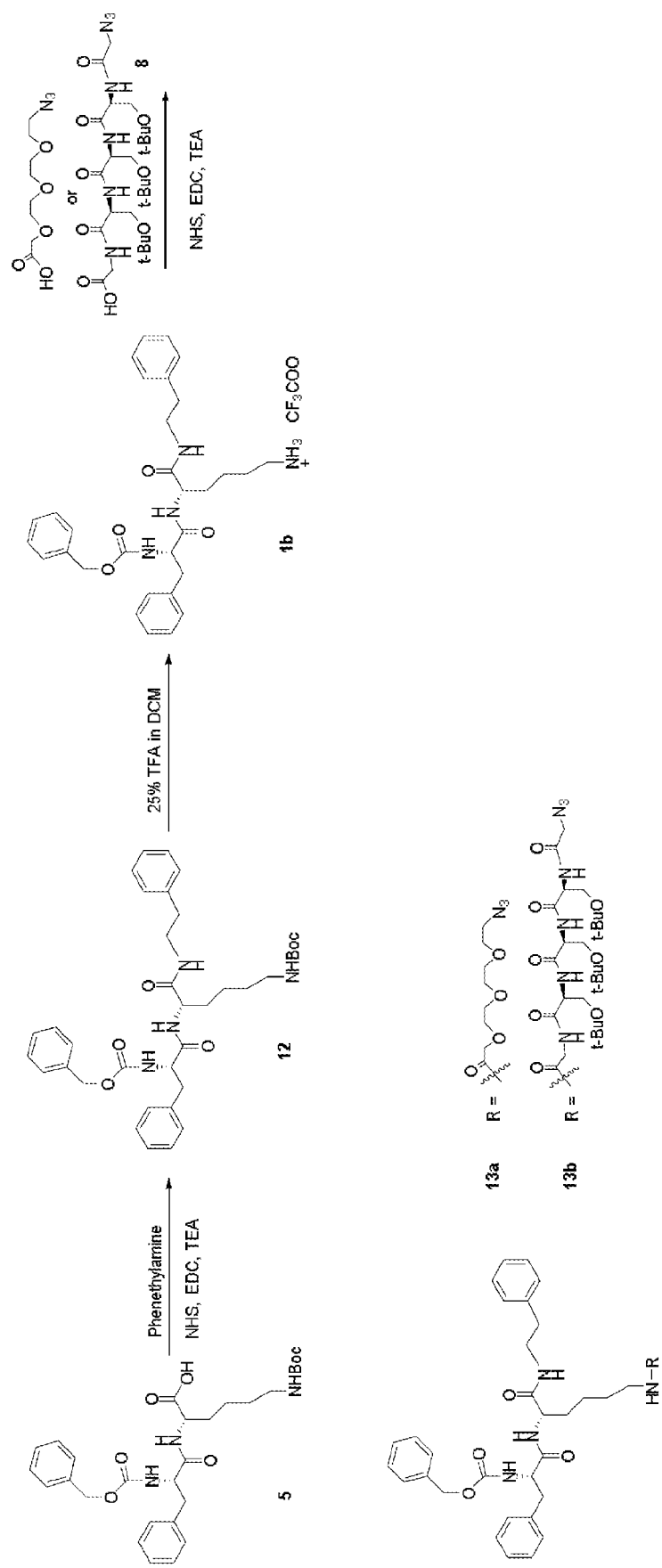
FIG. 1B provides a schematic of the synthesis of compounds 13a-13e.

Synthesis of compounds 13a and 13b is shown in FIG. 1B. Compound 13a: This compound was synthesized according to the method for compound 9a-9c. The product was purified by flash column chromatography (silica gel, PE/acetone=4:1), white powder (45 mg, 34%). $^1$H-NMR (400 MHz, CDCl$_3$): δ 7.34-7.11 (m, 15H), 7.10 (t, J=4.8 Hz, 1H), 6.82 (d, J=5.6 Hz, 1H), 6.18 (br s, 1H), 5.63 (d, J=2.8 Hz, 1H), 5.05 (q, J=6.0 Hz, 2H), 4.49 (d, J=5.6 Hz, 1H), 4.21 (br s, 1H), 3.95 (q, J=6.4 Hz, 2H), 3.66-3.61 (m, 12H), 3.42 (m, 2H), 3.37 (t, J=4.0 Hz, 2H), 3.15-3.06 (m, 2H), 3.04-2.74 (dt, J=118, 4.8 Hz, 2H), 1.82 (m, 1H), 1.70 (m, 1H), 1.51-1.45 (m, 2H), 1.23-1.19 (m, 2H). $^{13}$C NMR (125 MHz; CDCl$_3$): δ 171.6, 171.0, 170.8, 156.1, 138.9, 136.4, 136.2, 129.3, 128.8, 128.7, 128.6, 128.5, 128.3, 128.2, 128.0, 127.1, 126.5, 71.0, 70.7, 70.5, 70.4, 70.3, 70.2, 70.1, 67.0, 56.2, 53.4, 50.7, 40.8, 38.4, 37.3, 35.6, 30.2, 29.3, 29.2, 22.1, 21.9. LRMS-ESI (m/z): [M+H]+ calcd. for C$_{39}$H$_{51}$N$_7$O$_8$H$^+$ 746.4, found 746.2.

Compound 13b: This compound was synthesized according to the method for compound 9a-9c. The product was purified by flash column chromatography (silica gel, DCM/methanol=10:1), white powder (79 mg, 30%). $^1$H-NMR (400 MHz, CDCl$_3$): δ 8.21 (d, J=6.4 Hz, 1H), 8.01-7.97 (m, 2H), 7.91 (br s, 1H), 7.86 (d, J=6.0 Hz, 1H), 7.62 (m, 1H), 7.48 (d, J=6.8 Hz, 1H), 7.32-7.19 (m, 15H), 4.94 (s, 2H), 4.44 (q, J=6.0 Hz, 1H), 4.39 (q, J=6.4 Hz, 1H), 4.34-4.25 (m, 2H), 4.17 (m, 1H), 3.87 (s, 1H), 3.68 (d, J=4.0 Hz, 1H), 3.52-3.43 (m, 6H), 3.25 (m, 2H), 3.01-2.92 (m, 3H), 2.75 (m, 1H), 2.70 (t, J=6.4 Hz, 2H), 1.62-1.42 (m, 2H), 1.36 (m, 2H), 1.19 (m, 2H), 1.11-1.05 (m, 27H). $^{13}$C-NMR (125 MHz; CDCl$_3$): δ 171.2, 169.5, 169.3, 168.0, 167.4, 155.8, 139.3, 137.0, 129.2, 128.6, 128.3, 128.0, 127.6, 127.4, 126.2, 126.0, 73.1, 73.0, 65.2, 61.7, 61.6, 53.5, 53.1, 52.5, 50.6, 42.1, 38.5, 37.4, 35.0, 28.9, 27.1, 22.6. LRMS-ESI (m/z): [M+H]+ calcd. for C$_{56}$H$_{81}$N$_{11}$O$_{12}$H+ 1100.6, found 1100.6.

Synthesis of AOMK-Neurotensin Peptide Conjugates

Figure 1C:
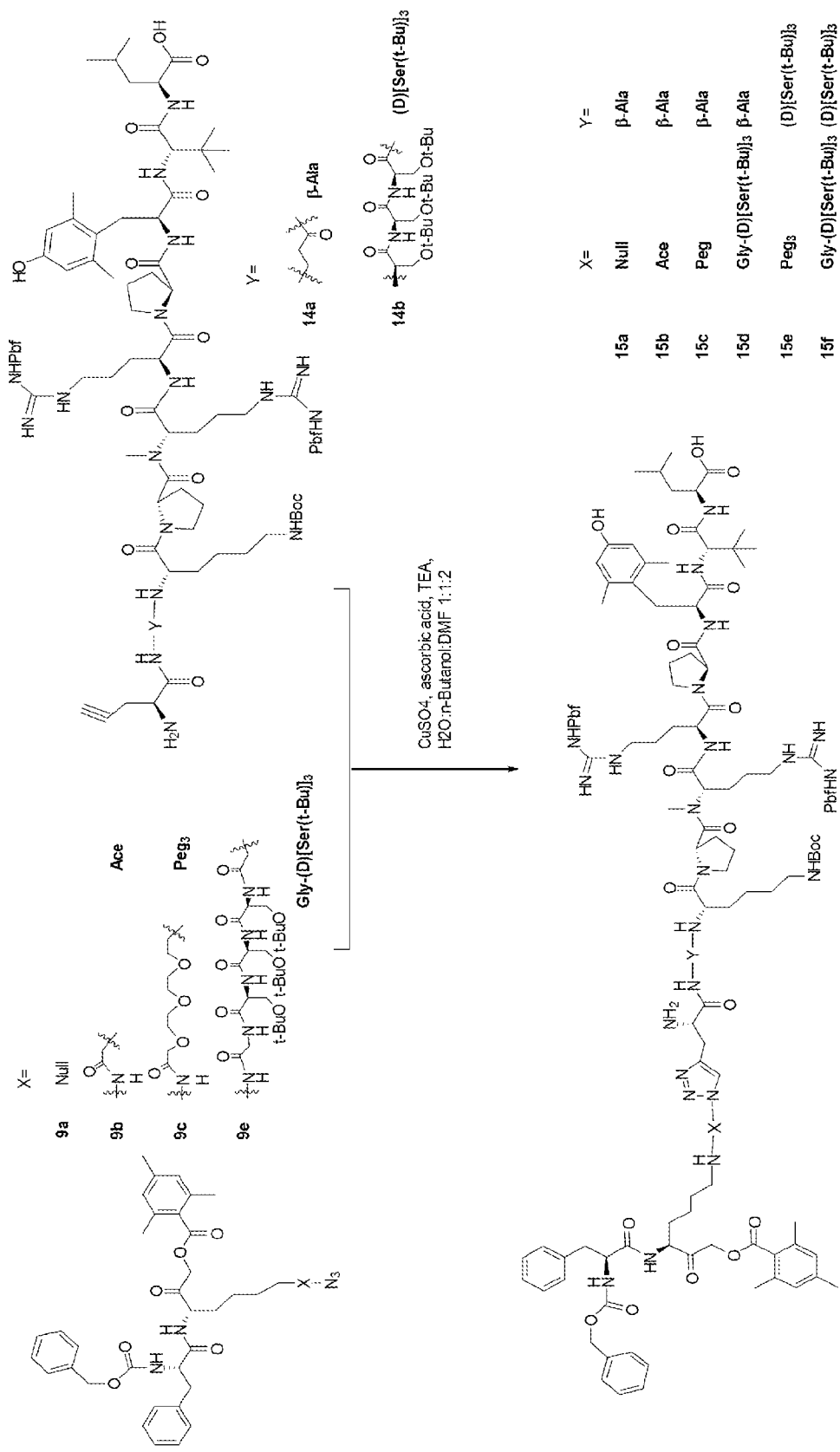
FIGS. 1C and 1D provide a schematic of the synthesis of compounds 2a-2f.
Figure 1D:
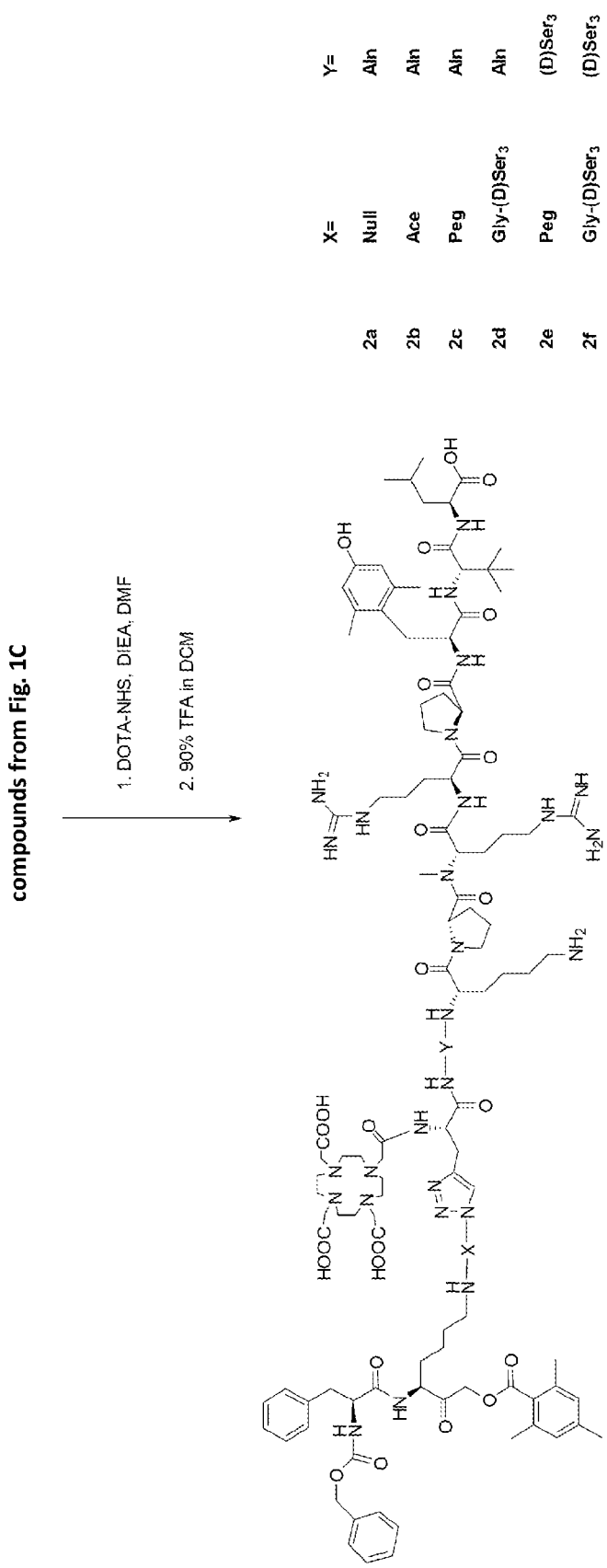

General procedure for synthesis of peptides 14a and 14b (FIGS. 1C and 1D): The peptides were obtained by SPPS. Briefly, Fmoc-Leu-SASRIN™ resin (150 mg, 0.1 mmol) was deprotected by 20% piperidine in DMF (7 mL) to expose the primary amine. Fmoc-L-Tle-OH (177 mg, 0.5 mmol) was coupled to the resin in the presence of COMU (214 mg, 0.5 mmol) and DIEA (90 μl, 1 mmol) in DMF (5 mL). This process of deprotection and conjugation was repeated until the desired peptide was synthesized. Cleavage of the peptide from resin was achieved by shaking the resin with 1% TFA in dry DCM (5×3 mL) for 2 minutes. The filtrates were immediately neutralized with 5% pyridine in methanol (1 mL) and evaporated to dryness which was redissolved in methanol (1 mL) and precipitated in cold water (50 mL) to yield the crude peptides. The peptides were purified by a semi-preparative Proteo C12 HPLC column with a 15 minute gradient and a flow rate of 5.0 mL/minute to give the target peptides.

General procedure for synthesis of compounds 15a-15f: To the mixture of compound 14 (2 μmol) and compound 9 (5 μmol) in water/n-butanol/DMF (200 μL, v/v/v=1:1:2) was added CuSO$_4$ (200 μg, 1.25 μmol) in water (50 μL). After stirring for 5 minutes, a solution of ascorbic acid (1 mg, 6 μmol) in water (50 μL) was added to the mixture. The reaction mixture was stirred for 1 hour at room temperature under nitrogen. The product was obtained by the purification via a semi-preparative Proteo C12 HPLC column with a 15 minute gradient and a flow rate of 5.0 mL/minute to give the target compound.

General procedure for synthesis of compounds 2a-2f: Compound 15 (1 μmol) and DOTA-NHS ester (2.3 mg, 3 μmol) were dissolved in DMF (5 mL). The solution was basified with DIEA (0.081 mL, 0.47 mmol) and stirred at room temperature for overnight. The completion of the conjugation reaction was confirmed by HPLC before the removal of the solvent under nitrogen flow. A 90% TFA in DCM (300 μL) solution was added and the mixture was stirred at room temperature for 5 hours under nitrogen. The solvent was removed by nitrogen flow and the residue was redissolved in DMF (300 μL) for the purification via a semi-preparative Proteo C12 HPLC column with a 15 minute gradient and a flow rate of 5.0 mL/minute to give the target compound.

Synthesis of Control Neurotensin Peptide Conjugates

General procedure for synthesis of compounds 16a and 16b: These compounds were obtained according to the procedure for synthesizing 15a-15f. The product was purified by the same HPLC system with a 15 minute gradient and a flow rate of 5.0 mL/minute to give the target compound.

Figure 1E:
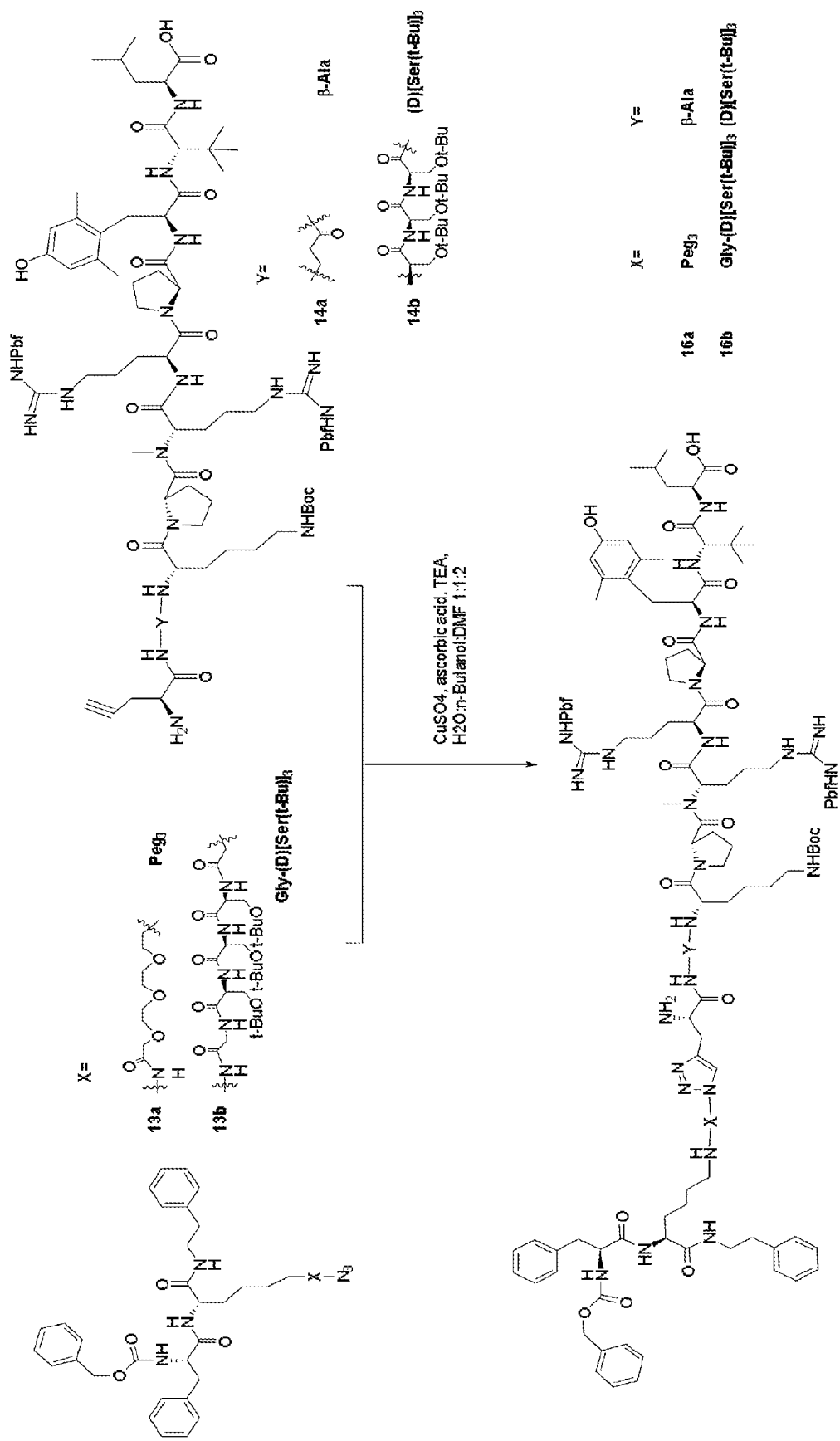
FIGS. 1E and 1F provide a schematic of the synthesis of compounds 3a-3b.
Figure 1F:
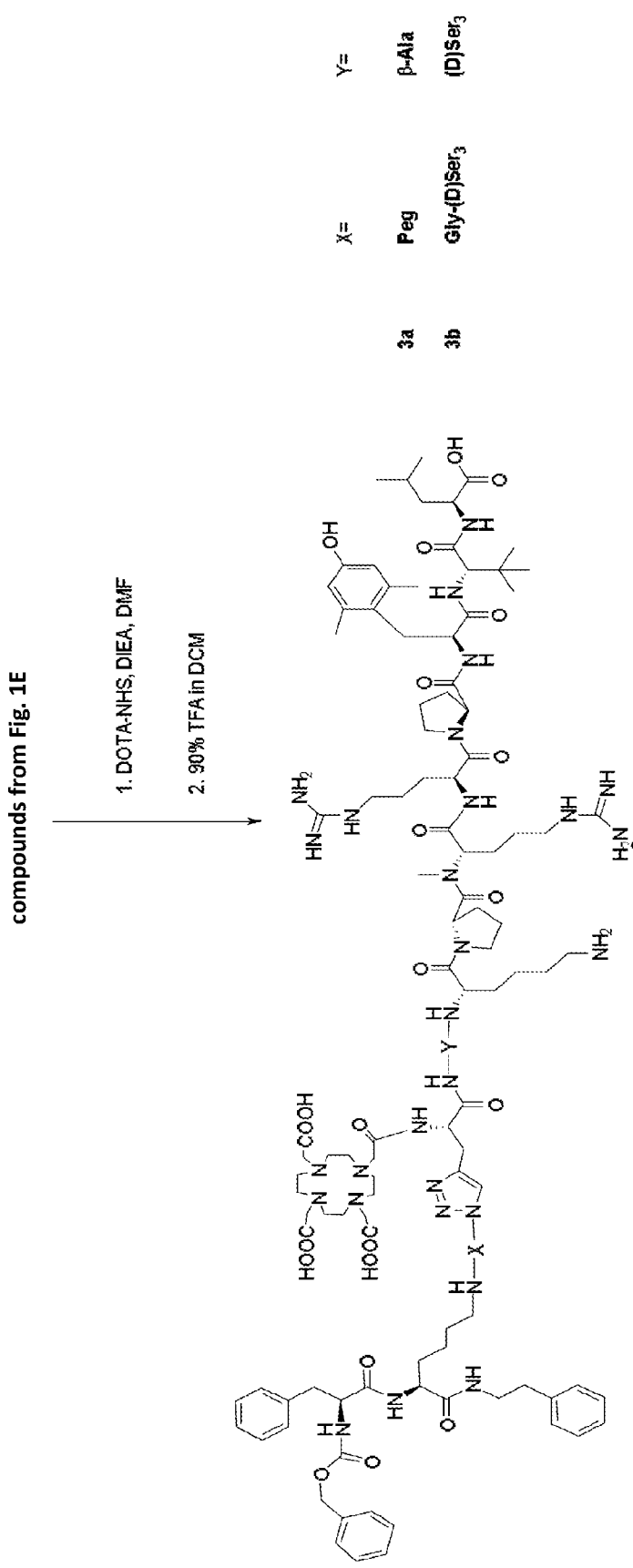

General procedure for synthesis of compounds 3a and 3b (FIGS. 1E and 1F): These compounds were obtained according to the procedure for synthesizing 2a-2f. The product was purified by the same HPLC system with a 15 minute gradient and a flow rate of 5.0 mL/minute to give the target compound.

Synthesis of Cy5 Labeled Neurotensin Peptide Conjugates

Figure 1G:
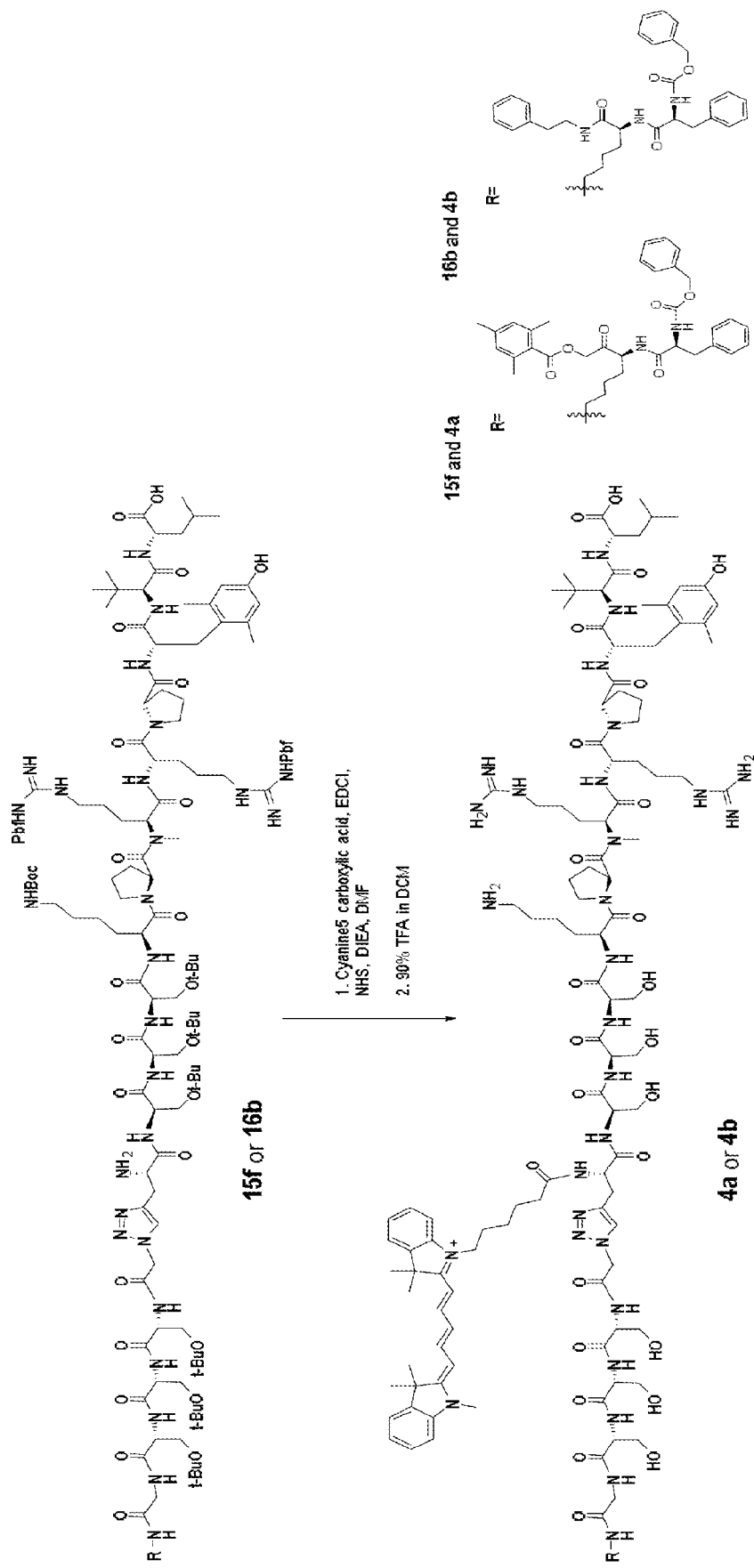
FIG. 1G provides a schematic of the synthesis of compounds 4a-4e.

General procedure for synthesis of compounds 4a and 4b (FIG. 1G): To the solution of Cyanine 5 carboxylic acid (1.6 mg, 3 μmol) and NHS (1 mg, 9 μmol) in 50 μL of DMF was added EDCl (2 mg, 10 μmol). The mixture was stirred at room temperature for 2 hours and was added to the solution of 15f or 16b (1 μmol) and DIEA (5 μL, 28 μmol) in DMF (100 μL) which was stirred for overnight in the dark at room temperature. The solvent was removed by nitrogen flow before adding in a 90% TFA in DCM (200 μL) solution. After 3 hours of stirring, the mixture was concentrated to dryness and dissolved in DMF (300 μL) for the purification by a semi-preparative Proteo C12 HPLC column with a 15 minute gradient and a flow rate of 5.0 mL/minute to give the target compound.

General Procedure for the Radiolabeling of the Conjugates with $^{177}$LuCl$_3$

An aliquot of the conjugate (50 μg) in 0.5 M ammonium acetate buffer (pH 5.5, 100 μL) was mixed with a predetermined amount of $^{177}$LuCl$_3$ (37 MBq (1 mCi)) and incubated at 90° C. for 60 minutes. Subsequently, CoCl$_2$ (5 mg, 38.5 μmol) was added and incubated for 5 minutes at 90° C. in order to complex to the unlabeled conjugate and enhance separation. The mixture was purified by HPLC system and the radiolabeling efficiency (RE) was calculated based on the analysis of the chromatograms. To remove organic eluent, the radioactive conjugate was loaded onto an Empore (Eagan, MN) C18 high-performance extraction cartridge followed by washing with water (3×3 mL) and elution by ethanol/saline solution (v/v=6:4, 200 μL) to obtain the $^{177}$Lu-labeled radioconjugate for further biological experiments.

Distribution Coefficient (Log D$_{7.4}$) of the Conjugates

The distribution coefficient was determined for each $^{177}$Lu-labeled conjugate. In a 1.5 mL centrifuge tube, 0.5 mL of 1-octanol was added to 0.5 mL of PBS (pH 7.4) containing the radiolabeled peptide (500,000 cpm). The solution was vigorously vortexed for 2 minutes at room temperature and subsequently centrifuged to yield two immiscible layers. The radioactivity of the aliquots (100 μL) taken from each layer were quantified by the gamma counter and the Log D$_{7.4}$ for each conjugates was calculated.

In Vitro Competitive Neurotensin Receptor Binding Studies

The IC$_{50}$ for the unlabeled conjugates binding to the neurotensin receptors was determined using the HT-29 human colon cancer cell line. In these studies, $^{177}$Lu-N1 ($^{177}$Lu-DOTA-β-Ala-[N-α-Me$^8$, Dmt$^{11}$, Tle$^{12}$]NT(6-13)), which was synthesized according to published methods (Jia, et al. (2015) Nucl. Med. Biol., 42:816), served as the competitive radioligand for comparing the relative binding affinities of the conjugates. HT-29 cells (~1×10⁶) suspended in 100 μL of McCoy's 5A medium (pH 7.4, 4.8 mg/mL HEPES, and 2 mg/mL BSA) were incubated with 177Lu-N1 (100,000 cpm, 100 μL) at 37° C. for 45 minutes in the presence of the conjugates with predetermined concentrations (0.5 nM-1 μM) in 100 μL of medium. At the end of the incubation, the cells were centrifuged, aspirated, and washed with fresh medium (5×500 μL). The cell-associated radioactivity was measured using gamma counter and the $IC_{50}$ values determined by nonlinear regression using GraphPad Prism 5. All measurements were in biological triplicate.

The Inhibition of Cathepsin B Activity by the Conjugates

The phosphate buffer (0.1 M, pH=5.8) containing EDTA (1 mM), DTT (2.7 mM), and Brij®35 (0.03%) was prepared before the assay. The solution of Z-Arg-Arg-AMC in the assay buffer (50 μL, 1.3 mM) was mixed with the conjugate dissolved in assay buffer at predetermined concentrations (100 μL, 0.2 nM-40 μM). The solution of cathepsin B (human Liver) in assay buffer (50 μL, 0.544 nM) was added to the mixture which was further incubated at 37° C. for 20 minutes. The fluorescence of the liberated aminomethylcoumarin at 460 nM using 355 nM excitation was measured and the $IC_{50}$ of the cathepsin B inhibition versus the samples without the inhibitor was determined by nonlinear regression using GraphPad Prism 5.

Determination of the $K_m$ and $V_{max}$ of Cathepsin B for Z-Arg-Arg-AMC

The solution of cathepsin B (human Liver) (50 μL, 2 nM) in assay buffer used above was mixed with 50 μL of solution of substrate Z-Arg-Arg-AMC in the assay buffer at different concentrations ([S]) (25 μM, 50 μM, 100 μM, 500 μM and 1 mM). The mixture was incubated at 37° C. and the fluorescence of the liberated aminomethylcoumarin at 460 nM using 355 nM excitation was measured at predetermined time points (0, 2, 4, 6, 8, and 10 minutes). The fluorescence intensity was plotted versus time and the reaction rates ($v_0$) were calculated as the slope of the trend lines obtained by liner regression. $K_m$ and maximum reaction rate ($V_{max-obs}$) was determined from the equation $v_0=V_{max}[S]/(K_m+[S])$ and solved by nonlinear regression using GraphPad Prism 5. All measurements were in biological triplicate.

Determination of the Inhibition Constant (Ki) of the Compounds to Cathepsin B

The cathepsin B (human Liver) in assay buffer (25 μL) was mixed with the conjugate (25 μL) in 96-well plate. After the solution was mixed, the Z-Arg-Arg-AMC in assay buffer (50 μL) was added to the well, yielding a final cathepsin B concentration of 1 nM, conjugate concentration ([C]) of 15 nM or 5 μM, and substrate concentration ([S]) of 25 μM, 50 μM, 100 μM, 500 μM and 1 mM. The mixture was incubated at 37° C. and the fluorescence of the liberated aminomethylcoumarin at 460 nM using 355 nM excitation was measured at predetermined time points (0, 2, 4, 6, 8, and 10 minutes). The fluorescence intensity was plotted versus time with observed reaction rates ($v_{0-obs}$) calculated as the slope of the trend lines obtained by liner regression. The observed rate constant ($K_{obs}$) and observed maximum reaction rate ($V_{max-obs}$) was determined from the equation $v_{0-obs}=V_{max-obs}[S]/(K_{obs}+[S])$ and solved by nonlinear regression using GraphPad Prism 5. The $K_i$ was calculated from the equation $K_{obs}=K_m(1+[C]/K_i)$. All measurements were in biological triplicate.

Cell Internalization Studies

HT-29 cells (~1×10⁶) suspended in cell culture medium (100 μL) were incubated with each ¹⁷⁷Lu radioconjugate (100 000 cpm) at 37° C. for 4 hours. At 15, 30, 60, 120 and 240 minute time points, the culture medium was removed and the cells were washed with fresh medium (5×500 μL) to remove the unbound conjugates. The fraction of surface-bound radioactivity was removed by washing the cells twice with an acidic buffer (200 μL, 50 mM glycine-HCl/0.1 M NaCl buffer, pH 2.8). The amount of radioactivity remaining in each cellular pellet was assigned as the internalized fraction. The radioactivity for each fraction was measured by gamma counter. The cellular uptake of the radioconjugates were presented as a percentages of the surface-bound and internalized radioactivity relative to the total activity added to the tube.

The HT-29 Cell Efflux Studies

The ¹⁷⁷Lu radioconjugate was added to a sterilized 1.5 mL microcentrifuge tube containing HT-29 cells ~1×10⁶) suspended in 300 μL of cell culture medium, yielding a final radioactivity concentration of 100,000 cpm/100 μL, and was incubated for 2 hours at 37° C. After the removal of the culture medium, the cells were washed with fresh medium (5×500 μL) followed by the addition of 500 μL of fresh medium for the efflux assay. At 0, 1, 2, 4, 8, and 24 hour time interval, fresh medium (500 μL) was added to the tube to replace the old medium which was harvested for quantitative analysis of the effluxed radioactivity using a gamma counter. The cells were lysed with a 10% aqueous SDS solution at 24 hour to quantify the remaining internalized radioactivity. The effluxed fraction is expressed as a percentage of the total radioactivity added to the tube, which is the sum of the effluxed and internalized fractions obtained from the study.

The Uptake and Cell Trafficking Studies of the Cy 5 Labelled Conjugates

The HT-29 cells (1.25×10⁵/well) in Lab-Tek chambered #1.0 borosilicate coverglass disk (four-well) were pre-incubated with the medium (500 μL) with (blocking) or without nerotensin peptide N1 (10 μM) at 37° C. for 2 hours. The conjugate was added to the wells to a concentration of 5 μM and incubated for 2 and 12 hours. For the last hour, LysoTracker™-green (100 nM) was added to the cells. DAPI was added in the media (15 μg/ml) to stain the nuclei for 5 min prior to imaging. The cells were washed with PBS (400 μL) and fixed with formaldehyde (400 μL) prior to imaging. The images were obtained using an excitation wavelength of 405 nm (blueexcitation), 488 nm (green excitation) and 646 nm (red excitation). ImageJ software was used for the quantifying the fluorescence of Cy5 and the colocalization efficiency. Mean pixel intensities in each image were normalized to the total cell number by counting the number of DAPI-labeled nuclei.

The Cell Trapping Studies of the Cy 5 Labelled Conjugates

The HT-29 cells (1.25×10⁵/well) in Lab-Tek chambered #1.0 borosilicate coverglass disk (four-well) were incubated with the conjugate (5 μM) in 500 μL of medium for 4 hours. The cells were washed with fresh medium and cultured for up to 24 hours. At 2 and 22 hour time points, LysoTracker™-green (100 nM) was added to the cells and incubated for 2 hours. DAPI was added in the media (15 μg/ml) to stain the nuclei for 5 minutes. The cells were washed with PBS (400 μL) and fixed with formaldehyde (400 μL) prior to imaging. The images were obtained using an excitation wavelength of 405 nm (blue excitation), 488 nm (green excitation), and 646 nm (red excitation). ImageJ software was used for the quantifying the fluorescence of Cy5 and the co-localization efficiency. Mean pixel intensities in each image were normalized to the total cell number by counting the number of DAPI-labeled nuclei. The analysis was performed in 6 random images.

Competitive Cathepsin B Binding of the Radioconjugates with CA-074 and NTR1 Ligand N1

The cathepsin B (human Liver)(3 nM, 10 µL) in storing buffer (50 mM sodium acetate and 1 mM EDTA, pH 5.0) was pre-incubated with the commercial cysteine proteases inhibitor CA-074 (10 µM, 10 µL) or NTR1 ligand N1 (20 µM, 10 µL) for 30 minutes. Then the solution of radioconjugate (500,000 cpm) in 30 µL of binding assay buffer (5 mM Tris, 5 mM $MgCl_2$, and 2 mM DTT, pH=5.5) was added to the mixture and incubated on ice for 2 hours. Aliquot (30 µL) of the solution was mixed with Novex Tris-Glycine SDS sample buffer (2×) (30 µL) and incubated for further 10 minutes. The mixtures (20 µL) were loaded onto a Novex 16% tris-glycine gel and analyzed by SDS-PAGE at 110 V for 90 minutes. After shaking in shrinking buffer (50 mL, 65% methanol, and 0.5% glycerol in water) at 4° C. for overnight, the gel was dried for 6 hours at room temperature and the ladders were painted with small amount of radioactivity. The gel was then exposed to a phosphor plate for 72 hours which was subsequently scanned by a Typhoon FLA 9500 imaging system at a 25 µm resolution to achieve the autoradiograph.

Cathepsin B Binding of the Radioconjugates

This procedure uses the same solutions as described above. The cathepsin B (human Liver)(3 nM, 10 µL) in storing buffer was added to the solution of the radioconjugate (500,000 cpm) in 40 µL of binding assay buffer and kept on ice for 2 hours. An aliquot (25 µL) of the solution was mixed with Novex Tris-Glycine SDS sample buffer (2×) (25 µL) and incubated for a further 10 minutes. The mixtures (20 µL) were loaded onto a Novex 16% tris-glycine gel and analyzed by SDS-PAGE at 110 V for 90 minutes. The autoradiograph of the SDS-PAGE was performed as described above.

Intracellular Trapping of the Radioconjugates in Living HT-29 Cells

To the HT-29 cells ($1 \times 10^6$/well) seeded in 6-well plates was added the radioconjugates (0.74 MBq, 20 µCi) in 1 mL of cell culture medium. The cells were incubated at 37° C. for 4 hours and the medium was removed by vacuum followed washing with PBS (2×2 mL). The cells (~$3 \times 10^6$) were trypsinized and combined in microcentrifuge. The RIPA buffer (100 µL) containing Halttm protease inhibitor (100×, 1 µL) was added to the cell pellet and vigorously vortexed for 1 minute. The suspension was incubated on ice for 15 minutes and centrifuged to remove the pellet. The supernatant (80 µL) was equally divided into two portions. The first portion (40 µL) was directly analyzed by radioactive-GPC with a flow rate of 0.6 mL/minute (40% ACN in PBS containing 0.1% sodium azide). The second portion (40 µL) of the cell lysate was mixed with Novex Tris-Glycine SDS sample buffer (2×) (40 µL) and incubated for another 15 minutes. The mixture (30 µL) was loaded onto a Novex 16% tris-glycine gel and analyzed by SDS-PAGE at 110 V for 90 minutes. The autoradiograph of the SDS-PAGE was performed as described above.

Competitive Intracellular Cathepsin B Binding of the Radioconjugates with NTR1 Ligand N1

To the HT-29 cells ($1 \times 10^6$/well) seeded in 6-well plates was added the radioconjugates (0.74 MBq, 20 µCi) in 1 mL of cell culture medium with or without competitive NTSR1 ligand N1 (20 µM). The cells were incubated at 37° C. for 4 hours and the medium was removed by vacuum followed washing with PBS (2×2 mL). The cells were lysed and the autoradiograph of the SDS-PAGE was performed as described above.

Investigation of the Time-Dependent Retention of CatB-Conjugate Adducts in HT-29 Cells To the HT-29 cells ($1 \times 10^6$/well) seeded in 6-well plates was added the radioconjugate (0.74 MBq, 20 µCi) in 1 mL of cell culture medium. The cells were incubated at 37° C. for 4 hours and the medium was removed by vacuum followed washing with fresh medium (2×2 mL). The fresh medium (1 mL) was added to the wells and the cells were lysed at 2 hours, 4 hours, and 24 hours. The autoradiograph of the SDS-PAGE was performed as described above.

The Metabolic Stability of the Radioconjugates in Human Serum

The radioconjugates (11.1 MBq, 300 µCi) was added to 300 µL human serum and incubated at 37° C. for 24 hours. At predetermined time points (0, 4, and 24 hours), acetonitrile (50 µL) was added to the mixture (50 µL) was centrifuged at 12,000×g for 5 minutes. The supernatant was collected and dried with nitrogen flow. The sample was reconstituted in water (100 µL) and analyzed by radio-HPLC using the gradient described above.

Biodistribution Study

Female SCID mice (5 weeks of age) received subcutaneous injections of HT-29 cells ($5 \times 10^6$) suspended in Matrigel® into the flanks. When the tumor size reached 80 $mm^3$ (two weeks after injection), the mice were randomized into three groups and intravenously injected with 10 µCi (0.37 MBq) of the purified $^{177}$Lu labeled conjugates via tail vein. The mice were sacrificed and the tissues were excised at 4, 24, and 72 hours post-injection time points. The blood, tumor, and excised tissues were weighed. The radioactivity for each sample was measured using a gamma counter. The percentage injected dose per gram (% ID/g) and the radioactivity ratios between tumor and non-targeted tissues were calculated.

Evaluation of Tissue Adduct Formation of the Radioconjugates

The radioconjugates (800 µCi/mouse) were intravenously injected to the tumor bearing mice. The mice were sacrificed and the tumor, liver, and kidney were excised at 24 and 72 hours post-injection time points. The tumor and organs were homogenized in RIPA buffer (50 mg/100 µL) containing Halt™ protease inhibitor (100×, 1 µL) on ice and centrifuged to remove the pellet. An aliquot (20 µL) of the supernatant of the sample at 24 hours was mixed with Novex Tris-Glycine SDS sample buffer (2×, 20 µL) and incubated for further 10 minutes. The mixtures (20 µL) were loaded onto a Novex 16% tris-glycine gel and analyzed by SDS-PAGE at 110 V for 90 minutes. The autoradiograph of the SDS-PAGE was performed according to the same method in section 3.8.1. On the other hand, the aliquots (100 µL) of supernatants of all the tumor samples at 24 hours and 72 hours were individually centrifuged with Pierce™ protein concentrators (MWCO=10 kDa) to separate the low molecular weight radioactivity. The radioactivity in each fraction was quantified using a gamma counter to calculate the percentage of the cysteine proteases trapped radioconjugate in the total counts.

Evaluation of Cysteine Proteases Trapping of the Cy 5-Labeled Conjugates

The Cy 5-labeled conjugates (40 nmol) were intravenously injected to the tumor bearing mice. The mice were sacrificed at 24 post-injection time points, and the heart, lung, liver, spleen, pancreas, kidney, intestine, brain, and tumor were excised and imaged using an IVIS spectrum system. The tumor and organs were homogenized in RIPA buffer (50 mg/100 µL) containing Halt™ protease inhibitor (100×, 1 µL) on ice and centrifuged to remove the pellet. An aliquot (18 µL) of the supernatant of the sample was added in NuPAGE® sample reducing reagent (10×, 2 µL) and denatured at 80° C. for 2 minutes. The sample was mixed with Novex Tris-Glycine S DS sample buffer (2×, 20 µL) and incubated for further 10 minutes. The mixtures (20 µL) were loaded onto a Novex 16% tris-glycine gel and analyzed by SDS-PAGE at 110 V for 90 minutes, followed by electro transferring onto PVDF membranes. The PVDF membranes were blocked by animal-free blocking buffer for 1 hour at room temperature and then were incubated with Cathepsin B (D1C7Y) XP® Rabbit mAb at 4° C. for overnight. Membranes was then incubated with Goat anti-Rabbit IgG (H+L) secondary antibody at room temperature for 1 hour and visualized using Typhoon FLA 9500.

Results

NTSR1 is a receptor known to be overexpressed in a number of cancers, including pancreatic, prostate, and colon (Fani, et al. (2012) Theranostics, 2:481; Wu, et al. (2012) Front. Endocrinol., 3:184; Myers, et al. (2009) ACS Chem. Biol., 4:503). In this study, the synthesized NTSR1-targeted agents utilizes an NT fragment (i.e., NT(6-13)) as the targeting vector. This peptide has a low-molecular weight with nanomolar binding affinity to the NTSR1. Briefly, the AOMK inhibitor 1a was utilized as the model CCTA and the non-reactive 1b (no inhibition) was used as a structurally analogous control. The lutetium-177 ($^{177}$Lu)-labeled-conjugates 2a-2d were used to access the impact of the CCTA linker (X) on the activity of the radioconjugate. For radioconjugates 2e-2f, modifications were made to the peptide (Y) and the CCTA linker to examine how increases in hydrophilicity impacted biological performance. Radioconjugates 3a-3b utilized the inactive CCTA (1b) and served as matching controls to the experimental analogs. Lastly, a fluorescent dye (cyanine 5, Cy5) was conjugated to the CCTA-incorporated peptide to yield the experimental compound 4a, with 4b serving as the matched control. Table 1 provides details regarding the structural components for certain compounds. The $^{177}$Lu radiolabeling efficiencies of the conjugates were determined to be from 54.5% to 88.8%. No radiolysis was detected under the radiolabeling condition for all the conjugates.

TABLE 1

Structural components of the synthesized analogs.

| Compound | Label | Trap | X Linker | Y Linker |
|---|---|---|---|---|
| 2a | $^{177}$Lu-DOTA | 1a | Null | β-Ala |
| 2b | $^{177}$Lu-DOTA | 1a | acetyl | β-Ala |
| 2c | $^{177}$Lu-DOTA | 1a | PEG$_3$ | β-Ala |
| 2d | $^{177}$Lu-DOTA | 1a | Gly-(D)Ser$_3$ | β-Ala |
| 2e | $^{177}$Lu-DOTA | 1a | PEG$_3$ | (D)Ser$_3$ |
| 2f | $^{177}$Lu-DOTA | 1a | Gly-(D)Ser$_3$ | (D)Ser$_3$ |
| 3a | $^{177}$Lu-DOTA | 1b | PEG$_3$ | β-Ala |
| 3b | $^{177}$Lu-DOTA | 1b | Gly-(D)Ser$_3$ | (D)Ser$_3$ |
| 4a | Cy5 | 1a | Gly-(D)Ser$_3$ | (D)Ser$_3$ |
| 4b | Cy5 | 1b | Gly-(D)Ser$_3$ | (D)Ser$_3$ |

177Lu-DOTA—lutetium-177-labeled-1,4,7,10-tetraazacyclododecane-1,4,7,10-tetraacetic acid; Cy5—cyanine 5; PEG$_3$—2-[2-[2-(2-azidoethoxy)ethoxy]ethoxy]acetic acid.

To assess the in vitro CC-trapping potency of these conjugates, the inhibition constant of the conjugates relative to the unmodified inhibitor 1a were determined. Cathepsin B (CatB) was chosen as the model CC due to its ubiquitous expression in mammalian cells and the selectivity of 1a for this protease. By monitoring the initial hydrolysis rates of the substrate by CatB at different concentrations in the presence of the conjugates, the observed rate constant ($K_{obs}$) was calculated and converted to the inhibition constants ($K_i$) according to the determined Michaelis-Menten constant ($K_m$) of the CatB. The results showed that only the hydrophilic CCTA conjugates (2a-2f) demonstrated low nanomolar $K_i$ and inhibition IC$_{50}$ to CatB, similar to the 1a control (Table 2). As expected, the unlabeled control analogs of 3a and 3b did not demonstrate any inhibition over the concentrations investigated. In addition, the NTSR1-binding affinity of the conjugates was investigated using a competitive binding assay with HT-29 human colon cancer cells, a well-known NTSR1-positive cell line (Jia, et al. (2016) Bioconjugate Chem., 27:2658). All of the conjugates exhibited comparable nanomolar binding affinities (Table 2). These results indicate minimal impact of the CCTA on the conjugate affinity for the NTSR1 and vice versa (i.e., the impact of the peptide on the CCTA efficacy).

TABLE 2

The logD$_{7.4}$, CatB inhibition constant, and competitive binding (IC$_{50}$) to NTR1 of the compounds.

| Compound | logD$_{7.4}$ | CatB K$_1$ (nM) | NTSR1 IC$_{50}$ (nM) |
|---|---|---|---|
| 1a | 2.08 ± 0.08$^a$ | 23 ± 1 | — |
| 1b | 2.51 ± 0.02$^a$ | ni$^c$ | — |
| 2a | −1.46 ± 0.02$^b$ | 25 ± 4 | 20 ± 2 |
| 2b | −1.49 ± 0.02$^b$ | 26 ± 5 | 22 ± 2 |
| 2c | −0.98 ± 0.02$^b$ | 69 ± 13 | 19 ± 1 |
| 2d | −1.79 ± 0.06$^b$ | 73 ± 8 | 20 ± 3 |
| 2e | −1.71 ± 0.05$^b$ | 72 ± 2 | 20 ± 3 |
| 2f | −1.95 ± 0.05$^b$ | 50 ± 13 | 18 ± 2 |
| 3a | −1.56 ± 0.07$^b$ | ni | 49 ± 5 |
| 3b | −2.01 ± 0.06$^b$ | ni | 52 ± 8 |

$^a$The logD$_{7.4}$ was determined by HPLC analysis.
$^b$The logD$_{7.4}$ was determined by radiometric analysis.
$^c$No inhibition observed.

Figure 2A:
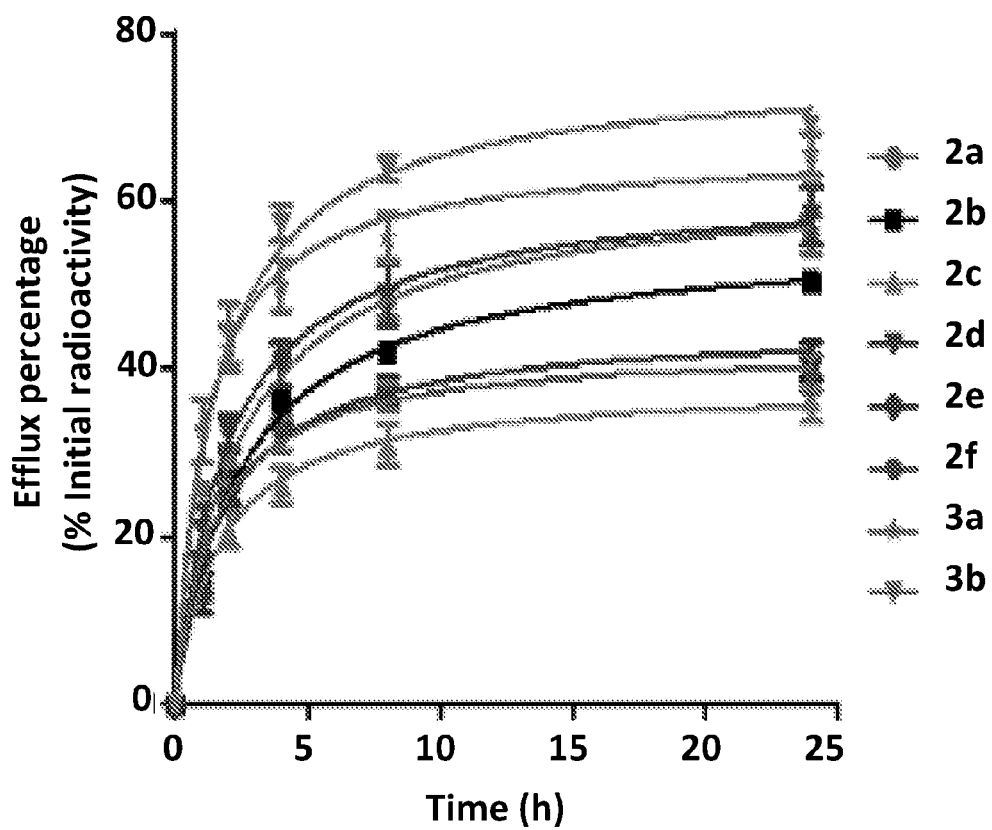
FIG. 2A shows the efflux of the internalized 2a-2f and 3a-3b in HT-29 cells. Values are means±SD (n=3).

Efflux studies were performed to examine the HT-29 cellular retention profile of the radioconjugates over a 24 hour period, as shown in FIG. 2A. Increased retention was observed as the CCTA linker (X) increased in length from null (2a) to acetyl (2b) to PEG3 (2c), indicating the length impacts the cellular activity. Unexpectedly, the longest linker Gly-(D)Ser$_3$ (2d), did not follow this trend and had a cellular retention profile similar to 2a. However, introduction of a (D)Ser$_3$ in the peptide linker (Y) resulted in a substantial increase in the cellular retention of the analogous 2f. This data indicates that introducing a PEG linker between the CCTA and the peptide or inserting a three-D-serine linker in the peptide sequence would benefit the intracellular binding of the conjugates.

Compound 2c exhibited substantially reduced efflux (36%) compared to the structurally analogous inactive CCTA control 3a (66%) at 24 hours. Similarly, 2f yielded reduced efflux results (39%) relative to 3b (69%). The percentage surface bound vs. internalization of 2c and 2f was also investigated. The surface bond for both of the conjugates was observed to be significantly (4-5 fold) higher than that of a previous NTSR1 ligand at 2 hours (Jia, et al. (2015) Nucl. Med. Biol., 42:816), which is likely due to the increased hydrophobicity after the incorporation of the CCTAs. Overall, the inclusion of an active CCTA into the NTR1-targeted peptide construct led to a clear increase in cellular retention.

Figure 2B:
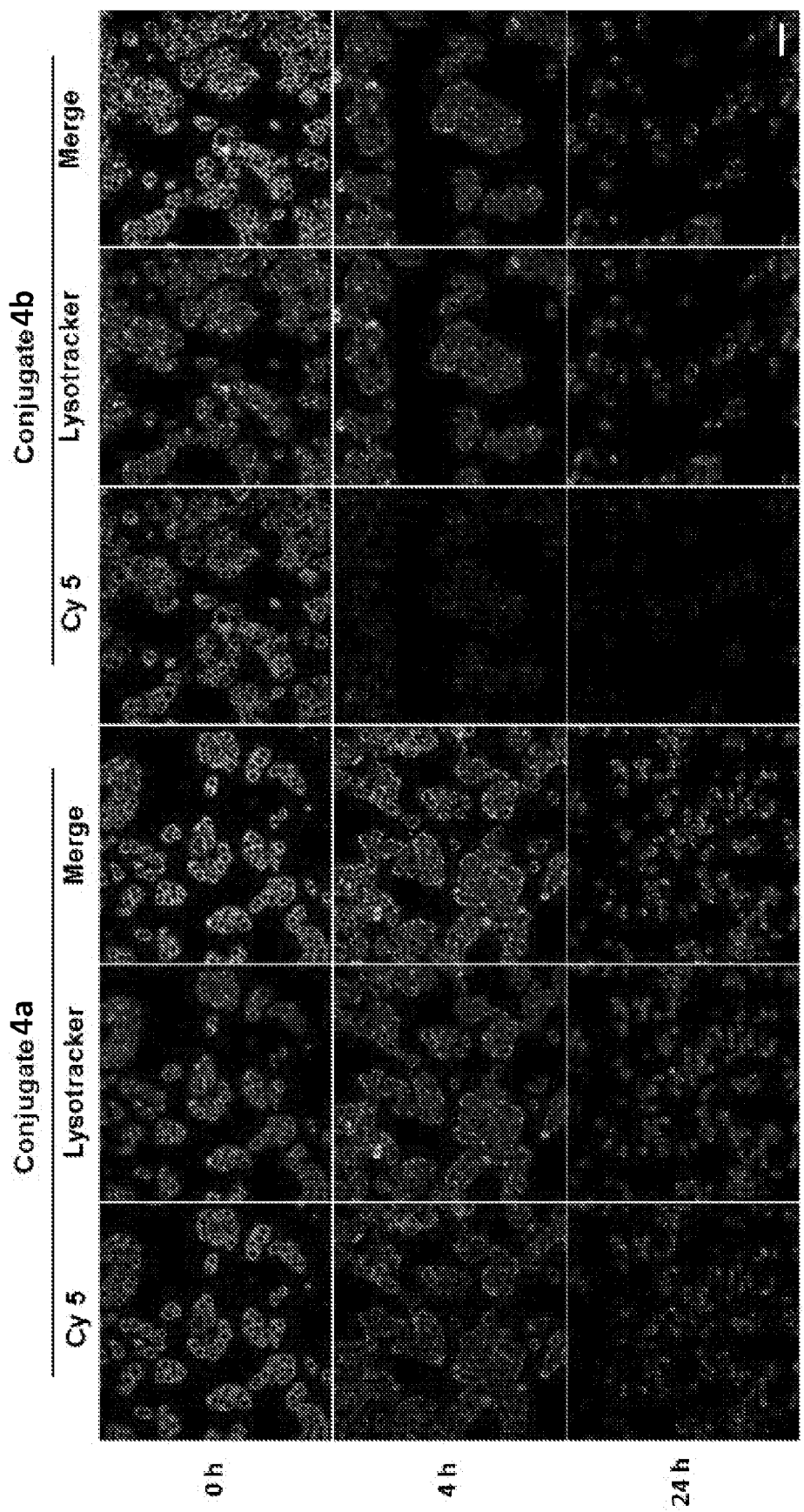
FIG. 2B provides representative confocal microscopy images of the efflux of Cy5 labeled 4a and 4b form HT-29 cells. Cell endolysosomal compartments were stained with LysoTracker™. Scale bar=50 mm.
Figure 2C:
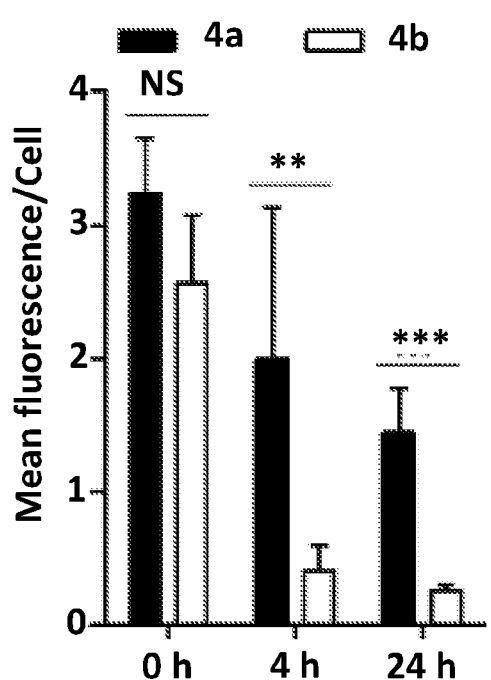
FIG. 2C provides time-dependent fluorescence intensity of Cy5 per cell as quantified from the confocal images.
Figure 2D:
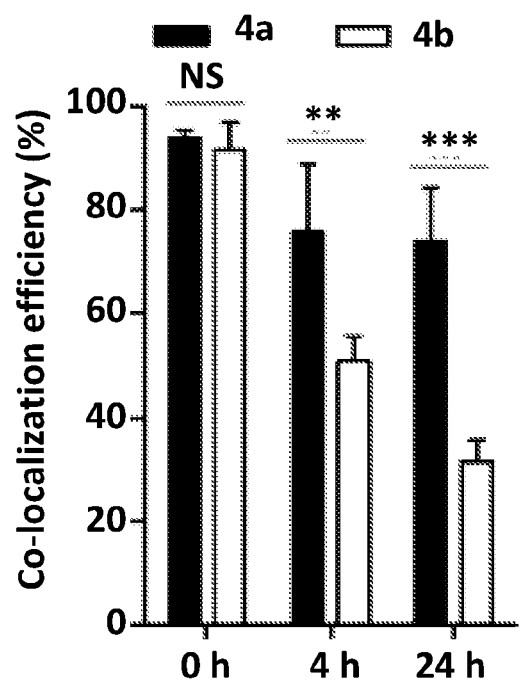
FIG. 2D provides co-localization efficiency of Cy5 overlapping with LysoTracker™. All the analysis was performed in 6 random images and were presented as mean±SD. $p<0.01$, *$p<0.001$, NS=not significant.

The cell trafficking study of the Cy5-labeled conjugate 4a and its CCTA-inactive counterpart 4b was carried out utilizing confocal microscopy. The conjugates were efficiently internalized by the cells within 2 hours, providing strong fluorescence intensity (red) in the cytoplasm. This internalization could be effectively blocked by the addition of an unlabeled NTSR1-targeted agent, demonstrating that the cellular uptake is NTSR1-mediated. The co-localization of the Cy5 signal of conjugates 4a or 4b with the LysoTracker™ (green) signal indicated intracellular trafficking by the endolysosomal pathway. The intracellular retention of the conjugates was further investigated over time (FIG. 2B). The incorporation of CCTA significantly prolonged the residence time of 4a in the cells, imparting a 5.5 fold increase in florescence compared with its inactive counterpart, conjugate 4b at 24 hours (FIG. 2C). Remarkably, in contrast to 4b, the co-localization of 4a within the endolysosomal compartments (LysoTracker™ signal) persisted throughout the 24 hour time period (FIG. 2D). These observations strongly indicate the CCTA in 4a enabled the CC-mediated trapping of this conjugate in the endolysosomal compartments.

To examine the ability of conjugates 2f and 2c to form macromolecular adducts with CCs, gel permeation chromatography (GPC) and sodium dodecyl sulfate polyacrylamide gel electrophoresis (SDS-PAGE) were utilized. Indeed, co-incubation with CA-074 (FIG. 3C), a CatB selective inhibitor (Towatari, et al. (1991) FEBS Lett., 280:311), eliminated observable CatB adducts. No interference on CatB binding of the conjugates was observed when co-incubated with the competitive NTSR1 ligand confirmed the minimal impact of the NTSR1 peptide on affinity of the conjugates to CatB. These CCTA-incorporated conjugates have been shown to bind to the Cys-29 residue (Blum, et al. (2007) Nat. Chem. Biol., 3:668) in the active site of the protease. Autoradiographic SDS-PAGE demonstrated adduct formation of 2f and 2c with CatB (B24 kDa heavy chain) (FIGS. 3A and 3B). Incubation of 2f and 2c in live HT-29 cells resulted in multiple macromolecule adducts formed, including CatB and possibly other cysteine cathepsin adducts. In addition, the intracellular adduct formation of the conjugates was found to be substantially inhibited by the co-incubation with a competitive NTSR1 ligand, indicating that adduct formation is dependent on receptor-mediated endocytosis.

Figures 3E, 3F:
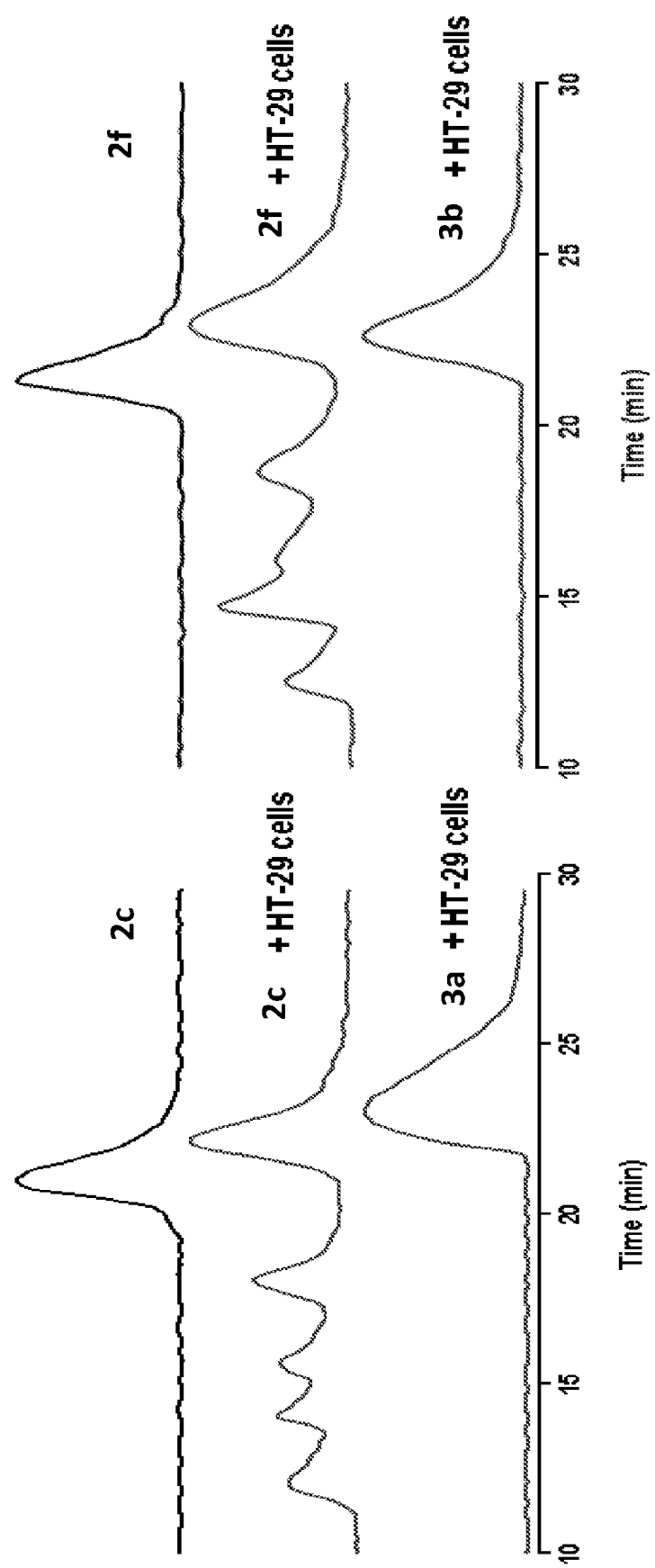

The intracellular adduct formation was also confirmed by the observation of multiple adducts in the GPC analysis (FIGS. 3E and 3F). Based on the GPC profile, the percentages of macromolecular adducts, with respect to total intracellular activity, were calculated as 61% for 2c and 66% for 2f, indicating that the radioconjugates efficiently bind to CCs after internalization. Furthermore, the radiolabeled adducts of 2f could still be detected by SDS-PAGE after 24 hours (FIG. 3D), indicating a significant portion of these adducts are able to remain intact over this timespan. Quantification of the radioactive signal from the SDS-PAGE experiments revealed that signal at 24 hours was 51%, relative to 2 hours, indicating that the half-life of these cellular adducts is approximately 24 hours. As expected, the inactive controls (3a and 3b) demonstrated no adduct formation by either technique.

Figure 4A:
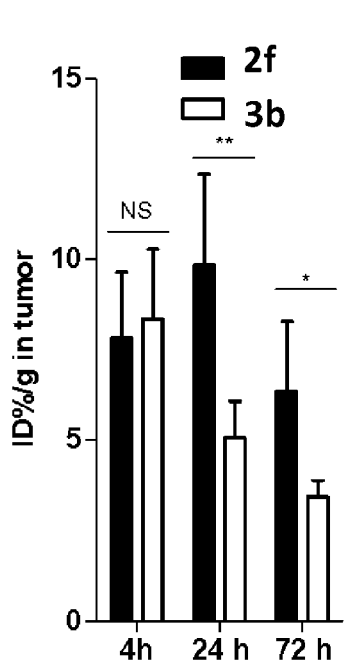
FIG. 4A provides the % ID/g in HT-29 xenograft tumors at 4, 24 and 72 hours postinjection of 2f and 3b in mice (n=5).

The excellent serum stability and more hydrophilic profile (Table 2) of 2f prompted the examination of the in vivo targeting and retention profiles of this agent. Using an HT-29 xenograft mouse model, the biodistribution profile of 2f and the inactive control 3b, were determined (FIG. 4E). Both conjugates demonstrated good muscle and blood clearance. Tumor uptake (FIG. 4A) of the two radioconjugates was statistically identical at 4 hours. However, by 24 hours, 2f had a 25% increase in tumor uptake, while the tumor retention of 3b decreased significantly by 40%. Percent decreases of about 33% were seen for both conjugates at 72 hours. Overall, 2f demonstrated a nearly two-fold increase in retention time in the tumors, compared to the control 3b after 24 hours. Autoradiographic SDS-PAGE analysis of the tumors at 24 hours post-injection revealed in vivo adduct formation for 2f, but not for 3b. Analysis of tumor lysates by centrifugal filtration (MWCO>10 kDa) revealed that >70% of the radioactivity in the HT-29 tumors at 24 and 72 hours was associated with macromolecules Uptake in the liver and kidney were substantial for both conjugates; however, conjugate 2f demonstrated significantly increased retention compared to the CCTA-inactive 3b. The uptake in the liver is likely due to hepatic clearance and non-specific internalization of these rather lipophilic conjugates (Jia, et al. (2016) Bioconjugate Chem., 27:2658; Audus and Raub, Biological Barriers to Protein Delivery, Springer, Boston, 1993). The liver and spleen uptake of similar CCTA-incorporated NTR1-targeted agents can be eliminated by simply increasing the hydrophilicity of the utilized agent. Renal uptake is most likely due to the well-known renal reuptake/non-specific internalization mechanism of charged peptides by the proximal tubule cells during renal excretion (Vegt, et al. (2011) Eur. J. Nucl. Med. Mol. Imaging, 38:623). Given this, it is probable that 2f forms adducts in the liver and kidney in a manner similar to the internalization mechanism for NTSR1-positive tumors.

Figure 4B:
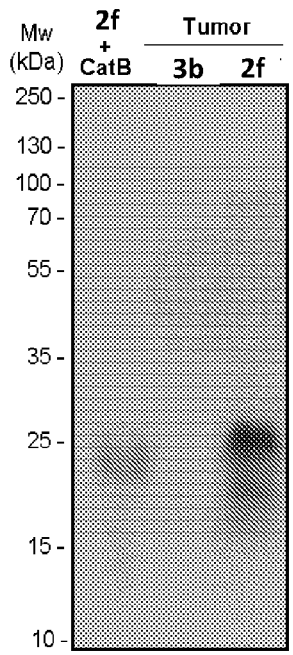
FIG. 4B provides an autoradiography of SDS-PAGE of the HT-29 xenograft tumors at 24 hours post-injection of 2f and 3b in mice.
Figure 4C:
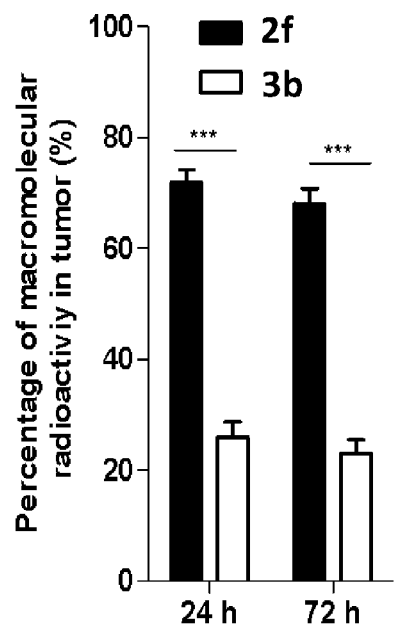
FIG. 4C provides the percentage of the macromolecule associated radioactivity (Mw410 kDa) in tumor tissues after administration of 2f and 3b (n=3). $*p<0.05$, $p<0.01$, $*p<0.001$, NS=not significant.
Figure 4D:
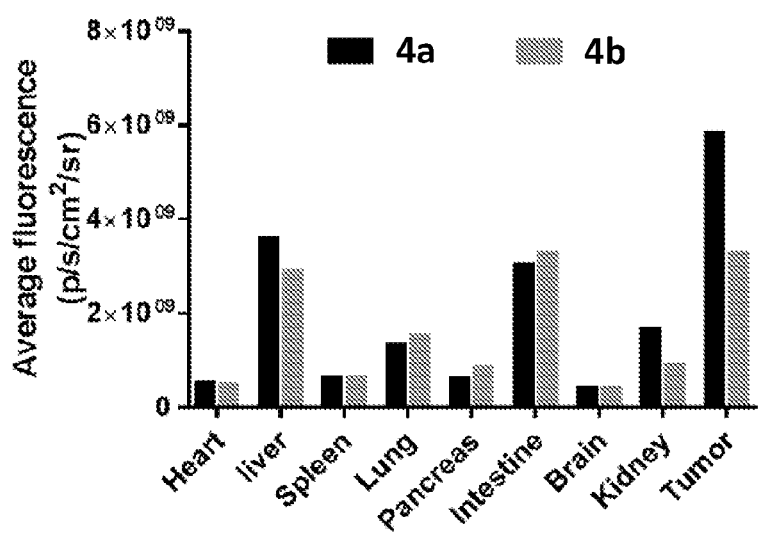
FIG. 4D provides the quantification of the average fluorescence in each tissue. The excitation filter was 615-665 nm, and the emission filter was 695-770 nm.

To confirm this hypothesis, SDS-PAGE analysis was performed on tumor (FIG. 4B) as well as liver and kidney samples ex vivo for conjugates 2f and 3b. For 2f, identical adduct profiles were observed in the tumor and non-target tissue samples. These results indicate that these agents form macromolecular adducts in these tissues most likely due to the same CC-trapping mechanism. Control conjugate 3b demonstrated no signs of adduct formation. In addition, using centrifugal filtration (10 kDa MWCO) to separate macromolecules from low-molecular weight compounds, greater than 68% of the radioactivity resident in the HT-29 tumor tissues was found to be associated with macromolecules (FIG. 4C) at 24 and 72 hours for 2f, indicating that the increased retention in these tumors is indeed due to the CC binding. Lastly, Cy5-labeled conjugates 4a and 4b were injected into mice to further evaluate in vivo adduct formation. Similar to the biodistribution data for the radioconjugates, the ex vivo imaging results indicated that the tumor retention of 4a was greater than its counterpart 4b at 24 hours. Analysis of the fluorescently labeled proteins by western blot at 532 nm showed that 4a, based on corresponding CatB antibody staining, was mainly bound to CatB in tumor tissues (FIG. 4D). This is thought to be due to the high CatB expression/activity profiles in cells as well as the CatB selectivity of the CCTA trapping agent (Krantz, et al. (1991) Biochemistry, 30:4678; Wagner, et al. (1994) J. Med. Chem., 37:1833; Kato, et al. (2005) Nat. Chem. Biol., 1:33).

In summary, this study reinforces the concept that synergistic incorporation of CC inhibitors (i.e., CCTAs) into a NTSR1-targeted peptide can lead to the ability to efficiently form adducts in the endolysosomal compartments of NTSR1-positive cells. Furthermore, the formation of these macromolecular adducts substantially prolonged the in vivo retention of the radioconjugates in NTSR1-positive tumors. This strategy has the potential to provide an unprecedented means to enhance the efficacy of NTR1-targeted agents for an array of diagnostic and therapeutic applications. Also, this technology is adaptable to a range of receptor-avid small molecules, peptides, and other targeted agents to improve the selective retention of these agents, thereby leading to substantial improvements in translational potential.

Example 2

Figure 5A:
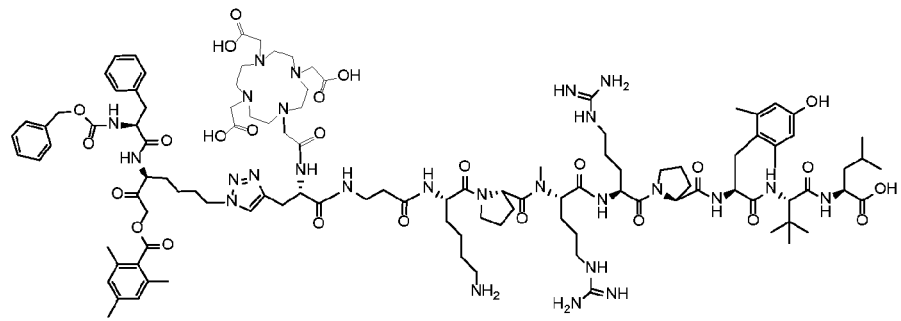
FIGS. 5A-5C provide the structure of neurotensin(6-13) peptide-AOMK conjugates.
Figure 5A:
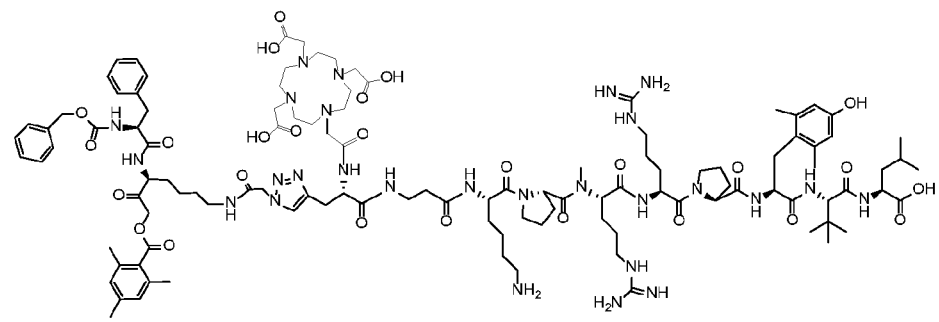
Figure 5A:
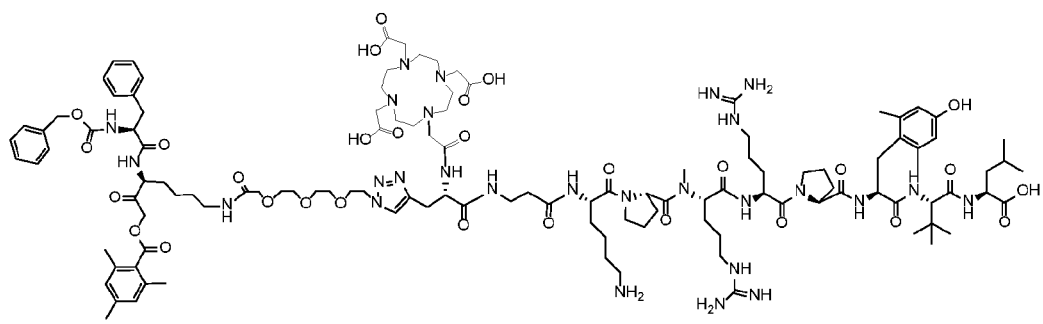
Figure 5A:
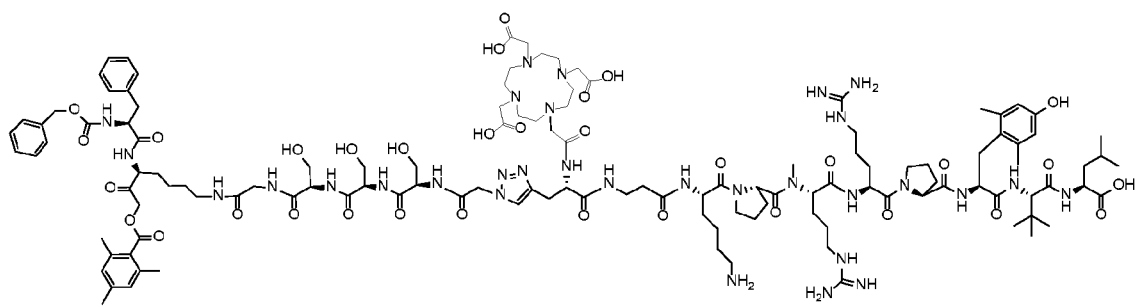
Figure 5B:
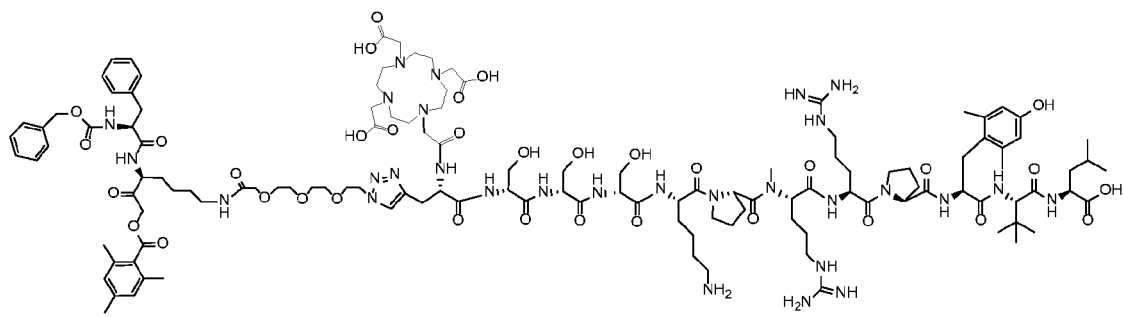
Figure 5B:
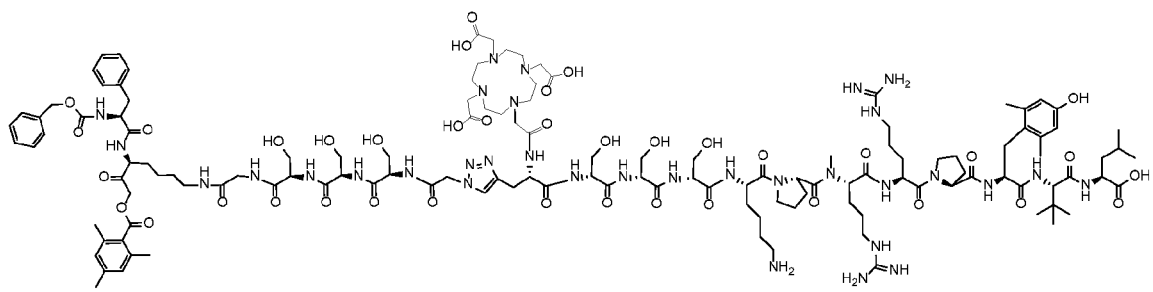
Figure 5B:
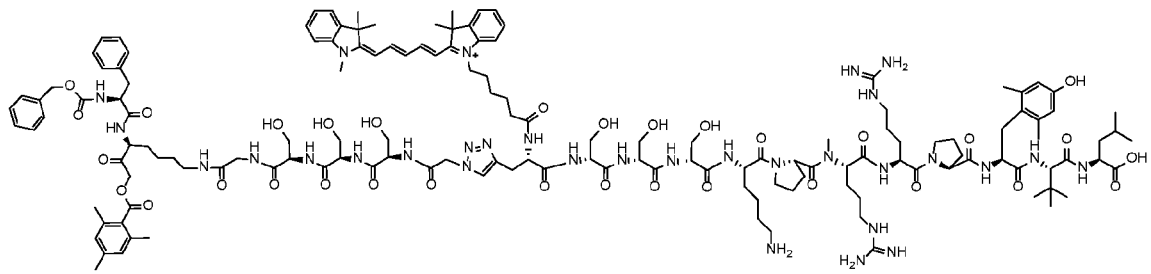
Figure 5B:
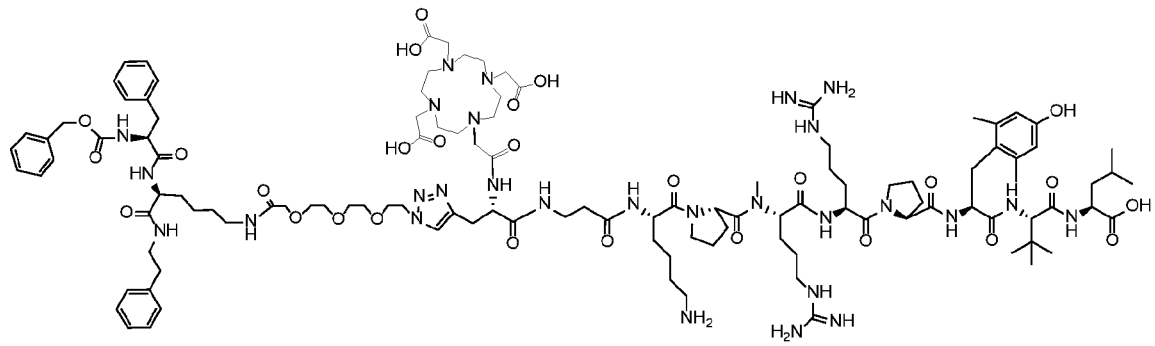
Figure 5C:
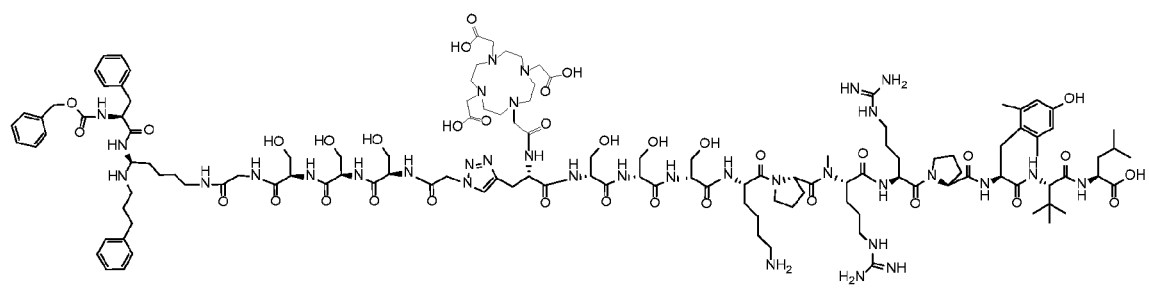
Figure 5C:
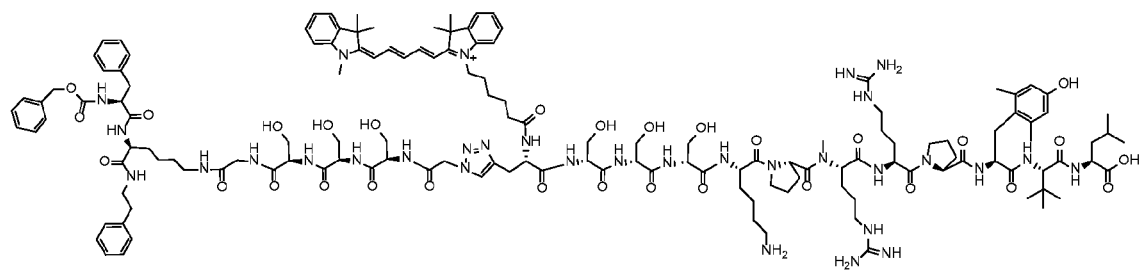
Figure 5D:
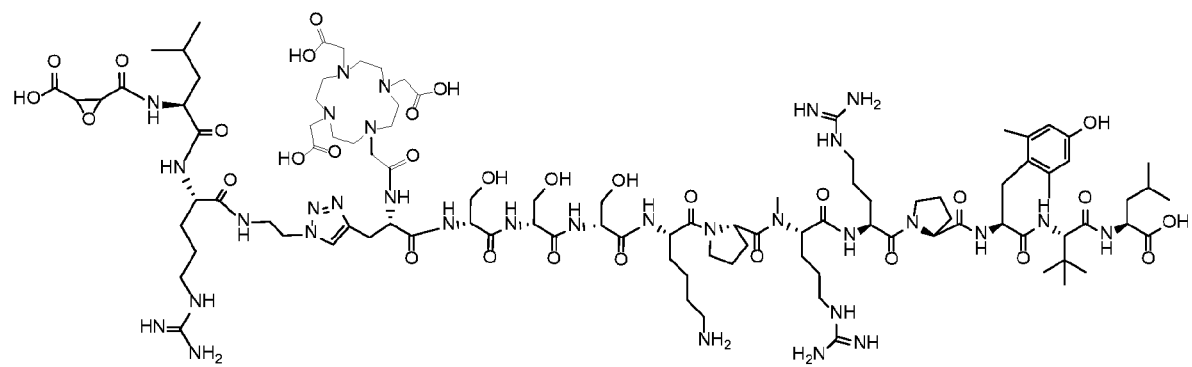
FIG. 5D provides the structure of neurotensin(6-13)-epoxysuccinyl peptide conjugates.
Figure 5D:
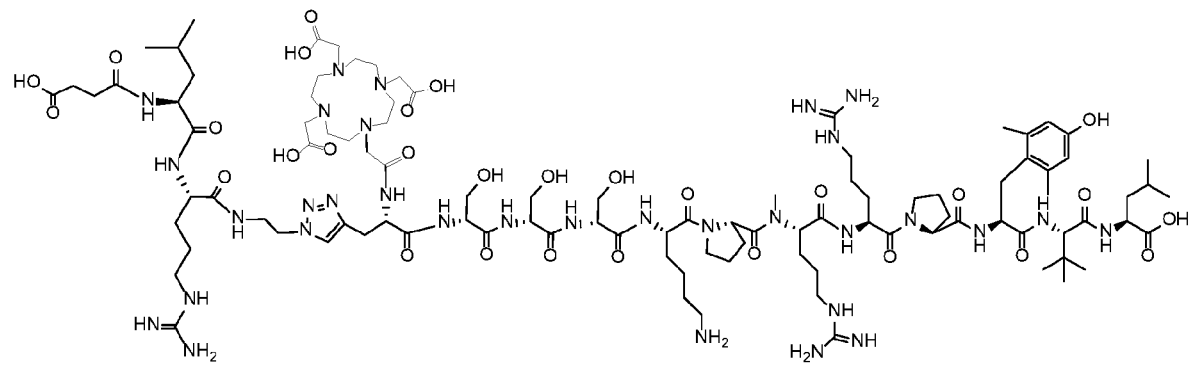

In order to make the CCTA a more hydrophilic construct, an epoxide-based inhibitor, an E-64 derivative, was used (FIG. 5D). An active (Ea) and inactive negative control (Ec) were synthesized. Briefly, Fmoc-Arg(Pdf)-OH was used as starting material. The carboxylic acid was modified with 2-N-boc-ethylenediamine. Using standard amidation chemistry, Leu was to the N-terminus of the Arg. Trans-2,3-epoxysuccinic acid was then attached to the amino group of the Leu to yield the protected CCTA. The CCTA was coupled to the NTSR1-targeted peptide using Cu(I)-mediated click chemistry. In brief, the azide of the CCTA was conjugated to the alkyne side chain of the NTSR1-targeted peptide in aqueous conditions at room temperature. DOTA was then conjugated to the peptide afterwards, using standard amidation chemistry to prevent Cu(I) chelation. Conjugates were treated with 95% trifluoroacetic acid (TFA) to remove side group protective moieties, precipitated out, purified and characterized by RP-HPLC/MS.

The epoxide-based CCTAs possessed substantial improvements in log $D_{7.4}$ for Ea (−3.78) and Ec (−3.51). CatB inhibition, NTSR1-affinity and adduct formation capabilities of these analogs are similar to previous compounds (Table 3). As with the previous CCTA-NTs analogs, Ea and Ec demonstrated NTSR1-positive tumor uptakes that were statistically identical at 4 hours. Ea was able to maintain tumor retention for 24 hours, but decreased by 36% by 72 hours. Alternatively, the control, Ec, decreased on average by 22 and 41% at 24 and 72 hours, respectively. With these hydrophilic analogs, non-target clearance by 4 hours from the liver (<1% ID/g), blood (<0.03% ID/g) and muscle (<0.1% ID/g) was significantly improved. However, the kidney uptake (66.66+12.56% ID/g at 4 hours) of Ea was high. This renal uptake (4 hours) was attributed to the high overall charge (+2) associated with Ea.

TABLE 3

The Log D, CatB inhibition constant, and competitive binding ($IC_{50}$) to NTR1 of Ea and Ec

| Compound | $LogD_{7.4}$ | CatB $K_i$ (nM) | CatL $K_i$ (nM) | NTR1 $IC_{50}$ (nM) |
|---|---|---|---|---|
| Ea | −3.78 ± 0.10[a] | 34 ± 3 | 21 ± 1 | 60 ± 8 |
| Ec | −3.51 ± 0.15[a] | ni[b] | ni[b] | 63 ± 7 |

[a]The Log $D_{7.4}$ was determined by radiometric analysis.
[b]No inhibition observed.

Figure 5E:
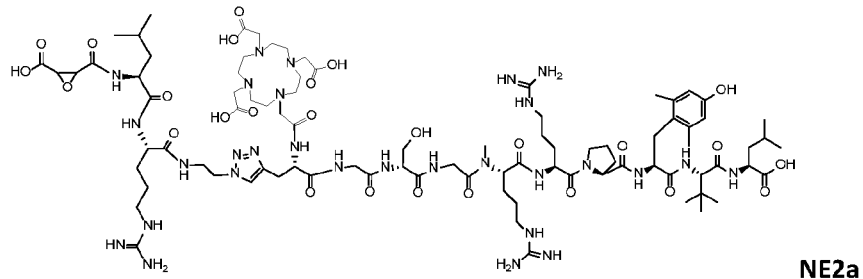
FIG. 5E provides structure of neurotensin(8-13)-epoxysuccinyl peptide conjugates.
Figure 5E:
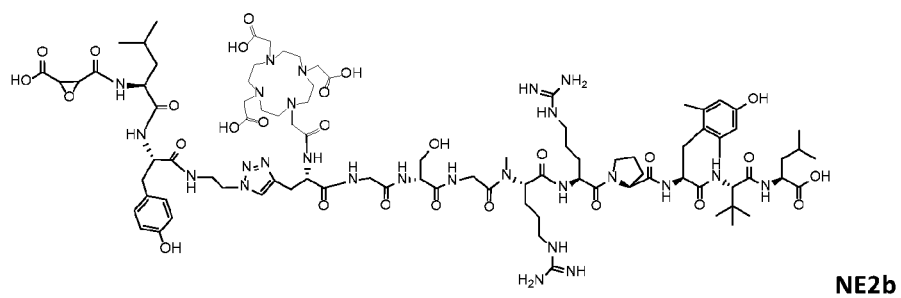
Figure 5E:
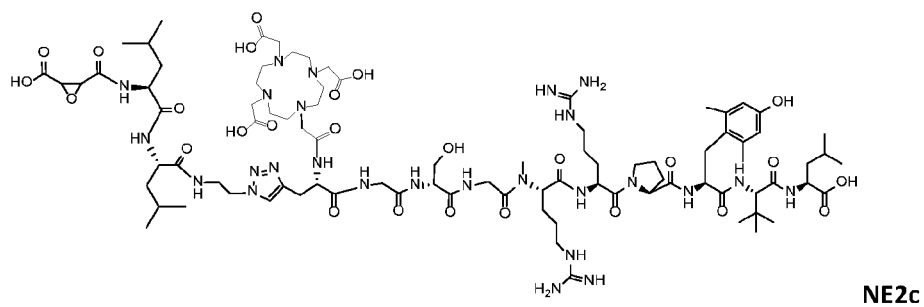
Figure 5E:
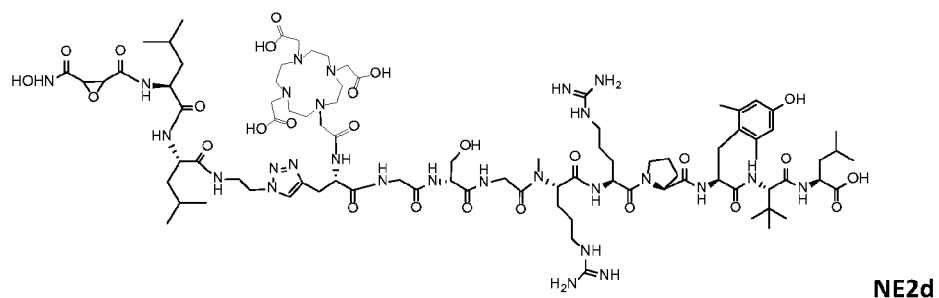
Figure 5F:
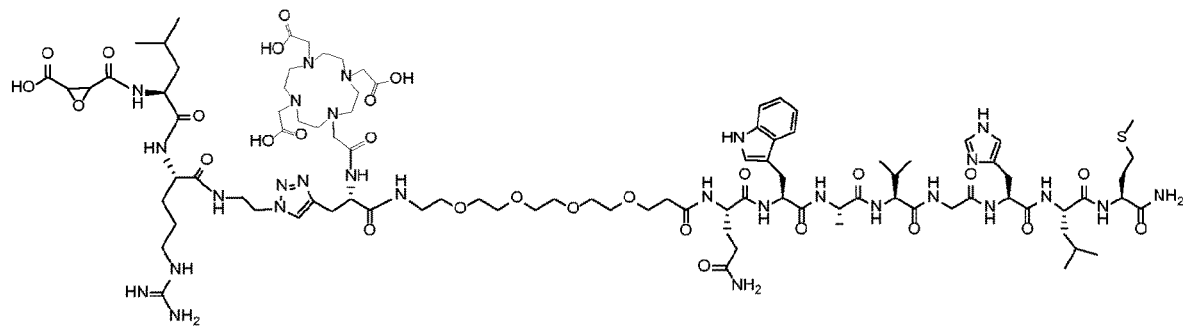
FIG. 5F provides structure of bombesin-epoxysuccinyl peptide conjugates.
Figure 5F:
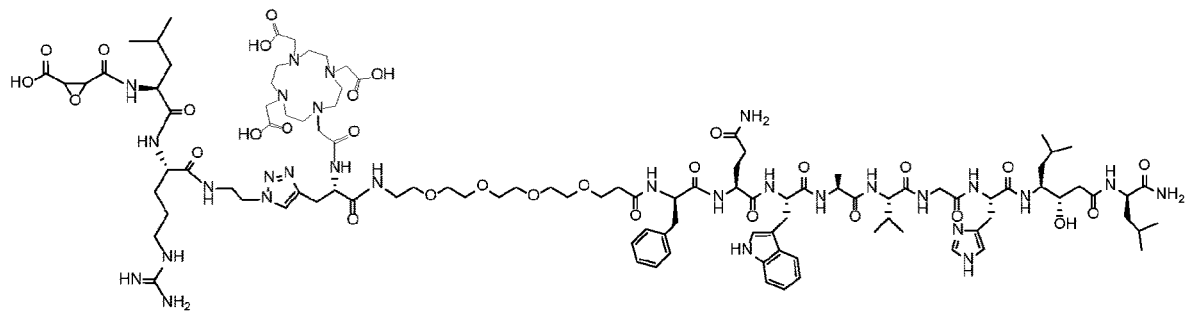
Figure 5F:
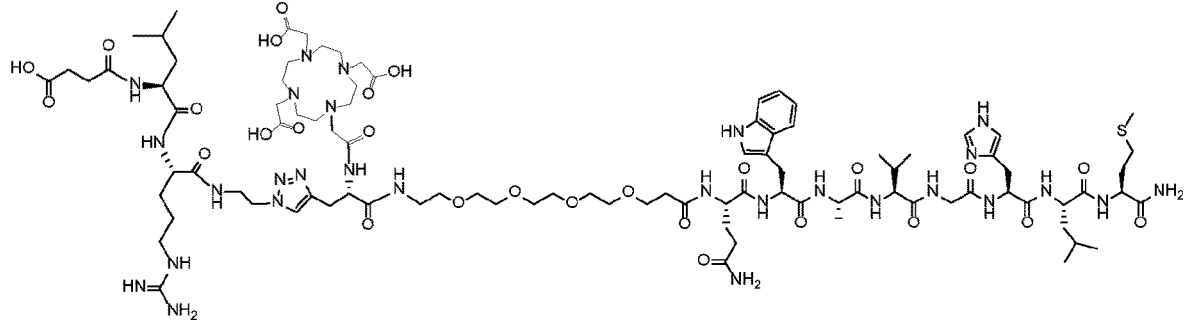
Figure 5F:
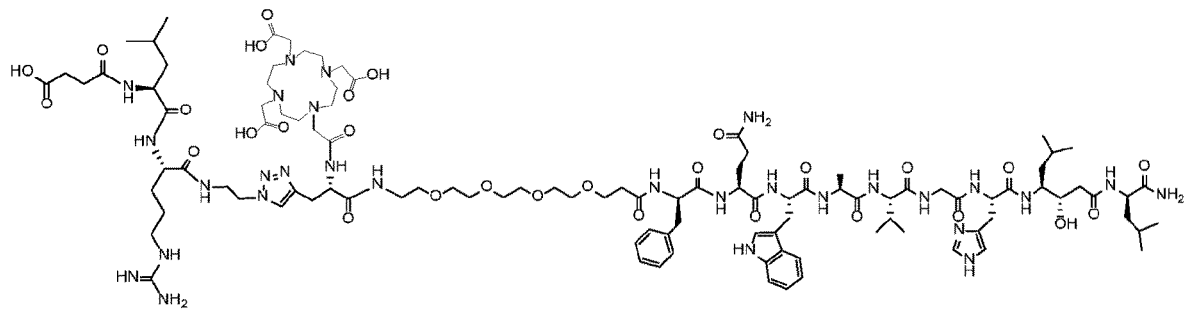
Figure 5G:
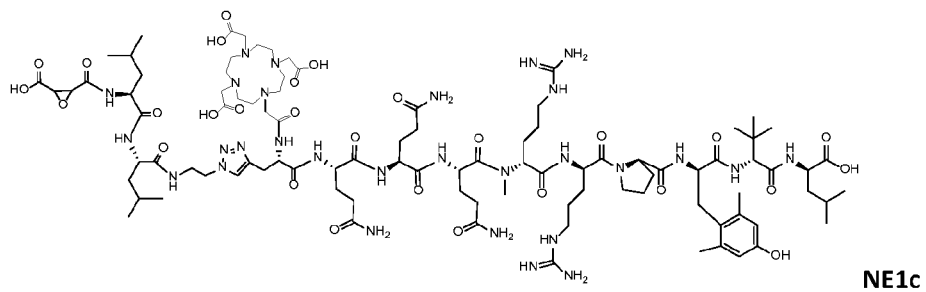
FIG. 5G provides further conjugates. NE1c is an NTR1-targeted agent conjugated to an E-64 derivative. OE1a is a SSTR2-targeted agent conjugated to an E-64 derivative. FE1 is a folate receptor targeted agent conjugated to an E-64 derivative. RE1 is an integrin-targeted agent conjugated to an E-64 derivative. The $^{177}$Lu is not depicted in these structures.
Figure 5G:
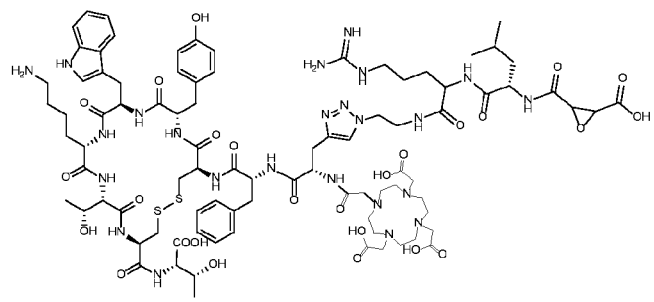
Figure 5G:
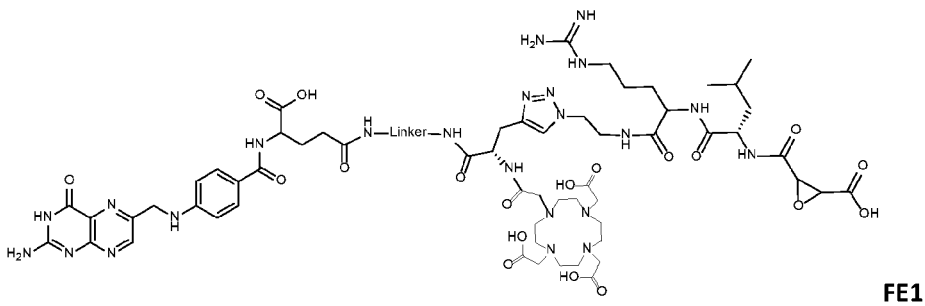
Figure 5G:
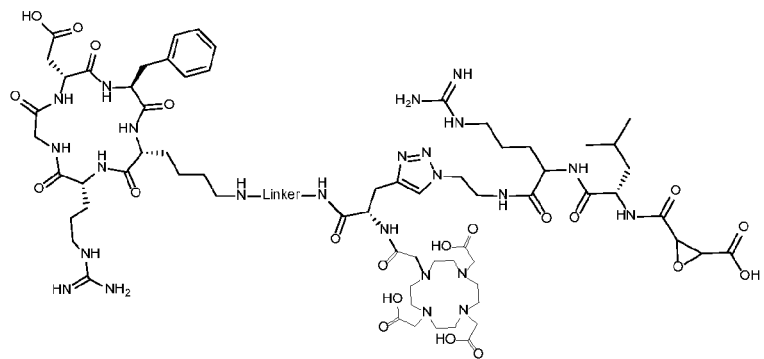

The overall charge was reduced to +1 by eliminating a non-essential lysine group to achieve compound. This change caused a dramatic (73%) reduction in renal uptake to 17.94±2.96% ID/g at 4 hours, demonstrating that the overall charge of the NTSR1-targeted agents was the cause of renal uptake. The removal of the lysine reduces the affinity of the compound and resulted in reduced HT-29 tumor uptake by 31%. Nonetheless, the tumor to kidney (T/K) ratio improved to 0.25. Neurotensin(8-13)-epoxysuccinyl peptide conjugates were also tested (FIG. 5E). CatB inhibition of these analogs are provided (Table 4).

TABLE 4

The CatB inhibition constant for the indicated compounds.

| Compound | CatB $K_i$ (nM) |
|---|---|
| NE2a | 53 ± 5 |
| NE2b | 96 ± 14 |
| NE2c | 13 ± 3 |
| NE2d | 140 ± 31 |

Example 3

Four gastrin-releasing peptide receptor (GRPR; BB2r)-targeted agents were synthesized with experimental (A) and control (C) trapping agents and agonistic (AG) and antagonistic (ANT) targeting vectors (Table 5 and FIG. 5F). All of the analogs demonstrated low nanomolar binding affinity to the GRPR (Table 6). $^{177}$Lu-A-AG and $^{177}$Lu-A-ANT exhibited low nanomolar inhibition of catB, while $^{177}$Lu-C-AG and $^{177}$Lu-C-ANT, as expected, demonstrated no inhibition. Overall, this data demonstrates that the CCTA does not affect targeting affinity of the peptide and, vice versa, the targeting vector does not affect the inhibition efficacy of the CCTA.

TABLE 5

GRPR-targeted agents.

| Compound | CCTA | Targeting Vector |
|---|---|---|
| $^{177}$Lu-A-AG | CCTA | AG |
| $^{177}$Lu-C-AG | Sham CCTA | AG |
| $^{177}$Lu-A-ANT | CCTA | ANT |
| $^{177}$Lu-C-ANT | Sham CCTA | ANT |

TABLE 6

Distribution coefficiecnts, CatB inhibition and GRPR-affinity of GRPR-targeted agents.

| Compound | $logD_{7.4}$ | CatB Inhibition (nM) | GRPR-Affinity (nM) |
|---|---|---|---|
| $^{177}$Lu-A-AG | −3.1 ± 0.1 | 25.9 ± 4.2 | 17.8 ± 3.8 |
| $^{177}$Lu-C-AG | −3.4 ± 0.1 | >200 μM | 16.5 ± 3.3 |
| $^{177}$Lu-A-ANT | −2.3 ± 0.2 | 20.6 ± 5.9 | 19.8 ± 3.0 |
| $^{177}$Lu-C-ANT | −1.9 ± 0.1 | >200 μM | 23.5 ± 3.6 |

Internalization at 2 hours for agonistic analogs (~11% Total Radioactivity Added (TRA)) in GRPR-positive human prostate cancer PC-3 cell line was much higher than the antagonistic (~2.5% TRA) targeting vectors. Efflux studies demonstrated that the $^{177}$Lu-A-AG exhibited significantly lower (~20%) reduction in efflux compared to the control ($^{177}$Lu-C-AG) over a 24 hour time period, whereas only a 5% reduction in efflux was observed for $^{177}$Lu-A-ANT compared to the analogous control ($^{177}$Lu-C-ANT).

Cellular adduct studies were accomplished by performing SDS-PAGE analysis on cellular lysates. For analogs containing an active CCTA, $^{177}$Lu-A-AG and $^{177}$Lu-A-ANT, cellular adducts are observed. Cellular adducts could be abolished by blocking the GRPR demonstrating the need for GRPR-mediated transport for adduct formation. The autoradiography of the SDS-PAGE also demonstrated that the binding of conjugates with catB can be completely inhibited by cysteine proteases inhibitor CA-074. Adduct formation is most pronounced in the $^{177}$Lu-A-AG likely due to the increased internalization efficacy. The intracellular adducts formation can also be blocked after co-incubation with excessive unlabeled compounds. No adduct formation were observed for the matched controls. The results show a time-dependent retention of catB-conjugates adducts in PC-3 cells after pre-incubation with radiolabeled compounds for 4 hours.

Biodistribution studies from 4-72 hours for the four analogs were completed in PC-3 xenograft mouse model. For the GRPR-targeted agonists, both analogs demonstrated statistically identical levels of uptake at 4 hours, but the $^{177}$Lu-A-AG demonstrated substantially higher levels of retention (62%) compared to the control $^{177}$Lu-C-AG (32%) over the 72 hour timeframe. Similarly for the two antagonists, initial uptakes were statistically identical. Interestingly, CCTA-incorporation was able to increase the tumor retention of $^{177}$Lu-A-ANT to 32% relative to 15% for the control ($^{177}$Lu-C-ANT) by 72 hours. Overall, for the $^{177}$Lu-A-ANT, PC-3 tumor uptake and retention were higher compared to $^{177}$Lu-RM2 (Dumont et al. (2013) J. Nucl. Med., 54(5):762-9). Autoradiography of SDS-PAGE of the lysate from tumor, liver, pancreas and kidney at 24 hours and 72 hours post-injection in PC-3 tumor bearing mice showed the formation of adducts with $^{177}$Lu-A-ANT and $^{177}$Lu-A-AG primarily in the tumor (particularly by 72 hours), but not with the controls. Further, fused micro-SPECT/CT images of $^{177}$Lu-A-ANT and $^{177}$Lu-C-ANT in PC-3 tumor-bearing mice was performed at 4, 24 and 72 hours after injection which showed improved retention in the tumors with $^{177}$Lu-A-ANT nut not the control $^{177}$Lu-C-ANT.

While certain of the preferred embodiments of the present invention have been described and specifically exemplified above, it is not intended that the invention be limited to such embodiments. Various modifications may be made thereto without departing from the scope and spirit of the present invention, as set forth in the following claims.

What is claimed is:

1. A compound consisting of
    a) a targeting moiety, wherein said targeting moiety binds a receptor expressed on a cancer cell and is an agonist of said receptor, and wherein said targeting moiety is a peptide of less than 20 amino acids in length;
    b) a cysteine cathepsin trapping agent (CCTA), wherein said CCTA is an epoxide CCTA, and
    c) a cytotoxic or radioactive moiety,
    wherein said cysteine cathepsin trapping agent is linked either directly or via a linker to said cytotoxic or radioactive moiety, and wherein said cytotoxic or radioactive moiety is linked to the N-terminus of said targeting moiety either directly or via a linker, and wherein the log $D_{7.4}$ of the compound is −2.5 to −4.0.

2. The compound of claim 1, wherein said receptor is selected from the group consisting of neurotensin receptors, gastrin-releasing peptide receptors, folate receptors, somatostatin receptors, prostate specific membrane antigen, vasoactive intestinal peptide receptors, cholecystokinin receptors, calcitonin receptors, vitronectin receptors, integrin receptors, asialoglycoprotein receptors, vascular endothelia growth factor receptors, transferrin receptors, luteinizing hormone-releasing hormone receptor, melanocortin receptors, glucagon-like peptide receptors, neurokinin receptors, sigma receptors, tropomyosin receptor kinase, aminopeptidase n receptor, and epidermal growth factor receptor.

3. The compound of claim 2, wherein said receptor is selected from the group consisting of neurotensin receptors, gastrin-releasing peptide receptors, folate receptors, and somatostatin receptor.

4. The compound of claim 3, wherein said receptor is neurotensin receptor 1.

5. The compound of claim 1, wherein said CCTA is an epoxysuccinyl peptide.

6. The compound of claim 1, wherein said cytotoxic or radioactive moiety is a radionuclide.

7. The compound of claim 6, wherein said radionuclide is contained within 1,4,7,10-tetraaza-1,4,7,10-tetra(2-carbamoylmethyl)cyclododecane (TCMC) or 1,4,7,10-tetraazacyclododecane-1,4,7,10-tetraacetic acid (DOTA).

8. The compound of claim 6, wherein said radionuclide is $^{177}$Lu.

9. The compound of claim 1, wherein at least one of said linkers comprises a peptide linker.

10. The compound of claim 1, wherein at least one of said linkers comprises poly(ethylene glycol).

11. The compound of claim 1, wherein the log $D_{7.4}$ of the compound is −3.0 to −4.0.

12. The compound of claim 1, wherein the compound has a structure selected from the group consisting of:

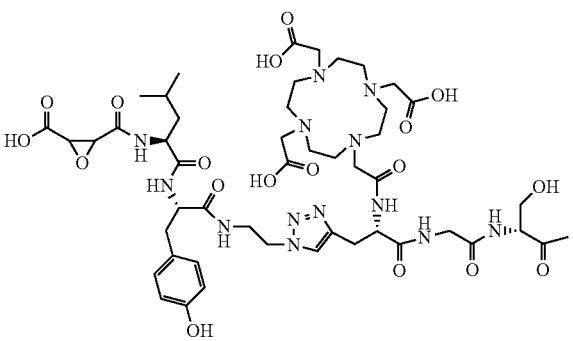

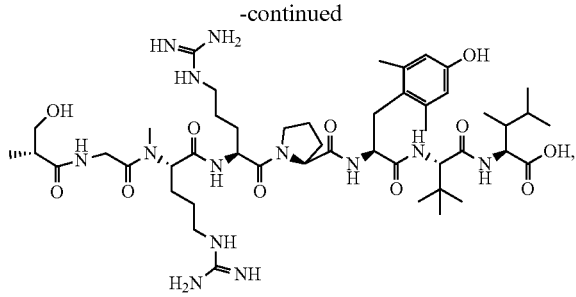

A-AG

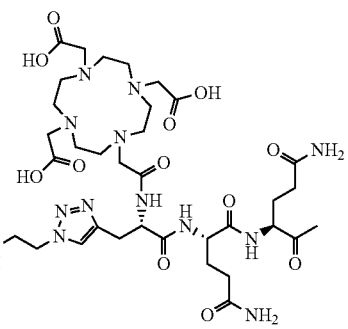

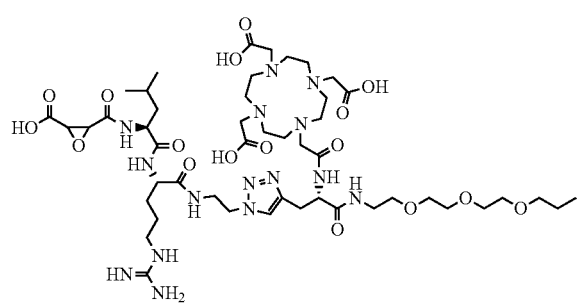

A-ANT

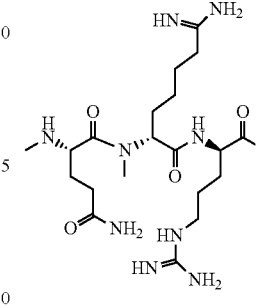

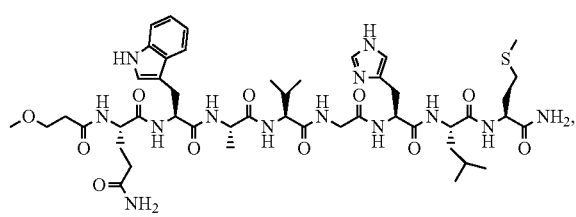

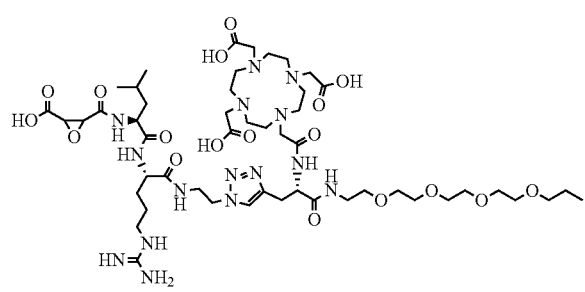

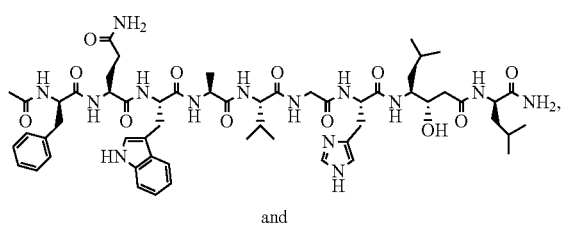

and

13. A composition comprising a compound of claim 1 and a pharmaceutically acceptable carrier.

14. The composition of claim 13, further comprising a chemotherapeutic agent.

15. A method of treating a disease or disorder in a subject in need thereof, said method comprising administering a compound of claim 1 to said subject.

16. The method of claim 15, wherein said compound is administered as a composition further comprising a pharmaceutically acceptable carrier.

17. The method of claim 15, wherein said disease or disorder is cancer.

18. The method of claim 17, wherein said compound or composition is administered intravenously or to the tumor site.

19. The compound of claim 1, wherein said CCTA forms a thioether linkage with cysteine cathepsin.

20. The compound of claim 1,
    wherein said targeting moiety is linked to said cytotoxic or radioactive moiety by a peptide linker of 1-5 amino acids, and
    wherein said CCTA is linked to said cytotoxic or radioactive moiety by a peptide linker of 1-5 amino acids.

21. The compound of claim 20, wherein both peptide linkers comprise at least one D-amino acid.

22. The compound of claim 20, wherein both peptide linkers comprise three serine residues.

23. The compound of claim 20, wherein said receptor is selected from the group consisting of neurotensin receptors, gastrin-releasing peptide receptors, folate receptors, and somatostatin receptor.

24. The compound of claim 12, wherein the compound has the structure:
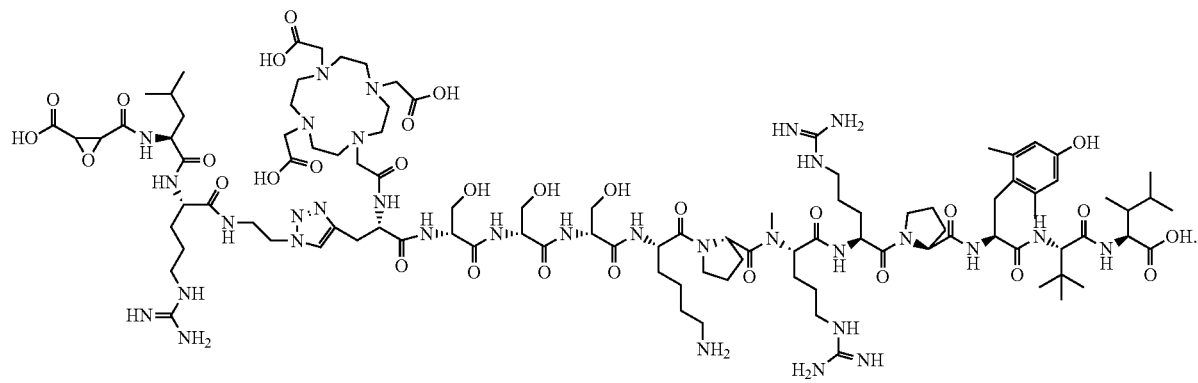
Ea
25. The compound of claim 12, wherein the compound has the structure:
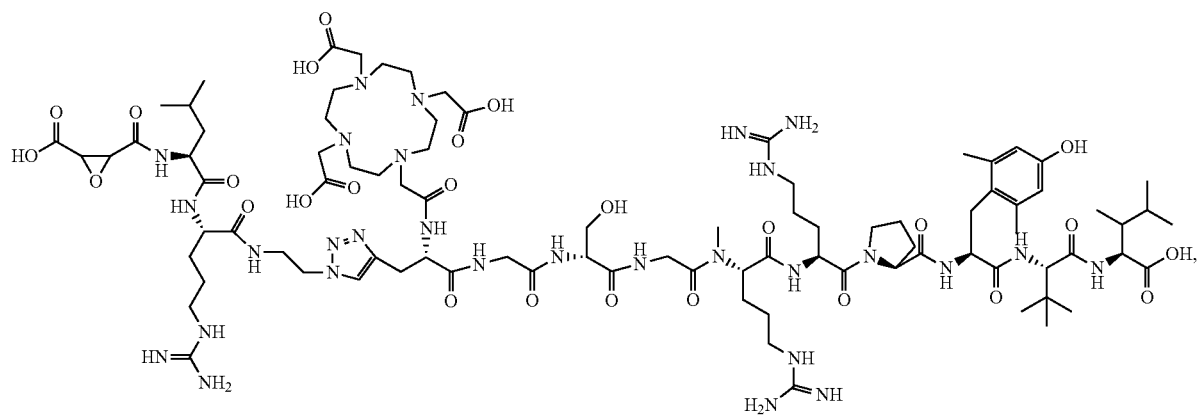
NE2a
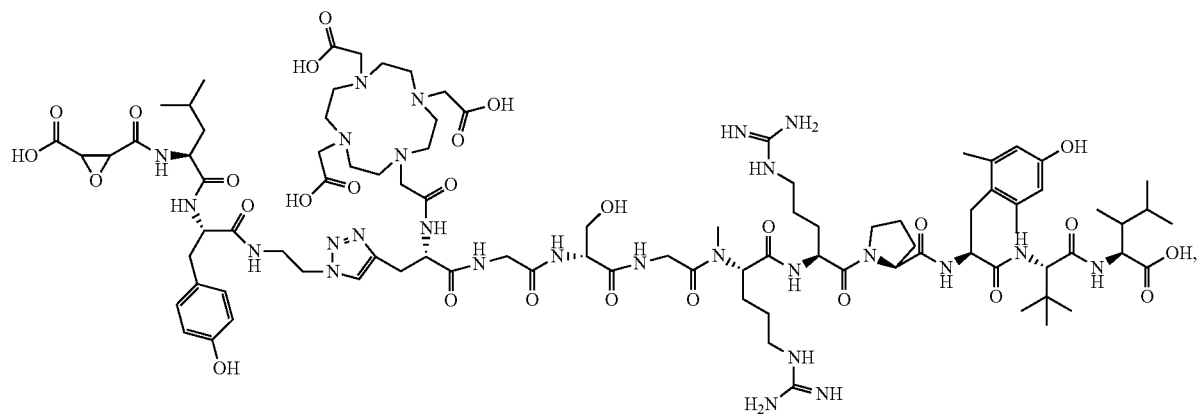
NE2b

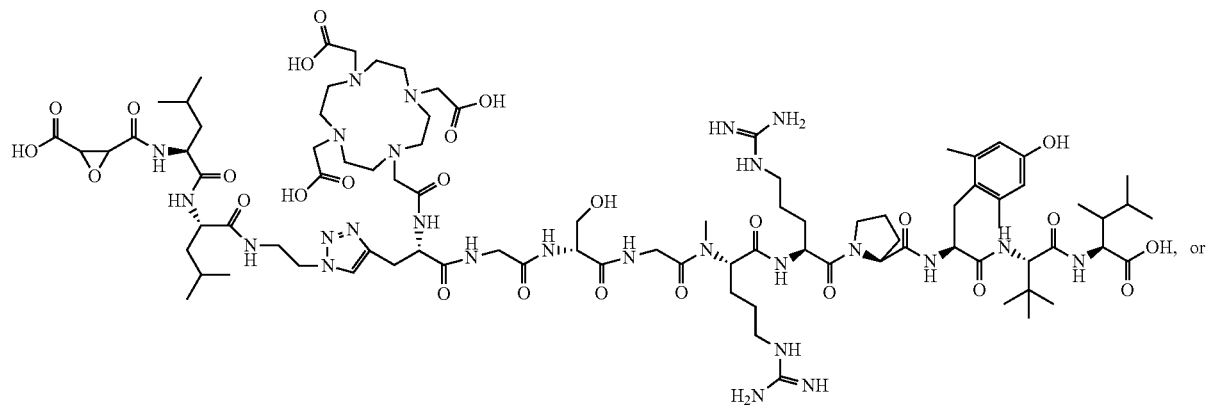
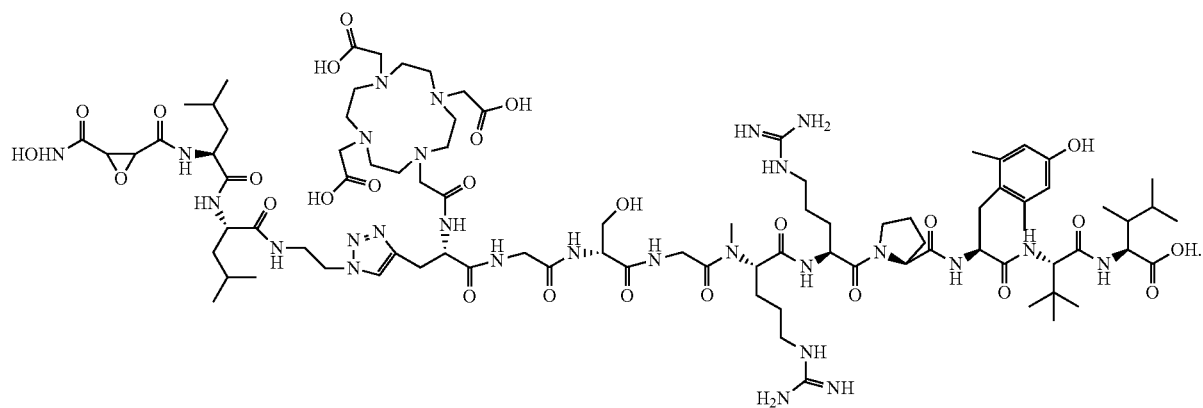
26. The compound of claim 12, wherein the compound has the structure
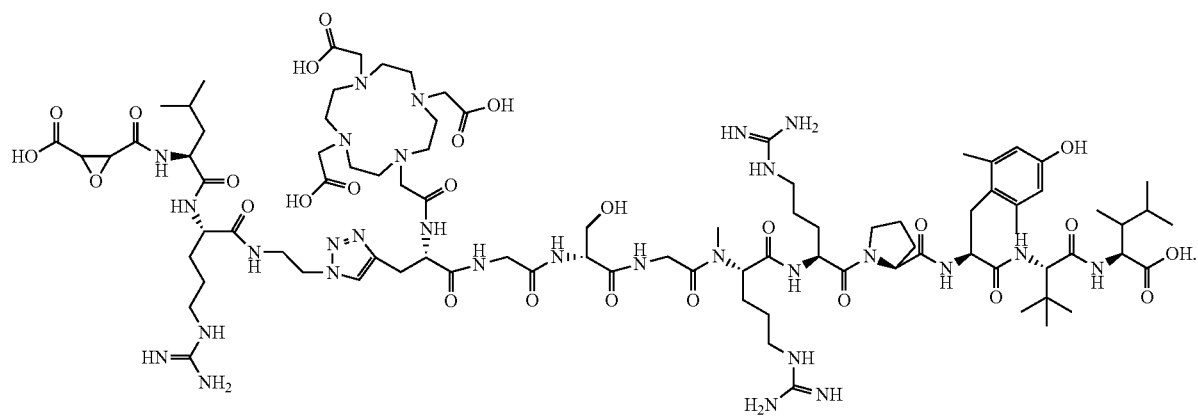
* * * * *